US012695673B2

(12) United States Patent
　　Thyagaturu et al.

(10) Patent No.:　US 12,695,673 B2
(45) Date of Patent:　　Jul. 28, 2026

(54) FLOW-SPECIFIC NETWORK SLICING

(71) Applicant: INTEL CORPORATION, Santa Clara, CA (US)

(72) Inventors: Akhilesh S. Thyagaturu, Tempe, AZ (US); Francesc Guim Bernat, Barcelona (ES); Xiangyang Zhuang, Santa Clara, CA (US); Karthik Kumar, Chandler, AZ (US); Petar Torre, Feldkirchen (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/900,653

(22) Filed: Aug. 31, 2022

(65) Prior Publication Data

US 2023/0006889 A1　　Jan. 5, 2023

(51) Int. Cl.
　　*H04L 41/122*　　　(2022.01)
　　*H04L 41/5025*　　(2022.01)
(52) U.S. Cl.
　　CPC ........ *H04L 41/122* (2022.05); *H04L 41/5025* (2013.01)
(58) Field of Classification Search
　　CPC ............... H04L 41/122; H04L 41/5025; H04L 41/0886; H04L 41/0896; H04L 41/5054; H04L 41/0895; H04L 41/0897; H04L 41/142; H04L 41/147; H04L 41/16; H04L 43/08; H04L 41/0806; H04L 41/08
　　See application file for complete search history.

(56) References Cited

U.S. PATENT DOCUMENTS

2012/0134264 A1*　5/2012　Ludwig ................... B60R 19/34
　　　　　　　　　　　　　　　　　　　　　　　370/230
2018/0077023 A1*　3/2018　Zhang ................. H04L 41/5003
2018/0367411 A1*　12/2018　Narsude ............... H04L 41/122
2022/0014963 A1*　1/2022　Yeh .................... H04W 28/0268
2022/0086698 A1*　3/2022　Yao .......................... H04L 43/08
2022/0124560 A1*　4/2022　Yeh ........................ H04W 28/18
2023/0308898 A1*　9/2023　Oktay ................... H04W 76/12

OTHER PUBLICATIONS

Huawei Technologies Co., Ltd. "CloudEngine 12800, 12800E, 8800, 7800, 6800, and 5800 Series Switches—ACL Technical Topics", 116 pages, Issue 07 (Oct. 18, 2018).
(Continued)

*Primary Examiner* — Tonia L Dollinger
*Assistant Examiner* — Mehulkumar J Shah
(74) *Attorney, Agent, or Firm* — Essential Patents Group, LLP; Christopher K. Gagne

(57)　　　　ABSTRACT

The present disclosure is generally related to edge computing technologies (ECTs), communications networking, network slicing, and in particular, to techniques and technologies for providing flow-specific network slices. In particular, the present disclosure describes mechanisms that expand existing end-to-end architectures in order to include quality of service and monitoring mechanisms that connect network slicing technologies with infrastructure and/or network data center quality of service provider domains. The described mechanisms provide data center bridging to enable network, edge computing, and cloud computing domains.

26 Claims, 13 Drawing Sheets

(56) References Cited

OTHER PUBLICATIONS

GSMA, "E2E Network Slicing Architecture", Version 1.0, 48 pages (Jun. 3, 2021), https://www.gsma.com/newsroom/wp-content/uploads/NG.127-v1.0-2.pdf.

ITU, "Technical Report—Telecommunication Standardization Sector of ITU, GSTR-TN5G, Transport network support of IMT-2020/5G", 21 pages (Feb. 9, 2018).

Akhilesh S Thyagaturu et al., "Ubi-Flex-Cloud: ubiquitous flexible cloud computing: status quo and research imperatives", 16 pages (Feb. 5, 2022), https://www.emerald.com/insight/2210-8327.htm.

Cisco, "Cisco Converged 5G xHaul Transport", 25 pages (Nov. 3, 2018).

"THe Edge of the Cloud-5G Technology Blog", 10 pages (Apr. 8, 2017), http://edge-of-cloud.blogspot.com/2017/04/what-is-5g-network-slicing.html.

Wang et al., "A Multi-Layer Multi-Timescale Network Utility Maximization Framework for the SDN-Based LayBack Architecture Enabling Wireless Backhaul Resource Sharing",Electronics 2019, vol. 8, No. 937, 28 pages (Aug. 26, 2019), https://www.mdpi.com/2079-9292/8/9/937/htm.

Steve Levine, "Learn About Data Center Bridging", Juniper Networks, 11 pages (Jan. 24, 2014), https://www.juniper.net/documentation/en_US/learn-about/data-center-bridging.pdf.

Netmanias, "E2E Network Slicking—Key 5G technology: What is it? Why do we need it? How do we implement it?", 6 pages (Nov. 27, 2015), https://www.netmanias.com/en/post/blog/8325/5g-iot-network-slicing-sdn-nfv/e2e-network-slicing-key-5g-technology-what-is-it-why-do-we-need-it-how-do-we-implement-it.

Noormohammadpour et al., "Datacenter Traffic Control: Understanding Techniques and Trade-offs", IEEE Communications Surveys & Tutorials, vol. 20, No. 2, pp. 1492-1525 (Dec. 14, 2017).

Walker, "Optical Transport Network (OTN) Tutorial", International Telecommunication Union (ITU), 62 pages, (available online 2007), https://www.itu.int/ITU-T/studygroups/com15/otn/OTNtutorial.pdf.

Viktor Schiffer, "ODVA—The Common Industrial Protocol (CIP™) and the Family of CIP Networks", 134 pages (Feb. 2016).

* cited by examiner

Figure 9

1450 processor 1452
instructions 1481

1456 acceleration circuitry 1464 edge devices 1462

1466

1466y

1466x

1466z trusted execution environment 1490 edge cloud 1463

1460 memory 1454
instructions 1482 network interface 1468 storage 1458
instructions 1483 external interface 1470 sensors 1472 actuators 1474 pos 1475 battery 1426 battery monitor / charger 1428 power block 1480 output circuitry 1484 input circuitry 1486

FLOW-SPECIFIC NETWORK SLICING

TECHNICAL FIELD

The present disclosure is generally related to edge computing technologies (ECTs), communications networking, network slicing, and in particular, to techniques and technologies for providing flow-specific network slices.

BACKGROUND

3GPP Fifth Generation (5G) networking technologies have emerged as a catalyst for applications requiring relatively high data rates. In order to operate at a level acceptable to most end user, these applications require a certain level of performance in terms of, for example, response times, latency, among many other performance metrics. These performance requirements are needs in the cellular network domain, edge computing domain, and the cloud domain. While each of these domains provides some level of quality of service (QoS) at an individual level, there is a gap in interfacing and/or interworking mechanisms to facilitate QoS across these domains in a manner that is meaningful to the end user at the service or microservice level. Additionally, mechanisms to propagate service level agreements between these domains is also lacking and/or missing.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 9 illustrates an example edge computing environment.

DETAILED DESCRIPTION

Figure 1:
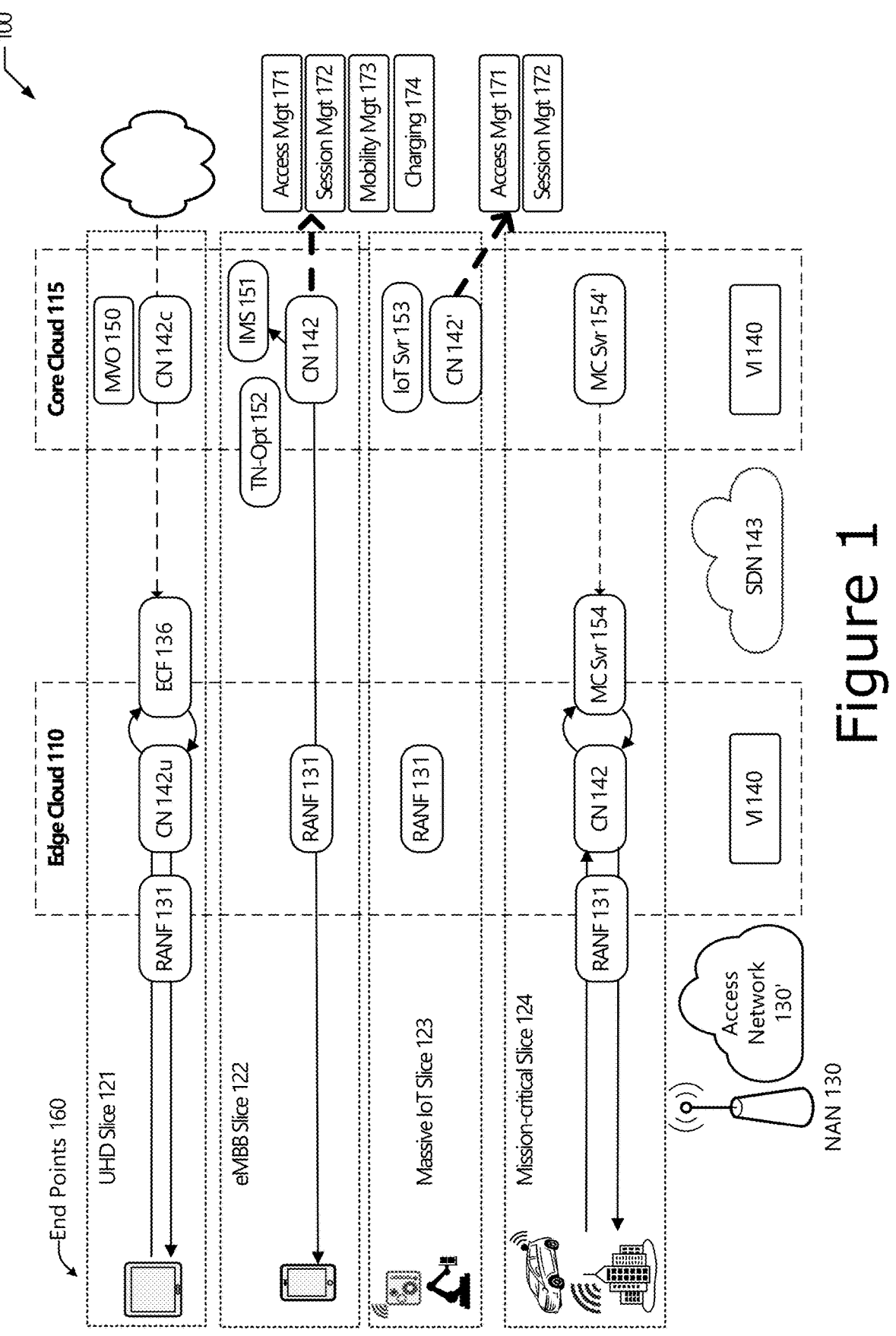
FIG. 1 depicts example environment employing network slicing.

1. Flow-Specific Network Slicing 1.1. Slicing Architecture Configurations and Arrangements FIG. 1 shows an example environment 100 including multiple network slices wherein different network slices isolate burstiness and interference from applications in different slices. 3GPP Fifth Generation (5G) networking technologies have emerged as a catalyst for applications requiring high data rates. Network slicing offers a means to ensure that different applications (e.g., Internet of Things (IoT), autonomous or semi-autonomous vehicles or drones, ultra-high definition (UHD), and/or other like applications) do not interfere with one another.

A network slice is a logical and/or virtual network that includes a set of network functions (NFs), and corresponding resources such as, for example, compute, storage, and networking resources. Network slices can span and can be deployed across multiple network domains and/or network operator (NOP) domains, including access network (AN) 130', edge network (e.g., edge cloud 110), core network (e.g., core cloud 115), and transport networks (TNs). Network slices are "sliced out" from a physical network in order to provide specific capabilities and characteristics required for applications running within the network slice. A network slice could also be seen as a unique profile for an application, defined as a set of services within the network, or as an NF chain built to support a given use case, traffic type, subscriber or customer (e.g., a "CSC" which may refer to a "communication service customer" or a "cloud service customer"), and/or the like.

Network slicing at least in some examples includes means for creating logical and/or virtualized networks over a common multi-domain infrastructure using technologies such as software defined networking (SDN), network functions virtualization (NFV), orchestration, analytics, telemetry, and automation technologies. Network slicing allows NOPs to create network slices that can support a specific purpose (e.g., an application, service, set of users, a network, and/or the like). In particular, a network slice includes a set of NF instances, with their supporting resources (e.g. virtualized resources and/or non-virtualized resources), to provide a service for certain purpose (e.g. to support a certain set of communication services, provide public network integrated non-public networks (PNI-NPNs), and/or the like in a Network Slice as a Service (NSaaS) model), for operational efficiencies (e.g. to optimize operator internal O&M procedures in network slice as NOP internals model), and/or to satisfy an associated SLA and/or SLS. As discussed in more detail infra, network slicing is enhanced to allow NOPs to create network slices that can support individual data flows associated with specific applications, services, set of users, and/or networks.

Each of the NFs in a network slice may be a virtual NF (VNF) or a physical NF (PNF). The NFs may be implemented using virtual machines (VMs), virtualization containers, and/or some other network function virtualization (NFV) technology. The NFs can also be deployed using virtualization infrastructure (VI) 140 and/or AN equipment 130, 130', which allows various NFs to operate in or as an edge cloud 110 and/or core cloud 160. In some implementations, commercial-of-the-shelf (COTS) equipment can be used for the VI 140 and/or AN equipment 130, 130'. Connectivity among the NFs located in the edge cloud 110 and the core cloud 160 are provisioned using SDN 143 (e.g., SDN controllers and/or the like) and/or other virtual and/or physical network appliances. As examples, the SDN 143 can include technologies and/or protocols such as OpenFlow, Border Gateway Protocol Link-State (BGP-LS), Path Computation Element Communication Protocol (PCEP), Network Configuration Protocol (NETCONF), YANG, and/or the like. Additionally, end point devices 160 can access the edge cloud 110 and the core cloud 160 using one or more ANs 130', where each AN 130' includes one or more network access nodes (NANs) 130. In some implementations, the NAN(s) 130 and AN(s) 130' may support multi-access networks, or networks involving multiple access technologies (or RATs).

In FIG. 1, network slices are created for different network slice types (or service types) including an ultra-high definition (UHD) slice 121, an enhanced Mobile Broadband (eMBB) slice 122, a massive IoT (mIoT) slice 123 (also referred to as "massive Machine Type Communications slice 123" or "mMTC slice 123"), and a mission-critical (MC) slice 124 (also referred to as an "URLLC slice 124"). Applications dedicated for each service are virtualized and operate within their respective slices 121, 122, 123, 124. Each network slice is created for different services that have different service requirements. In some examples, the different service requirements for each network slice may be specified by respective service level agreements (SLAs). Additionally, NFs are deployed, disposed, or otherwise placed at different locations in each slice (e.g., within the edge cloud 110 or the core cloud 115) depending on the services provided by each network slice. Some NFs such as, for example, access management (mgt) functions 171, session mgt functions 172, mobility mgt functions 173, charging functions 174, policy control, and the like, can be deployed in one slice, while being omitted from other slices.

In this example, the UHD slice 121 includes a RAN function (RANF) 131, user plane (UP) core network (CN) 142*u*, and edge compute function (ECF) 136 in the edge cloud 110, and control plane (CP) CN 142*c* and Mobile Video Optimization (MVO) server(s) 150 in the core cloud 115. In one example implementation, the ECF 136 is, or operates as, a cache server, a CDN node, or the like. The eMBB slice 122 includes a RANF 131 in the edge cloud 110, and the core cloud 115 includes a UP and CP 5G CN 142 with full mobility features, as well as virtualized IP Multimedia Subsystem (IMS) server(s) 151 and TN optimizer (TN-Opt) 152. The TN includes links and/or network elements that connect a RAN and the CN, including fronthaul, midhaul, and backhaul interfaces. Examples of network elements in a TN include access routers, metro edge gateways (mEGs), metro aggregation edge gateway (mAEG), metro backbone router (mBB), and/or backbone routers (BB). Examples of TNs that can be used include TCP networks, 5G transport networks (e.g., including Wavelength Division Multiplexing (WDM), Pulse Amplitude Modulation 4-level (PAM4), MPLS, EVPN, Virtual Extensible LAN (VXLAN), Segment Routing MPLS (SR-MPLS), SR-IPv6 (SRv6), among many other technologies), optical transport networks (OTNs), Synchronous Digital Hierarchy (SDH) TNs, xHaul TN, ITU IMT 2020/5G TNs, and/or the like.

The massive IoT slice 123 includes a RANF 131 in the edge cloud 110 and a set of IoT servers 153 and a lightweight 5G CN 142' in the core cloud 115. This CN 142' may be made lightweight by not including mobility management features of other 5G core networks. In some examples, the massive IoT slice 123 can include one or more sensor networks and/or IoT networks. The MC slice 124 includes a RANF 131, a UP 5G CN 142*u*, and associated MC servers 154 (e.g., V2X servers, and the like) in the edge cloud 110 to minimize transmission delay. The MC slice 124 can include some less critical MC servers/services 154' in the core cloud 115. In some examples, the MC slice 124 can be used for autonomous and/or semi-autonomous vehicle applications/services, amusement ride (e.g., roller coasters, and the like) telemetry, smart city applications/services, smart factory applications/services, remote healthcare services, time-sensitive networks (see e.g., *IEEE Standard for Local and Metropolitan Area Networks—Timing and Synchronization for Time-Sensitive Applications*, IEEE Std 802.1AS-2020, pp. 1-421 (19 Jun. 2020) ("[IEEE802.1AS]")), and/or the like. Although the example of FIG. 1 shows different types of devices 160 corresponding to different slices, this example is meant to illustrate the main services represented by different types of devices 160. In other implementations, some or all of the network slices can be genericized as a logically separated, self-contained, independent, and secured part of a network, targeting different services with different requirements such as, for example, speed, latency, jitter, reliability, and/or other requirements. These requirements may be defined or specified by resource model information (e.g., including a service profile and/or a network slice profile), management model information, and/or capability model information (see e.g., discussion infra with respect to FIG. 6). Moreover, different network slices can encompass the use or multiple device types and/or some device types can be served by or within multiple network slices.

Figure 9:
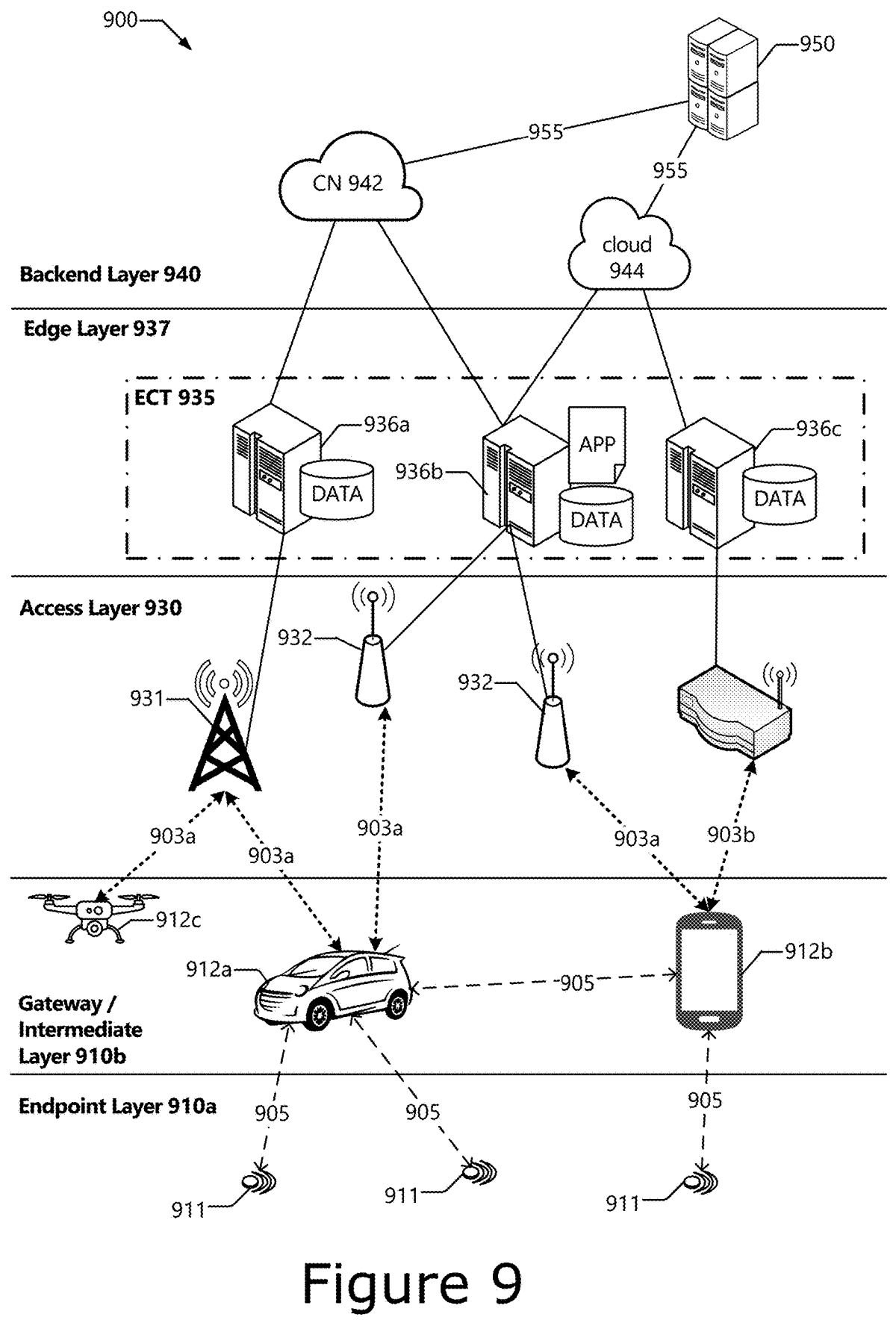
Figure 10:
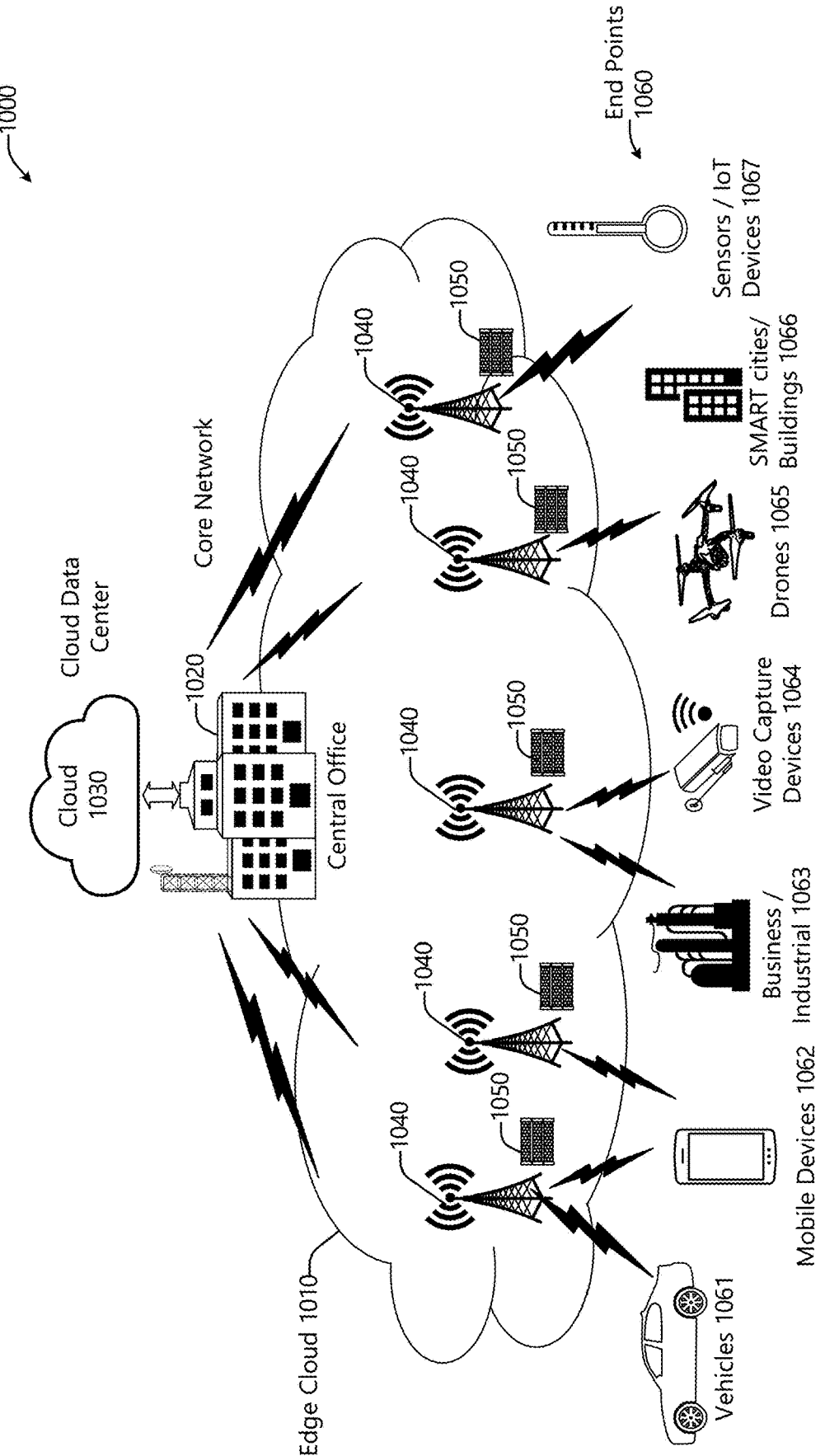
FIG. 10 illustrates an overview of an edge cloud configuration for edge computing.

In some examples, the end point devices 160 may be the same or similar as the UEs 910 of FIG. 9 and/or the end point devices 1060 of FIG. 10, and the NANs 130 may be the same or similar as the NANs 930 of FIG. 9 and/or the NAN 1040 of FIG. 10. Additionally or alternatively, the NANs 131 and/or the RANFs 131 may have a CU/DU split-architecture deployment and/or a next generation fronthaul (NGF) deployment (see e.g., 3GPP TS 38.401 v17.1.1 (2022 Jul. 5) ("[TS38401]") and U.S. application Ser. No. 17/704,658 filed on 25 Mar. 2022 ("['658]"), the contents of each which are hereby incorporated by reference in their entireties and for all purposes). Additionally or alternatively, the ECF 136 may be the same or similar as the edge compute nodes 936 of FIG. 9 and/or the local processing hubs 1050 of FIG. 10. In some examples, the ECF 136 may be implemented in a same or similar manner as discussed in [658]. Additionally or alternatively, the CN 142*u*, CN 142*c*, CN 142, and/or CN 142' may be the same or similar as the 942 of FIG. 9 (discussed infra). Additionally or alternatively, the edge cloud 110 may be the same or similar as the edge layer 937 and/or ECT 935 of FIG. 9 and/or the edge cloud 1010 of FIG. 10. Additionally or alternatively, the core cloud 115 may be the same or similar as the cloud 944 and/or server(s) 950 of FIG. 9 and/or the cloud data center 1030 of FIG. 10.

In some implementations, the communications among the NFs in the edge cloud 110 and the core cloud 115 takes place using internet protocol (IP) and/or multi-protocol label switching (MPLS) according to known techniques. Additionally or alternatively, the communications in the AN(s) 130' and/or the SDN 143 may be based on NGFI (also referred to as "xHaul" or the like) as discussed in ['658]. In some implementations, different slice types may be instantiated or created based on the interface between the edge cloud 110 to core cloud 115. For example, a first type of edge-to-cloud interface may be selected for a UHD slice 121, a second type of edge-to-cloud interface may be selected for an eMBB slice 122, a third type of edge-to-cloud interface may be selected for a massive IoT slice 123, a fourth type of edge-to-cloud interface may be selected for MC slice 124, and so forth. Furthermore, different flow-specific slices may be instantiated or created for different flows based at least in part on a selected edge-to-cloud interface.

3GPP 5G provides network slicing for isolation and dedicated computing capabilities. 3GPP has defined the processes and interfaces for 5G network slicing to provide dedicated QoS among 5G network slices. In 5G networks, a network slice instance (NSI) is defined within a public land mobile network (PLMN) or within a standalone non-public network (SNPN), and includes CN CP functions (e.g., CN 142*c* discussed previously) and UP functions (e.g., CN 142*u* discussed previously), and in the serving PLMN, at least one of the following: an next generation (NG)-RAN; a Non-3GPP Inter-Working Function (N3IWF) or Trusted Non-3GPP Gateway Function (TNGF) to the non-3GPP Access Network described in clause 4.2.8.2 of [TS23501], or a Trusted WLAN Interworking Function (TWIF) to the trusted WLAN in the case of support of NSCW devices described in clause 4.2.8.5 of [TS23501]; or a Wireline Access Gateway Function (W-AGF) to the Wireline Access Network described in clause 4.2.8.4 of [TS23501].

Network slices may differ for supported features and/or NF optimizations, in which case such network slices may have, for example, different single network slice selection assistance information (S-NSSAIs) with different slice/service types (SSTs) (see e.g., clause 5.15.2.1 of [TS23501]). An operator can deploy multiple network slices delivering exactly the same features but for different groups of UEs, for example, as they deliver a different committed service and/or because they are dedicated to a customer, in which case such network slices may have different S-NSSAIs with the same SST, but different slice differentiators (SDs) (see e.g., clause 5.15.2.1 of [TS23501]). An S-NSSAI identifies a network slice, and includes an SST and an SD. The SST refers to the expected network slice behavior in terms of features and services. The SD includes information that complements the SST(s) to differentiate amongst multiple network slices of the same SST. In some implementations, an S-NSSAI may not include an SD. Additionally, an Various performance metrics span the AN domain (e.g., AN(s) 130' in FIG. 1), edge computing domain (e.g., edge cloud 110 in FIG. 1), and the cloud domain (e.g., core cloud 115 in FIG. 1). While these domains provide Quality of Service (QoS) and/or QoS-like constructs at an individual level, there is a gap in interfacing and/or interworking to facilitate QoS across these domains in a manner that is meaningful to the end user at the service or microservice level. For example, having QoS successfully enforced at in the AN domain is meaningless if the cloud or edge domains are congested or overloaded. Additionally, telemetry hooks and handshaking capabilities to facilitate QoS interfacing and/or interworking are lacking. Likewise, mechanisms to propagate SLAs between these domains are also lacking. Various metrics need to be covered by these SLAs such as, for example, bandwidth, latency, security, and reliability metrics. Various aspects of these metrics are statistical in nature as observed by user devices and/or application, including statistical observations regarding 99th percentile, average, deviations, and the like, which can be beneficial if exchanged between the AN, edge, and cloud domains, in addition to just an upper or lower bounds. As an example, [TS23501] discusses various QoS characteristics associated with a QoS flow (or 5G QoS Identifier (5QI), as shown by Table 5.7.3.1.

TABLE 5.7.3.1

| QoS Flow Performance Characteristics | |
| --- | --- |
| Performance Characteristics | Description |
| Resource Type | Guaranteed Bit Rate (GBR), Delay Critical GBR or Non-GBR; determines if dedicated network resources related to a QoS Flow-level Guaranteed Flow Bit Rate (GFBR) value are permanently allocated (e.g. by an admission control function in a radio base station). See [TS23501], section 5.7.3.2. |
| Priority Level | The priority level associated with 5G QoS characteristics indicates a priority in scheduling resources (e.g., radio resources) among QoS flows. See also, [TS23501], section 5.7.3.3. |
| Packet Delay Budget (PDB) | defined as the upper bound for packet delivery between UE/device and N6 termination point at a User Plane Function (UPF) (e.g., between Data Network (DN) and UPF in the 5G core network (5GC)). PDB can also include Core Network PDB (CN PDB) (see e.g., [TS23501], section 5.7.3.4) and/or 5G-AN PDB. |
| Packet Error Rate (PER) | defines an upper bound for the rate of PDUs (e.g., IP packets) that have been processed by the sender of a link layer protocol (e.g., RLC in RAN of a 3GPP access) but that are not successfully delivered by the corresponding receiver to the upper layer (e.g., PDCP in RAN of a 3GPP access). Thus, the PER defines an upper bound for a rate of non-congestion related packet losses. See [TS23501], section 5.7.3.5. |
| Averaging window | Used for GBR and Delay-critical GBR resource type only; used for calculating the bit rate. The Averaging window represents the duration over which the GFBR and MFBR shall be calculated (e.g. in the (R)AN, UPF, UE) See [TS23501], section 5.7.3.6. |
| Maximum Data Burst Volume (MDBV) | Used for Delay-critical GBR resource type only; MDBV denotes the largest amount of data that the 5G-AN is required to serve within a period of 5G-AN PDB. See [TS235011], section 5.7.3.7. |

S-NNSAI may be among a set of S-NSSAIs in a network slice selection assistance information (NSSAI) field/data structure. An NSSAI provided by a UE to a serving PLMN during registration is referred to as a "requested NSSAI", and the S-NSSAI values a UE could use in a serving PLMN in the UE's current registration area is referred to as an "allowed NSSAI". Based on the operator's operational or deployment needs, an NSI can be associated with one or more S-NSSAIs, and an S-NSSAI can be associated with one or more NSIs. Additional information about S-NSSAIs are discussed in [TS23501].

3GPP 5G defines network slice types at a relatively high level, which may be viewed as highly abstracted summary of the service characteristics from multiple QoS flows provided in a slice. The operator can deploy multiple network slices delivering the same QoS features and for different groups of UEs. Table 5.15.2.2-1 shows example standardized SST values (e.g., out of a total 127 allowed values), which provide a way for establishing global interoperability for slicing so that PLMNs can support roaming use cases more efficiently for the most commonly used SSTs.

TABLE 5.15.2.2-1

| Standardized SST values | | |
|---|---|---|
| Slice/Service type | SST value | Characteristics |
| eMBB | 1 | Slice suitable for the handling of 5G enhanced Mobile Broadband. |
| URLLC | 2 | Slice suitable for the handling of ultra-reliable low latency communications. |
| MIoT | 3 | Slice suitable for the handling of massive IoT. |
| V2X | 4 | Slice suitable for the handling of V2X services. |
| HMTC | 5 | Slice suitable for the handling of High-Performance Machine-Type Communications. |

Since the 5G slice is the origin point for the request (e.g., a requested NSSAI), the slice needs to embed the QoS information and exchange the same with the other layers. Unfortunately, there is no current means for handshake of SLAs, QoS settings, and telemetry between 5G, edge and cloud domains. The present disclosure provides mechanisms to solves these problems. Specifically, the present disclosure expands current device-to-cloud e2e architectures in order to include QoS (or performance metric) and monitoring mechanisms that connect network slicing aspects with infrastructure and/or network data center QoS domain (e.g., data center bridging (DCB); see e.g., clause 38 of [IEEE802.1Q]).

Current solutions involve aligning and calibrating individual QoS settings to the lowest common denominator by the end user. However, these localized monitoring solutions are inefficient and cannot scale. Additionally, QoS granularity is not currently enforced at the cloud and edge infrastructure. Hence, the notion of e2e QoS is decoupled between 3GPP 5G networks, edge networks, and cloud services. Furthermore, existing solutions do not provide flow-specific resolution of network slicing in NG-RAN and/or cloud/edge infrastructure that is combined and adaptive. For example, although current 3GPP 5G standards specify QoS parameters for QoS flows and allow network slices to be deployed for individual subscribers (e.g., individual enterprises or subscribers to an NOP), current 3GPP 5G standards do not allow for network slices to be provisioned individual data flows that may be application-specific and/or service-specific.

The present disclosure describes an end-to-end (e2e) framework for providing flow-specific network slices across multiple domains including the network/cellular domain, the edge computing domain, and the cloud computing domain. In particular, the present disclosure discusses coordinated e2e QoS policy setup between 5G networks and cloud services, as well as edge networks. As discussed infra, existing device to cloud e2e architectures are expanded in order to include QoS and monitoring mechanisms that connect network slicing with infrastructure and/or network data center QoS domains (e.g., DCB). In various implementations, network slices are allocated, provisioned, or otherwise provided at flow-specific resolutions or flow-specific granularities. In some implementations, a flow-specific resolution/granularity can be expressed in terms of tuple data such as a five tuple data structure including source network address, destination network address, source port, destination port, and network type (e.g., where the network addresses may be IP address or some other type of network address such as any of those discussed herein).

Figure 2:
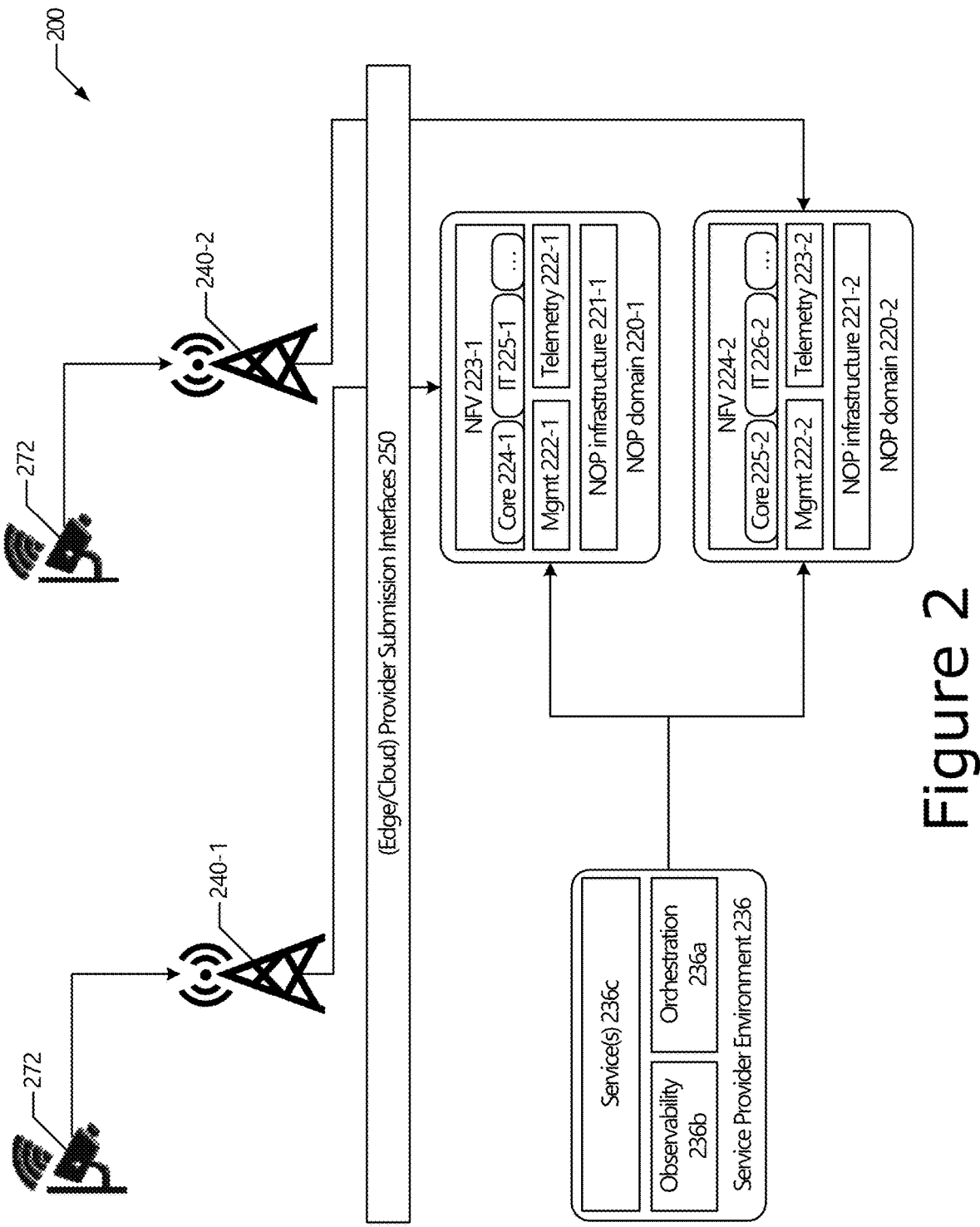
FIGS. 2, 3, and 6 depict example end-to-end (e2e) quality of service (QoS) architectures.

FIG. 2 shows an example flow-specific slicing architecture 200 for providing e2e automatic QoS creation. The slicing architecture 200 includes one or more data producers 272, NANs 240-1 and 240-2, a service provider environment 236, and NOP domains 220-1 and 220-2 (also referred to as "NOPs 220", "mobile network operator domains 220", "MNOs 220", "telco domains 220", and/or the like). The NOP domains 220-1 and 220-2 may represent different NOPs, which can include a cellular network and/or public land mobile network (PLMN) (where the cellular network/PLMN includes one or more radio access networks (RANs) and at least one core network), WLAN networks (e.g., including one or more WLAN access networks (ANs) and at least one backbone network), and/or any other type of wired or wireless network including any of those discussed herein), which may or may not implement different access technologies from one another.

The NOP domains 220 can also include respective data center networks (DCNs) (e.g., DCN 640 of FIG. 6), which can be used to implement the cloud ANs, CNs, and/or cloud computing services. In other implementations, cloud computing services can be provided by a data center service provider (DCSP) that is separate from the NOPs 220. For example, NOP 220 can lease DCN infrastructure and/or other resources that are owned/operated by a DCSP to host CN and/or cloud RAN elements. The DCSP designs, builds, and operates one or more data centers and/or DCNs. In some examples, the DCSP can be a virtualization infrastructure service provider (VISP), a platform as a service (PaaS) provider, an Infrastructure as a Service (IaaS) provider, a cloud service provider (CSP), and/or an edge network service provider. Any of the aforementioned implementations can be combined, for example, where an NOP 220 owns or operates its own DCN to host CN and/or cloud RAN elements and a DCSP owns/operates a separate DCN to provide cloud computing services to the NOP 220. Additionally or alternatively, the DCSP in the aforementioned implementations may own, operate, or otherwise provide the service provider environment 236.

In the example of FIG. 2, each of the NOP domains 220-1 and 220-2 may represent a set of NOP infrastructure elements, which can include, for example, NANs, switches, hubs, routers, gateways, network appliances, physical and/or virtual NFs, fronthaul links, midhaul links, backhaul links, and/or any other type of network element such as any of those discussed herein. Each NOPs 220 may include one or more NANs 240 (e.g., base stations, access points, and/or the like) that convey data between the data producers 272 and the NOP domains 220. The NANs 240 may be the same or similar as NANs 130 of FIG. 1, NANs 930 of FIG. 9, and/or the NAN 1040 of FIG. 10. For example, NAN 240-1 may be owned by, operated by, or otherwise associated with a first NOP 220-1 and NAN 240-2 may be owned by, operated by, or otherwise associated with a second NOP 220-2. In some examples, multi-access use cases may be supported wherein NANs 240 implement one or more access technologies (or radio access technologies (RATs)), which may be different than one another. For example, NAN 240-1 may implement or otherwise service user devices according to a first RAT and/or a first communication protocol (e.g., 3GPP 5G) and NAN 240-2 1 may implement or otherwise service user devices according to a second RAT and/or a second communication protocol (e.g., WiFi).

The NANs 240 interact with NOPs 220 via (edge/cloud) provider submission interfaces 250, which can include one or more APIs, web services (WS), reference points, service-based interfaces, and/or other connection/communication mechanisms. In some implementations, the provider submission interfaces 250 can include transformation functions and exposure gateways, which are used to expose various functionalities between the multiple domains 220 and allows network slices to be created for a given flow. In these implementations, interoperability among the NOP domains 220 is provided via the exposure gateways, and the transformation functions are communicatively coupled with different NOP domains 220 via one or more network APIs, which can be used to set QoS parameters. Additionally, various capabilities are exposed to individual networks (e.g., telecos) and/or NOP domains 220 via the network APIs. The capabilities can include, for example, slicing capabilities, positioning capabilities, managed QoS capabilities, and/or other capabilities, configurations, parameters, and/or characteristics such as any of those discussed herein. The transformation functions are logical entities (e.g., business logic) that call southbound APIs, transform data, and provide functionality for one or more service APIs. The transformation functions may also provide an abstraction of internal APIs to the service APIs. Additionally, individual transformation functions are connected to one or more exposure gateways, and the exposure gateways expose service functions via the service APIs. The service APIs can be used for access control, billing/charging, cross-operator federation, and the like. In some implementations, the service APIs include mapping tables for various attributes to southbound APIs. Furthermore, the service APIs connect the exposure gateways with one or more aggregation functions (or aggregators). Technical aggregation may be used for the enrichment of the service APIs (e.g., cloud, edge, and/or platform providers). Enriched service APIs are also used to connect the aggregators to capability (service) consumers (e.g., end user devices), and may be used for premium streaming and/or the like.

The service provider environment 236 configures flow-specific parameters to the NOPs 220 (or specified/selected NOP infrastructure elements). This configuration may be done by the orchestrator 236a, the observation element 236b, and/or the service 236c itself. The configuration may be done through a suitable API(s), web service(s), connector(s), reference point(s), interfaces, protocols, and/or any other suitable means. The infrastructure elements of the NOPs 220 also provide responses/replies to the service provider environment 236 based on the configuration.

The service provider environment 236 operates or otherwise provides one or more services 236, and also includes an orchestrator 236a and an observation element 236b. In some examples, the orchestrator 236a includes the observation element 236b. The orchestrator 236a and/or observation element 236b collect network performance measurements/metrics and update network configurations (e.g., "slicing configurations") according to app/service requirements for network slices based on the observation of network performance. In some implementations, the orchestrator 236a allocates resources to individual flow-specific slices according to respective slice requirements and/or predetermined or negotiated SLAs. To serve multiple service consumers and/ or multiple flow-specific slices, the orchestrator 236a includes or operates one or more sophisticated scheduling functions to meet competing and conflicting needs of different slice consumers, subscribers, deployment scenarios, use cases, and/or flows such as, for example, UHD, eMBB, ultra-reliable low latency communications slice (URLLC), industrial Internet of Things (IIoT), mIoT, and/or the like. In one example, the orchestrator 236a may provide differentiated handling of data traffic or traffic flows by creating or instantiating different user plane and/or control plane functions to serve individual flow-specific slices in a dedicated fashion. In some examples, the orchestrator 236a includes corresponds to one or more of the orchestrators 625, 645, 725, 736a, 1160, 1231 and/or container managers 1211, 1221 discussed infra. In some implementations, the service provider environment 236 is an edge computing network/framework (e.g., edge cloud 110 of FIG. 1; edge layer 937 and/or ECT 935 of FIG. 9; and/or edge cloud 1010 of FIG. 10), a cloud computing service or cloud network (e.g., core cloud 115 of FIG. 1; cloud 944 of FIG. 9; and/or cloud data center 1030 of FIG. 10), a backbone or core network (e.g., core cloud 115 of FIG. 1; CN 942 of FIG. 9), or a service provider platform (e.g., one or more application servers, web servers, and/or data storage servers such as server(s) 950 of FIG. 9 and/or the like). In some implementations, the service provider environment 236 is a combination of edge computing network/framework, cloud computing service, backbone/core network, and/or service provider platform, or various aspects thereof.

The data producers (sensors) 272 collect data (e.g., sensor data, telemetry data, and/or the like) and stream or otherwise provide the data to the service 236c via the NANs 240. In some examples, data streams may be handed over between NOP domains 220. The collected data is provided to the respective NOPs 220 from the NANs 240 (e.g., NAN 240-1 provides (sensor) data to NOP 220-1 and NAN 240-2 provides (sensor) data to NOP 220-2) via (edge/cloud) provider submission interfaces 250. The NOP domains 220 each include various elements to provide network slices (e.g., network slices 622 of FIG. 6). These elements include, for example, NOP infrastructure 221 (e.g., NFV infrastructure (NFVI) and/or other virtualization infrastructure), management (mgmt) functions 222 (e.g., orchestration, QoS provisioning, slice management, and/or the like), telemetry functions 223, and a set of NFVs 224. Each NFV 224 includes one or more processing elements (cores) 225, information technology (IT) functions 226, and/or other elements/entities including use case or application-specific functions (not shown by FIG. 2).

The data producers 272 in FIG. 2 are depicted as cameras or other image sensors (also referred to as "sensors 272"), which may be used for security and/or video analytics service 236c. In one example use case, the sensors 272 can be visible-light cameras, infrared cameras, and/or LiDAR sensors mounted on or (semi-)autonomous vehicles, drones, robots, unmanned aerial vehicles (UAVs), unmanned underwater vehicles (UUVs) or other unmanned watercraft, (semi-) autonomous sensors, IoT devices, machine-type communications (MTC) devices, roller coaster trains or individual roller coaster cars, and/or the like (collectively referred to herein as "(semi-) autonomous systems"). In other examples, the data producers 272 can be any other type of sensors, actuators, or other type of devices such as any of those discussed herein (see e.g., discussion of sensors 1472, actuators 1474, and positioning circuitry 1475 of FIG. 14).

Once a service 236c is deployed in the service provider environment 236, it is attached in one hand into the NOP domain 220 to a specific network slice. The network slice (or NSI) includes a set of properties for a corresponding service 236c, which may be defined or specified by a service profile (or "service configuration") and/or a slice profile (or slice configuration) As examples, the service/slice profile/configuration includes parameters, characteristics, properties, and/or requirements such as latency, bandwidth (BW), security, and/or other like metrics such as any of those discussed herein, which may be based on SLAs, KPIs, and the like. Once the slice is configured, the slice is mapped to an e2e QoS construct (or channel) that may be created for the service 236c (e.g., DCB virtual lanes) on or in the NOP domain 220 and/or the service provider environment 236. Once the e2e QoS construct/channel (e.g., virtual channel/lane) is/are created, data producers 272 (e.g., end users, devices, and the like) that are also mapped to that slice start injecting traffic into the NOP domain 220 (e.g., via NANs 240 and 5G/core architecture and the like). The traffic from the producers 272 is translated from the AN traffic (e.g., 5G traffic and/or the like) into network layer traffic (e.g., IP traffic and/or the like). Once the traffic is translated, the NOP domain 220 (or core network) is responsible for automatically adding metadata into the network packets (e.g., IP packets) a that will be used by the next level/layer (e.g., data center or infrastructure layers) to map those packets into appropriate virtual channel (e.g., DCB virtual lane or the like).

In some cases, it may not be efficient to always allocate e2e resources for all slices and NANs of an NOP domain 220. For example, if the e2e resources only involve radio resources, then a MAC scheduler at a NAN 240 may handle the allocation of radio resources as needed. In another example, if the e2e resources only involve dedicated spectrum for slices, the dedicated spectrum may be preset and static. In various implementations, telemetry and/or metrics/measurements of individual slices that are provided by different NANs 240 are scaled-out so that flow-specific slices can be allocated in an efficient manner. In these implementations, the NOP and/or DCN infrastructure adaptively schedules and prioritizes resources to the virtual lanes (e.g., a virtual lane 652 of FIG. 6). that are mapped to a particular slice (e.g., a slice 622 of FIG. 6). Additionally or alternatively, the NOP and/or DCN infrastructure can provide hints, feedback, metrics, or other data to the NOP domain 220 (e.g., edge user case/service to 5G-as-a-service) to perform certain actions (e.g., perform compression due to congestion on the backhaul and/or the like). In some implementations, temporal QoS channels are dynamically created when a request for a particular network slice and NOP crosses a domain that has not been setup with the e2e QoS path.

In contrast to 3GPP 5G network slicing, which creates dedicated resources for a particular service type (e.g., UHD, eMBB, URLLC, mMTC, mIoT, and the like), the present disclosure provides flow-based network slicing in an e2e perspective such that a cloud/edge application (app) can request a (flow) dedicated slice that is specific to an individual application or service. For instance, if a media streaming platform (e.g., Netflix®, Hulu®, and the like) wants to deliver media content, the media streaming platform's cloud or edge orchestrator can coordinate with a RAN orchestrator and management framework to create an e2e network slice that is specific to particular user and/or specific to a particular application, which can be specified to an individual data flow, which is from an end user/consumer (e.g., application, device, and/or the like) to a cloud/edge application. The data flow can be specified using tuple data.

In one example, a 5-tuple can be used to identify a flow, where the 5-tuple can include a source network address (e.g., IP address and/or the like), destination network address (e.g., IP address and/or the like), source port, destination port, and/or network/transport protocol/type (e.g., IP type and/or the like). In another example, a 3-tuple can be used to identify a flow, where the 3-tuple can include a source network address (e.g., IP address and/or the like), destination network address (e.g., IP address and/or the like), and ICMP identifier (e.g., identifying an ICMP query session or the like). Other implementations can use other data to identify data flows for flow-specific slices such as, for example, flow identifiers (e.g., 5G QoS IDs (5QI) and/or the like) hash-based identifiers, session and/or application identifiers, and/or any other suitable network address with or without any other suitable information/data.

The slicing architecture 200 of FIG. 2 aims to achieve e2e QoS mechanisms from the access (e.g., NANs 240) to the service provider environment 236 (e.g., edge or cloud) where the services 236c may be hosted, with enhanced interface and coordination mechanism among domains 220. As alluded to previously, there are three domains that are included as part of the slicing architecture 200 including: access network (including NANs 240), NOP domains 220 (including NOP-specific infrastructure), and the service provider environment 236 (e.g., edge and/or cloud networks and related infrastructure elements). The NOP domains 220 (including access network elements such as NANs 240) and core (inter)work with infrastructure and data center QoS schemes to provide e2e monitoring and QoS enforcement schemes, which can include (a) mapping devices into specific slices; (b) inserting or injecting slice identifiers (IDs) and/or slice characteristics into traffic/packets for routing to appropriate slices (e.g., virtual lanes assigned to a slice); and (c) monitoring metrics of individual slices. With respect to (b), when traffic from a network slice (e.g., a 3GPP 5G network slice) is translated into network traffic (e.g., IP traffic and/or the like), a slice ID and/or slice characteristics are included in the network traffic (e.g., IP traffic and/or the like) so the infrastructure and date center can route the network traffic through the proper virtual lanes associated with the flow-specific slice. In 3GPP 5G systems, an NSSAI field including an 8-bit SST is present when a UE sends a registration request to the 5G core network (5GC). The SST and/or other contents of the NSSAI data structure can be one example of information that is also conveyed to the infrastructure and data center domains in network traffic/packets. With respect to (c), the NANs 240 that provide network access/connectivity for network slices continue monitoring and collecting slice-related metrics (e.g., latency, BW, jitter, and/or other like metrics such as any of those discussed herein) that each of the slices is demanding. The collected data (telemetry data) is then aggregated by various intermediate points (e.g., network elements and/or NFs) and provided to the corresponding infrastructure and/or data centers elements (e.g., routers, switches, fabrics, network appliances, DPUs and/or IPUs, and/or the like) that are targets or otherwise associated with the slice (e.g., telemetry access from outside of a 5G domain). Additionally or alternatively, a network slice (e.g., 5G slice or the like) may receive requests from specific end points to perform certain optimizations for a particular slice based on the current status of the virtual lanes where they are being mapped.

In some implementations, the NOP and/or DCN infrastructure are expanded to implement QoS mechanisms based on network slice identifiers. In these implementations, network and data center infrastructure are expanded to be capable of instantiating data center virtual lanes mapped into the specific network slices. If the NOP and/or DCN infrastructure implements differentiated QoS (e.g., using the DSCP field of an IP header), the labeling and corresponding QoS policy should be aligned with that for the access network (e.g., 5G or the like). Additionally or alternatively, the infrastructure and data center may proactively allocate or de-allocate resources to a particular virtual lane mapped into a particular slice and NOP domain 220 based on the amount of load that is seen at the end of the network slicing. Additionally or alternatively, the infrastructure and data center may require to a particular NOP to perform certain optimizations (if possible) for certain slices depending on the current backhaul utilization. Examples could be implemented using certain traffic shaping schemes, traffic splitting schemes, compression schemes, and/or the like. This may depend on the functionalities available on the hardware (e.g., CPUs, accelerators, DPUs/IPUs, and/or the like).

Figure 3:
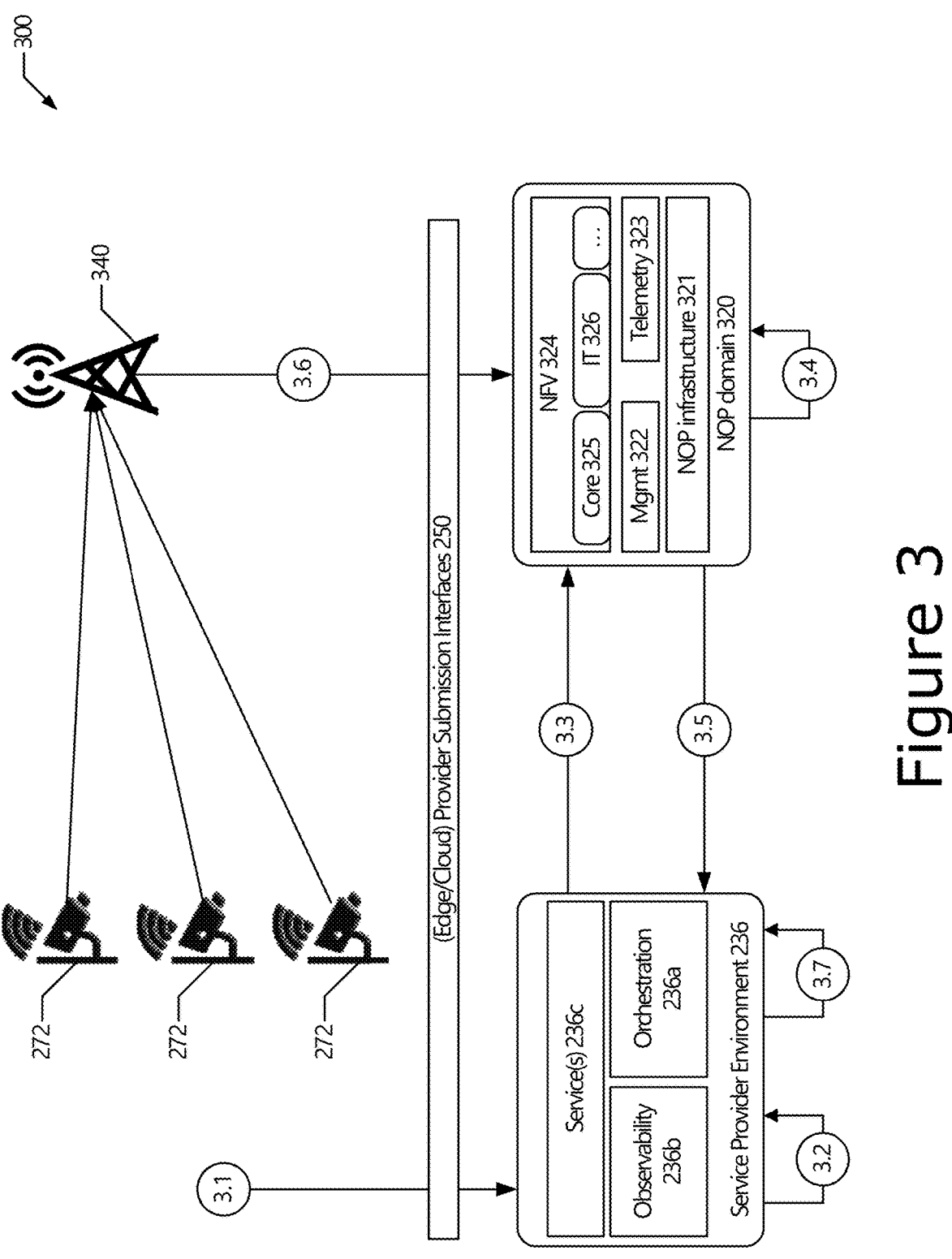

FIG. 3 shows an example flow-specific configuration 300 based on the slicing architecture 200 of FIG. 2. The example of FIG. 3 includes an NOP domain 320, which may represent one or more of the NOP domains 220-1 and/or 220-2 in FIG. 2, or may represent one or more infrastructure (network) elements in either of the NOP domains 220-1 or 220-2. Additionally, the NOP infrastructure 321 may be the same or similar as the NOP infrastructure 221-1, 221-2, mgmt 322 may be the same or similar as the mgmt 222-1, 222-2, telemetry function 323 may be the same or similar as the telemetry function 223, the NFV 324 may be the same or similar as the NFV 224-1, 224-2, core 325 may be the same or similar as the core 225-1, 225-2, and IT 326 may be the same or similar as the IT 226-1, 226-2.

In this example, at step 3.1 a service 236c is deployed in the service provider environment 236. In an example, the service 236c may be a video analytics service, and the commands/instructions to setup the service 236c may be in the form shown by example instruction [0].

$$\text{Instantiate}\big(\text{Video\_Analytics}, SRC = (A, \ldots, N), \quad [0]$$

$$QoS = \{(bw, +/-\%), (lat, +/-\%), \ldots \}\big)$$

In example instruction [0], Instantiate( ) is a function, method, API call, or other means for instructing the service provider environment 236 to instantiate a service 236c; Video_Analytics is an identifier or namespace of the service 236c to be instantiated; SRC=(A, . . . , N) is a source of a service provider and/or service consumer of the service 236c wherein A, . . . , N is a set of source service consumer/producer parameters; QoS={ } is a set of QoS parameters for the service 236c; (bw,+/−%) is a bandwidth QoS parameter wherein the "bw" is an initial bandwidth value for the service 236c and the "+/−%" represents a permitted or desired percentage range (or standard deviation) from the initial bandwidth value; (lat, +/−%) is a latency QoS parameter wherein the "lat" is an initial latency value for the service 236c and the "+/−%" represents a permitted or desired percentage range (or standard deviation) from the initial latency value; and the ellipsis ( . . . ) indicates that the set of QoS parameters can include zero or more additional QoS parameters and/or QoS characteristics for the service 236c such as, for example, acceptable jitter value, minimum arrival time, acceptable execution time, acceptable blocking time or other responsiveness metric, acceptable packet drop rate, queue information (e.g., number of jobs per unit of time, residency times, and/or the like), 5G QoS parameters (e.g., 5QI, ARP, RQA, notification control, flow bit rates, aggregate bit rates, default values, maximum packet loss rate, wireline access networks (W-SGAN)-specific QoS parameters (see e.g., 3GPP TS 23.316 v17.3.0 (2022 Jun. 15)), 5G QoS characteristics (see e.g., Table 5.7.3.1 supra), QoS forwarding treatment parameters (e.g. scheduling weights, admission thresholds, queue management thresholds, link layer protocol configuration, and/or the like). Additionally or alternatively, any other performance indicators, metrics, and/or measures such as any of those discussed herein can be used as QoS parameters. In various implementations, the service 236c can be deployed in the service provider environment 236 at step 3.1 according to the example service mesh of FIG. 8 (discussed infra).

At step 3.2, the service provider environment 236 configures itself and/or a set of service compute nodes of the service provider environment 236 (e.g., edge compute node(s), cloud compute node(s), CN compute nodes and/or NFs, and/or application/web/DB server(s)). In some implementations, step 3.2 can include selecting a set of service compute nodes of the service provider environment 236 based on service API telemetry, instantiating the service 236c, and setting up QoS parameters via the service API (e.g., the service API and/or enriched service API discussed previously). In one example, the service 236c is a video analytics service, and the service API is a camera/sensor API.

At step 3.3, the service provider environment 236 configures flow-specific (QoS) parameters to the NOP domain 320. The flow-specific (QoS) configuration may be done by the orchestrator 236a, observation element 236b, or the service 236c itself. This configuration may be done using the network APIs, service APIs, and/or enriched service APIs discussed previously with respect to the provider submission interfaces 250 of FIG. 2. An example API method/function is shown by example instruction [1].

$$AP\_QOS\_SETUP\{SRC, QoS, DST, \ldots \} \quad [1]$$

In example instruction [1], API_QoS_SETUP( ) is a function, method, API call, or other means for configuring the NOP infrastructure element(s) 320 with the flow-specific (QoS) parameters; SRC is a source address for the flow-specific network slice, QoS is/are the QoS parameters for the flow-specific network slice (e.g., including those in example instruction [0]), DST is a destination address for the flow-specific network slice, and the ellipsis ( . . . ) indicates that zero or more additional flow-specific (QoS) parameters can be included in the configuration. In various implementations, the flow-specific (QoS) parameters provisioned at step 3.3 according to the example service mesh of FIG. 8 (discussed infra).

At step 3.4, the NOP 320 configures QoS parameters for the core 324 (which may be the same or similar as the core 225-1 or 225-2 in FIG. 2), configures access QoS parameters, and configure infrastructure QoS parameters. At step 3.5, the NOP 320 provides results of the configuration operations to the service provider environment 236.

At step 3.6, streams from the data providers 272 are provided for service 236c via the NAN 340 and the (edge/cloud) provider submission interface(s) 250. The NAN 340 may be the same or similar to either of the NANs 240-1 and 240-2 of FIG. 2. At step 3.7, the service provider environment 236 (or the set of service compute nodes selected at step 3.2) monitors SLAs, KPIs, measurements, and/or metrics of the service 236c and notifies service consumers (not shown by FIG. 3) if one or more SLAs cannot be met anymore, or is predicted to fall below one or more thresholds defined by the SLAs.

Figure 5:
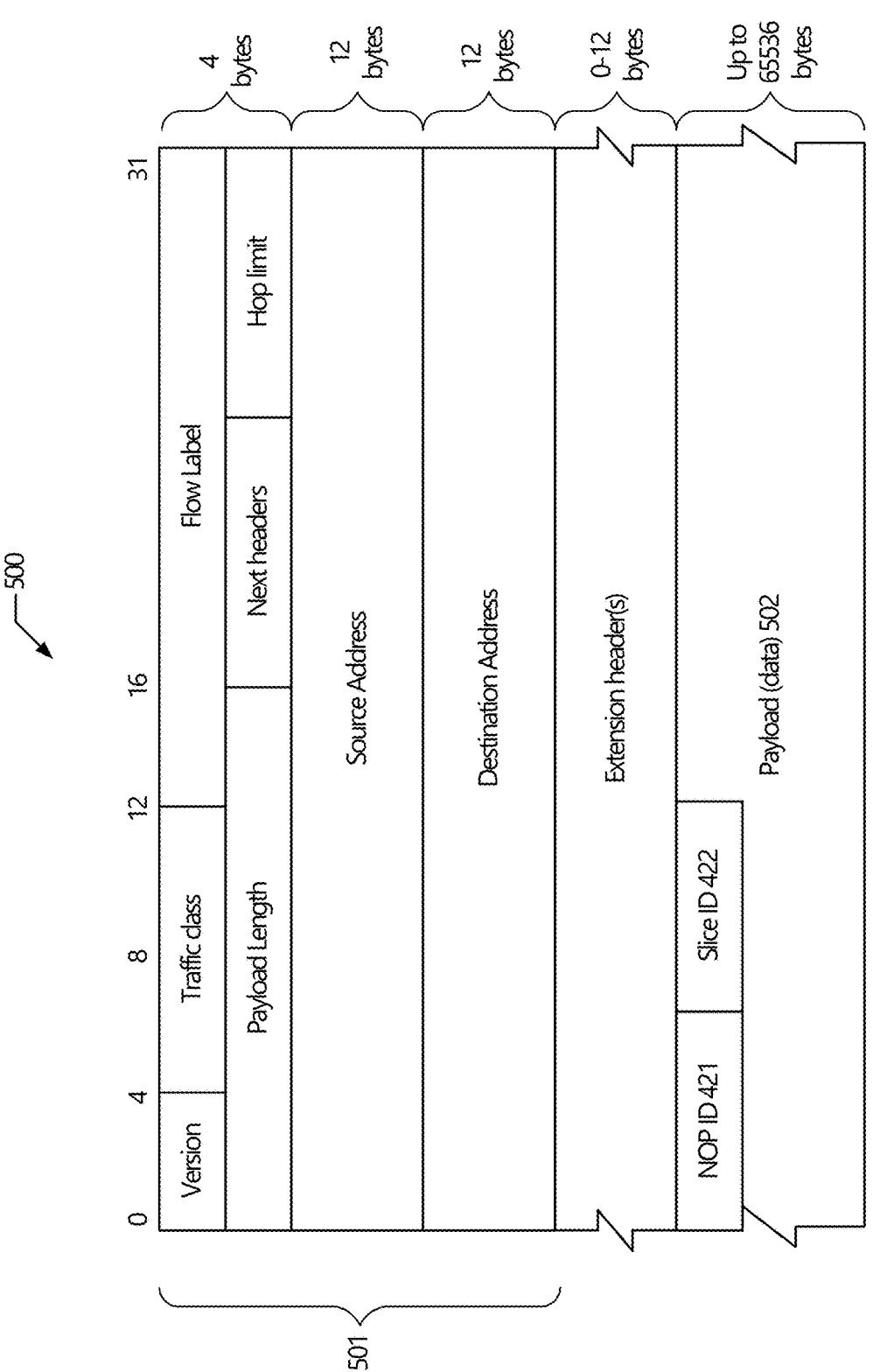
Figure 6:
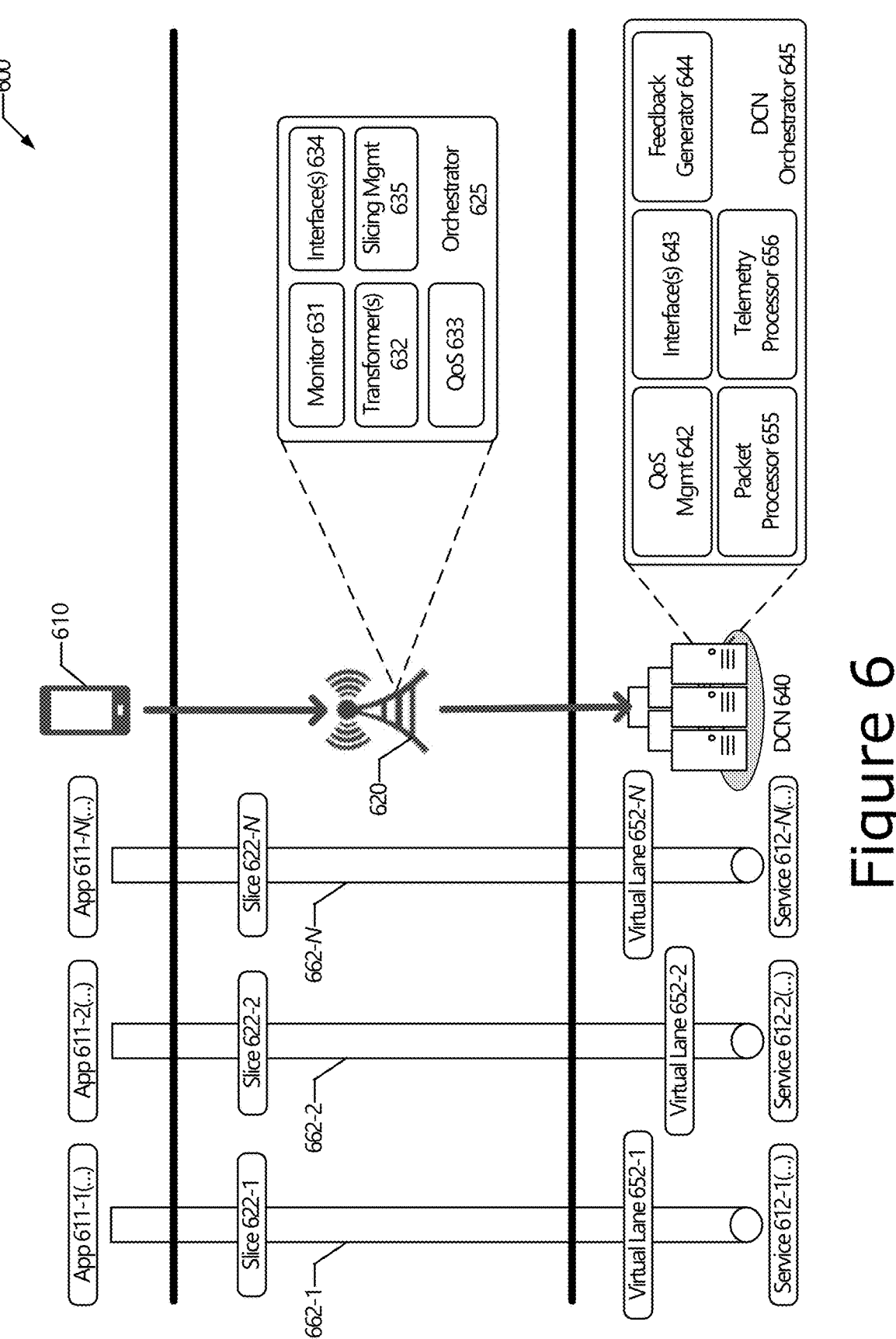

In the example of FIG. 3, once the service 236c is deployed in the service provider environment 236 (see e.g., step 3.1), it is attached into an NOP domain 220 (e.g., including NOP infrastructure elements 221) to a specific network slice (e.g., a slice 622 of FIG. 6). The network slice includes a set of properties (see e.g., steps 3.2 and 3.3) based on the service's 236c SLAs, KPIs, and/or the like (e.g., bandwidth, latency, security, reliability, and/or any other SLAs, KPIs, metrics and/or the like such as any of those discussed herein). In some implementations, the SLAs and/or KPIs can be mapped to statistical estimators such as, for example, jitter, median, and/or any other statistical estimators/measures such as any of those discussed herein. When the slice is configured (see e.g., step 3.3), the slice is mapped into an e2e QoS construct (e.g., a virtual lane 652 of FIG. 6) that is created for the service 236c. The NOP infrastructure various QoS flows during PDU session establishment for a specific UE/application. The 5GC may also add some amount of metadata into the network packets (e.g., IP packets, Ethernet packets, and/or the like) directly (e.g., at the packet level) so that slicing can be used. Example packets and the metadata added to the packets is shown by FIGS. 4 and 5.

Figure 4:
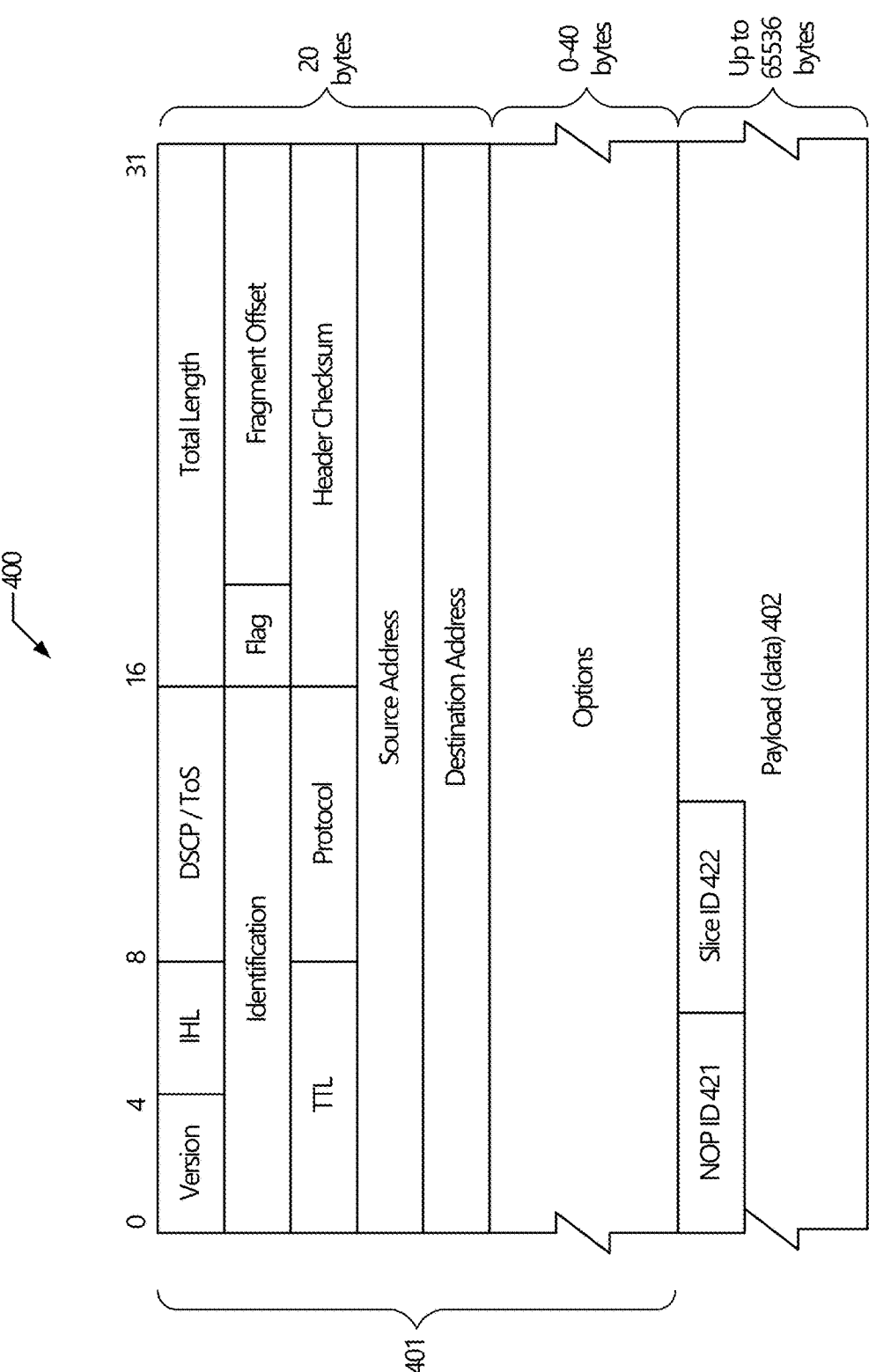
FIGS. 4 and 5 depict example data packet formats for flow-specific slicing.

FIGS. 4 and 5 show example packets 400 and 500, respectively, that are enhanced to support flow-specific slicing. The example packet 400 is based on an IP version 4 (IPv4) packet format and example packet 500 is based on an IP version 6 (IPv6) packet format, but the examples herein are not limited thereto, and any type of packet format can be used such as, for example, Internet Control Message Protocol (ICMP) packets, Flexilink packets, TCP packets, non-access stratum (NAS) packets, Ethernet packets, and/or any other type of packet or data unit such as any of those discussed herein.

The packet 400 includes a payload (data) section 402 that carries data and a header section 401 that includes various header fields shown by Table IPv4.

TABLE IPv4

| Header Field | Length | Description |
| --- | --- | --- |
| Version | 4 bits | includes a version field to indicate a version of the network protocol (e.g., for IPv4 the value in this field is always '4') |
| Internet Header Length (IHL) | variable | contains the size of the IPv4 header; it has 4 bits that specify the number of 32-bit words in the header. |
| Differentiated Services Code Point (DSCP)/type of service (ToS) | 8 bits | DSCP: specifies differentiated services (DiffServ) per RFC 2474. Real-time data streaming makes use of the DSCP field; can also include Explicit Congestion Notification (ECN) to indicate network congestion. ToS: specifies a priority and request a route for low-latency, high-throughput, or highly-reliable service. |
| Total Length | 16 bits | defines the entire packet size in bytes, including header and data |
| Identification | 16 bits | used for uniquely identifying a group of fragments of a single datagram to which the packet belongs |
| Flag(s) | 3 bits | used to control or identify fragments including: bit 0: reserved bit 1: don't fragment (DF) bit 2: more fragments (MF) |
| Fragment Offset | 13 bits | specifies the offset of a particular fragment relative to the beginning of the original unfragmented datagram in units of eight-byte blocks. |
| Time-to-live (TTL) | 8 bits | Indicates an expiration or lifetime of the packet |
| Protocol | 8 bits | defines the protocol used in the data portion of the packet/datagram |
| Header Checksum | 16 bits | used for error-checking of the header. |
| Source Address | 32 bits | Network address (e.g., IPv4 address) of the sender of the packet |
| Destination Address | 32 bits | Network address (e.g., IPv4 address) of the receiver/destination of the packet |
| Options | variable | Fields and/or parameters used to configure a number of optional parameters or behaviors |

221 and/or DCN infrastructure may store a mapping or other data structure that associates a virtual lane (e.g., a virtual lane 652 of FIG. 6), slice ID (e.g., slice ID 422 of FIG. 4) of the corresponding network slice (e.g., a slice 622 of FIG. 6), and an NOP ID (e.g., NOP ID 421 of FIG. 4) of the NOP 220 providing the network slice. In some implementations, multiple NOPs can be subscribers to the same or different CSPs.

After the e2e QoS channel/construct is created, the devices that are mapped into the slice start communicating traffic to/from the NOP architecture (e.g., (R)AN and CN infrastructure and/or the like). In 3GPP 5G implementations, network traffic (e.g., IP, Ethernet, and/or the like) is directly carried by the N6 interface between a data network (DN) and a user plane function (UPF) (see e.g., [TS23501]). Based on the requested service type, the 5GC will assign/change The payload (data) section 402 includes an NOP ID field 421 and a slice ID field 422. The NOP ID field 421 is used to carry an NOP ID (also referred to as an "NOP ID 421") of the NOP 220 in which the flow-specific slice is configured. As examples, the NOP ID 421 can be a universally unique ID (UUID) assigned to the NOP 220, a PLMN ID of the NOP 220, a random number (or pseudorandom number), a hash value, a digital signature of the NOP 220, a digital certificate of the NOP 220, and/or some other identifier and/or credentials associated with the NOP 220 such as any of those discussed herein or combinations thereof. The slice ID field 422 carries an ID of the flow-specific slice (also referred to as a "slice ID 422"). As examples, the slice ID 422 can be a UUID assigned to the flow-specific slice, an NSI ID, a configured NSSAI, an S-NSSAI, a 5QI, a hash value, a random number (or pseudorandom number), and/or some other data or identifier such as any of those discussed herein or combinations thereof. The NOP ID 421 and/or slice ID 422 can be generated and/or assigned by any suitable entity such as a subscriber to an NOP and/or CSP, the NOP 220 itself, a CSP, a certificate authority, and/or some other entity.

The size of the NOP ID field 421 and the slice ID field 422 may be variable in length based on the type of IDs used and/or the size of such IDs. In this example, the NOP ID field 421 and the slice ID field 422 are located in the first byte (bits 0-16) of the payload (data) section 402 of the packet 400. However, in other implementations, the NOP ID field 421 and the slice ID field 422 can be located in other parts/sections of the payload (data) section 402. Additionally or alternatively, the NOP ID field 421 and the slice ID field 422 can be located in the options section, wherein a new or existing options classes can be configured to carry the NOP ID field 421 and the slice ID field 422.

The packet 500 includes a payload (data) section 502 that carries data and a header section 501 that includes various header fields shown by Table IPv6.

characteristics, which can include, for example, destination address, port number, DSCP value, flow label, and/or the like. The particular fields to used can be predefined or configured by an NOP, service provider, or service consumer. If the values/data in the predefined or configured fields match for two different QoS levels, the NF/AF may sniff the payload deeper for other information to use. If not possible due to encryption (e.g., IPsec or the like), some kind of traffic classification may be used.

Once the traffic is translated from the access network format into a higher-layer traffic packet format (e.g., 5G traffic translated into network packets (e.g., IP packets), transport packets, and/or the like), the backbone/core (or NF or AF within the backbone or core network) automatically inserts or adds the metadata into the packets so that the packets can be used by the next level (e.g., an DCN) to map the packets into the appropriate virtual channel (e.g., a virtual lane 652 of FIG. 6). This can be useful if, for example, the QoS parameters/characteristics of the egress packets are not already known. The packets may include 2.b/c. For example, the network building block may not have TABLE IPv6

| Header Field | Length | Description |
|---|---|---|
| Version | 4 bits | includes a version field to indicate a version of the network protocol (e.g., for IPv6 the value in this field is always '6') |
| Traffic Class | 8 bits | Six most significant bits hold a DSCP value and remaining two bits contain ECN value (see Table IPv4) |
| Flow Label | 20 bits | A high-entropy identifier of a flow of packets between a source and destination. |
| Payload Length | 16 bits | Includes size of the payload in octets, including any extension headers |
| Next Header | 8 bits | Specifies the type of the next header. |
| Hop Limit | 8 bits | Replaces the TTL field in IPv4. This value is decremented by one at each forwarding node and the packet is discarded if it becomes 0. |
| Source Address | 128 bits | Network address (e.g., IPv6 address) of the sending node |
| Destination Address | 128 bits | Network address (e.g., IPv6 address) of the destination node |

The payload (data) section 502 includes zero or more extension headers, an NOP ID field 421 and the slice ID field 422. The extension header(s) carry optional internet layer information and are placed between the fixed header 501 and an upper-layer protocol header. The NOP ID field and the slice ID field may be the same or similar as the NOP ID field 421 and the slice ID field 422 discussed previously. In this example, the NOP ID field 421 and the slice ID field 422 are located in the first byte (bits 0-16) of the payload (data) section 502 of the packet 500. In other implementations, the NOP ID field 421 and the slice ID field 422 can be located in other parts/sections of the payload (data) section 502. In other implementations, the NOP ID field 421 and the slice ID field 422 can be included in an extension header such as, for example, a routing extension header (e.g., next header field value of 43), a mobility extension header (e.g., next header field value of 135), or a new extension header specifically designed for flow-specific slices (e.g., next header field value of 253 or 254 used for experimentation/ testing).

Referring back to FIG. 3, the declaration of a service type and QoS characteristics are done by the initiating service/ application (see step 3.1). The addition of metadata (e.g., the NOP ID 421 and the slice ID 422) at the backbone or 5GC can be performed by an NF or application function (AF) using a mapping or other correspondence of ingress packets (e.g., packets 400, 500) to a corresponding set of QoS parameters/characteristics. The NF/AF can use information in the packets to match the packets to QoS parameters/ any specific resource allocated for a slice (e.g., a slice 622 of FIG. 6). In this case it will reach to an DCN management entity (e.g., orchestrator or infrastructure element) in order to retrieve the properties of that slice. In some implementations, it may let the packet continue, but it may also create some resource allocation or use a default/temporal virtual lane definition for that slice and/or NOP 220 if more packets are coming. In some implementations, it may remove the temporal virtual lane after some time of not being used (e.g., a predefined or configured idle time). The information may be stored in any case.

In the example of FIG. 3, a static circumstance is assumed wherein the devices are statically bound to a particular access network. However, in many cases, devices may move or have a certain mobility pattern/characteristic, or the service type and/or QoS characteristics/parameters may change. The example of FIG. 2 shows an example where device mobility, services, and/or traffic patterns/characteristics may be dynamic.

Referring back to FIG. 2, flow-specific slicing in a dynamic environment can operate as follows. The NOP infrastructure 221 within each NOP domain 220 and/or DCN infrastructure with a DCN (e.g., DCN 640 of FIG. 6) is/are responsible for gathering telemetry data (e.g., system information and/or other data) of their various cores 225, IT infrastructure 226, and/or other hardware and/or software (sub)systems. In this regard, each NOP domain 220 includes a telemetry function 223 (also referred to as "statistics function 223" or the like), which collects the telemetry data and provides it to the DCN (see e.g., telemetry processor 656 of FIG. 6). The telemetry data is then used to determine or identify slices that have similar e2e QoS treatment, QoS characteristics, and/or QoS parameters. The way in which the telemetry data is collected may be based on the implementation and/or deployment model being used. For example, 5G systems can include one or a combination of the following implementations/deployment models: 5G standalone UPF cores 225, distributed UPFs, small cell NANs generating network traffic (e.g., IP traffic) directly, CU/DU split architectures, IAB architectures, and/or the like. The NOP infrastructure 221 (or telemetry functions 223) provide the collected telemetry data to a network management entity (e.g., telemetry processor 656 of FIG. 6 and/or QoS mgmt 642, slicing management function 635 of FIG. 6, the orchestration element 221, NW orchestrator 725, and/or the NSM 743 of FIG. 7). The management entity is responsible for abstracting and/or aggregating the telemetry data including indications of one or more targets (e.g., specific clouds/CSPs, NOPs, and/or DCNs), and provides the telemetry data to the various intermediate tiers such as, for example, different infrastructure connections (e.g., MPLS, DCB, and/or the like), cloud infrastructure, and data center infrastructure (e.g., DCN 640). In some implementations, the telemetry data can be provided to the various intermediate tiers via a UPF for the user plane traffic. In some cases, various end points and intermediate tiers of the e2e path may require information for the various slices or QoS parameters/characteristics on the NOP-side to perform the traffic optimizations discussed previously.

FIG. 6 shows an example reference architecture 600 that includes a set of architectural building blocks for the e2e QoS and/or flow-specific slicing services discussed herein. This set of building blocks can be used by or for the slicing network architectures 200 and/or 300. The e2e system network building blocks 600 include a network (NWs) 620 and a DCN 640. The NW 620 includes one or more (radio) access networks ((R)ANs) and at least one CN. Each (R)AN includes a set of NANs which may be the same or similar as the NAN 340 in FIG. 3, either of the NANs 240-1 and 240-2 of FIG. 2 NANs 930 of FIG. 9, and/or the NAN 1040 of FIG. 10) and the CN may be the same or similar as the CN the CNs 142u, 142c, 142, and/or 142' of FIG. 1, the CN 942 of FIG. 9, and/or the CN 1020 of FIG. 10. Additionally or alternatively, the NW 620 may correspond to either of the NOP domains 220.

The UE 610 operates one or more of N applications (apps) 611 (including app 611-1, app 611-2, . . . app 611-N, where N is a number) to access and/or consume one or more of N services 610 (including service 612-1, service 612-2, . . . service 612-N, where N is a number). Although the example of FIG. 6 shows a same number of apps 611 and services 612, in various implementations, there may be a different number of apps 611 and services 612, for example, where an app 611 can be used to access multiple services 612 and/or multiple apps 611 can be used to access the same service 612. The UE 610 may be the same or similar as the UEs 910 of FIG. 9 and/or any other device/system discussed herein. In some implementations, some or all of the apps 611 can be operated by other devices such as servers and/or other computing devices. Additionally, although the example of FIG. 6 shows the services 612 are shown as being in the DCN 640, in other implementations, some or all of the services 612 may be implemented or operated outside of the DCN 640. In some examples, the services 610 may be provided by a service provider environment (e.g., service provider environment 236 of FIG. 2 and/or service provider domain 736 of FIG. 7).

The NW 620 provides individual network slices 622 for respective services 612. For example, network slice 622-1 corresponds to service 612-1, network slice 622-2 corresponds to service 612-2, and so forth to network slice 622-N which corresponds to service 612-N. As mentioned previously, each network slice 622 can include a set of NFs and supporting resources. In some implementations, the NFs in a network slice 622 can be grouped into one or more network slice subnets. The network slices 622 depicted in FIG. 6 may also represent one or more NSIs and/or one or more network slice subnets. A network slice subnet represents a group of NFs (including their corresponding resources) that form part or complete constituents of a network slice 622. The grouping of the NF(s) allows the management of each group of NFs to be conducted independently of the network slice. A network slice subnet constituent may include one or more NF(s) and/or one or more other constituent network slice subnet(s). A network slice subnet may be shared by one or more network slice subnet(s), or not shared with any other network slice subnet. The NFs in a network slice subnet may be instance(s) of CN NF(s), instance(s) of AN NF(s), or any combination thereof. Additionally, a network slice subnet may have information representing a set of links with capacities to provide connection between NFs (e.g., TN requirements of the network slice subnet) and/or information of the physical, logical, and/or virtualized resources used.

A network slice 622 and/or network slice subnet also has an associated network slice profile, which defines, specifies, or otherwise includes set of requirements (e.g. those derived from SLAs, SLSs, and/or the like) that are applicable to the network slice 622 and/or subnet constituents. The network slice profile may be common (e.g., applicable to all network slice subnet constituents, regardless of their types) or specific (e.g., applicable to only (R)AN NF(s) or only to CN NF(s) network slice subnet constituents). In one example, TN requirements (e.g. set of QoS attributes/characteristics/ parameters for links interconnecting the network slice subnet constituent NFs) may be included in a network slice profile. In some implementations, the network slice profile can include mappings of a network slice 622 (or network slice subnet constituents) to one or more virtual lanes 652 outside of the NW 620 and/or a mapping of the network slice 622 (or network slice subnet constituents) to one or more services 612 (which may or may not be outside of the NW 620).

Additionally or alternatively, a network slice 622 and/or network slice subnet has one or more service profiles, which represents SLAs and/or SLSs of a network slice 622 and/or network slice subnet. In some implementations, an individual service profile corresponds to a specific service (e.g., an individual service 236c). The requirements of the network slice profile may be industry requirements, NOP requirements, and/or service provider environment 236 requirements (e.g., requirements of service 236c). In one example, a service profile is used to capture a set of requirements for service/use case (e.g., requirements for UHD slice 121, requirements for eMBB slice 122, requirements for MIoT slice 123, and/or requirements for URLLC slice 124). In another example, a service profile is used to capture a set of specific industry requirements for creation of network slice 622 such as V2X, smart grid, remote healthcare, and/or the like. In another example, a service profile is used to capture a set of flow-specific requirements for creation of flow-specific slice 662 such any of those discussed herein.

The NW 620 includes a slicing orchestrator 625 that provides e2e QoS slicing services for various user/application services 612. The slicing orchestrator 625 may also be referred to as "orchestrator 625", "slice controller 625", "slicing function 625", "slicer 625", and/or the like. In some examples, the orchestrator 625 may be the same or similar as the orchestrators 236a, 645, 725, 736a, 1160, 1231 and/or container managers 1211, 1221 discussed herein. The orchestrator 625 includes a monitoring function ("monitor") 631, one or more transformation function(s) ("transformer(s)") 632, QoS configurations 633, one or more interfaces 634, and a slicing management function ("slicing mgmt") 635. The QoS configurations 633 may include the QoS parameters, characteristics, and/or requirements of individual network slices 622 as discussed previously. The interfaces 634 may include front haul interfaces (e.g., between the UEs 610 and ANs or individual NANs), mid-haul interfaces (e.g., between different ANs and/or NFs in an NW 620), and/or backhaul interfaces (e.g., between the NW 620 and the DCN 640).

The monitor 631 monitors or otherwise gathers metrics, measurements, KPIs, and/or other aspects of individual network slices 612, which may be based on one or more SLAs. Additionally or alternatively, the monitor 631 monitors or otherwise gathers metrics/measurements (e.g., KPIs, radio condition data, and/or any other network-related data such as any of those discussed herein) and telemetry data (e.g., system information and/or other data) of various cores 225, IT infrastructure 226, and/or other hardware and/or software (sub)systems as discussed previously (see e.g., FIG. 2). The transformer(s) 632 can include functions that translate or transform access network traffic into higher-layer traffic (e.g., network packets, and/or the like). Additionally or alternatively, the transformer(s) 632 may include the transformation functions and exposure gateways discussed previously with respect to FIG. 2.

The slicing mgmt 635 provides slicing management services within a slicing management framework. The slicing management framework includes, for example, standardized management service interfaces (e.g., including interface(s) 634) for the network slicing management services and NF management services; and a set of slicing management functions to manage NF(s) in individual network slices 612. In some implementations, a CSP and/or NOP can provide an NSaaS to its subscribers or CSCs, which allows the subscribers/CSCs to use the network slice as the end user or optionally allows CSC to manage the network slice as manager via management interface exposed by the CSP. The network slicing management services are capable of supporting various NOP deployment options to support diverse use cases, applications, and/or use cases, as well as various management services applicable to various NFs.

The provisioning of network slicing and/or slicing management services can include multiple phases, such as a preparation phase, a commissioning phase, an operation phase, and a decommissioning phase. In the preparation phase, the NSI does not exist. The preparation phase includes network slice design, network slice capacity planning, on-boarding and evaluation of NFs in the network slice 612, preparing the network environment, and/or other necessary preparations required to be done before the creation of an NSI. During an NSI lifecycle stage, which includes the commissioning, operation, and decommissioning phases, the NSI provisioning operations include creating an NSI (commissioning phase); activating an NSI (operation phase); de-activating an NSI (operation phase); modifying an NSI (operation phase); and terminate an NSI (decommissioning phase). Similarly, provisioning for network slice subnet instance includes the following operations: NSSI creation; NSSI activation and associating it with certain NSI to be used by the NSI; disassociating the NSSI with certain NSI and de-active the NSSI if it's not associated with any NSI; NSSI modification; and NSSI termination.

The commissioning phase includes creation of an NSI. During NSI creation all resources allocated for the NSI have been created and configured to satisfy the network slice requirements. NSI creation may trigger NSSI(s) creation or using existing NSSI(s) and setting up the corresponding associations.

The operation phase includes the activation, supervision, performance reporting (e.g. for SLAs and/or KPI monitoring by the monitor 631), resource capacity planning, modification, and de-activation of a NSI. For example, during the operation phase, the slicing mgmt 635 can adjust the resources allocated to individual slices 622 (e.g., allocate more or fewer resources) based on monitored/collected telemetry data (e.g., from telemetry function(s) 223, 333) and/or metrics/measurements and/or KPIs of the individual network slices 622. NSI activation includes any actions that make the NSI active to provide communication services. NSI activation may trigger NSSI activation. NSI modification in operation phase could map to several workflows, e.g. changes of NSI capacity, changes of NSI topology, NSI reconfiguration. NSI modification can be triggered by receiving new network slice related requirements, new communication service requirements, or the result of NSI supervision automatically. NSI modification may trigger NSSI modification. The NSI deactivation operation may be needed before NSI modification operation and the NSI activation operation may be needed after the NSI modification operation. NSI deactivation includes any actions that make the NSI inactive and not providing any communication services. NSI deactivation trigger NSSI deactivation to deactivate constituent NSSI(s) which is not used by other NSI(s). Operator may decide to keep the NSI without termination after deactivation and reactivate it when receives new communication service request.

The decommissioning phase includes terminating the NSI, which includes any action that makes the NSI not exist anymore and releasing resources that are not used by other NSI(s). NSI termination can involve decommissioning of non-shared constituents/elements (if required) and removing the NSI specific configuration from the shared constituents/elements. After the decommissioning phase, the NSI is terminated. NSI termination may trigger NSSI termination to terminate constituent NSSI(s) which is not used by other NSI(s).

The information that can be used to describe an NSI may include resource model information, management model information, and capability model information. The resource model information describes static parameters and functional components of a network slice 622 such as, for example, a service profile, a network slice type (e.g. UHD, eMBB, URLLC, mMTC, mIoT, and/or the like), additional system features (e.g. multicast, edge computing, and/or the like), and priority information. In some implementations, the resource model information may be enhanced to include QoS parameters/requirements for a corresponding service-specific flow 662. The management model information includes information that is used for network slice lifecycle management such as configuration profiles (e.g., application configuration parameters). The capability model information describes slice capabilities including, for example, supported communication service characteristic information (e.g., service type, UE mobility level, density of users, traffic density), QoS attributes (e.g., bandwidth, latency, throughput, and the like), capacity (e.g., maximum number of UEs), and/or other capabilities of an NSI and/or capabilities that can be exposed to a CSC and/or can be used for provisioning a service-specific flow 662.

The information that can be used to describe a network slice subnet instance may include resource model information, management model information, and capability model information. The resource model information of a network slice subnet describes the static parameters and functional component(s) of the network slice subnet such as, for example, slice profile, network slice subnet type (e.g. RAN eMBB, CN eMBB, and so forth), additional system features (e.g., multicast, edge computing, and the like), priority, QoS attributes (e.g., bandwidth, latency, number of subscribers and soon), Network Service Descriptor (NSD) ID, and/or the like. The management model information describes the information model that is used for network slice subnet lifecycle management such as, for example, configuration profile (e.g., application configuration parameters) and the like. The capability model information describes the capabilities of the network slice subnet such as, for example, supported communication service characteristic information (e.g. service type, UE mobility level, density of users, traffic density, and the like), QoS attributes (e.g., bandwidth, latency, throughput and so on) and capacity (e.g., maximum number of UEs), and/or other capabilities of the network slice subnet.

Additionally or alternatively, the slicing mgmt 635 also manages AN and CN instances within the NW 620, and coordinates with other management systems/functions outside of the NW 620 to manage non-NW 620 functions/elements. The non-NW 620 functions/elements include, for example, TN and/or data center (e.g., DCN 640) elements. The slicing mgmt 635 provides network slice requirements to the corresponding management systems/functions of the non-NW 620 functions/elements. Examples of the network slice requirements include topology requirements, QoS configurations 633 (e.g., QoS attributes, characteristics, parameters, and/or requirements for individual TN links, fronthaul links, and/or backhaul links), SLAs, SLSs, and/or other relevant information. Additionally or alternatively, the slicing mgmt 635 operates and/or manages the slicing technology used to create and manage the NSIs. Examples of the slicing technologies can include 3GPP 5G network slicing technologies; OTN with Optical Channel Data Unit-k (ODUk) and/or Optical Channel Payload Unit-k; hierarchical QoS (HQoS); Ethernet channelized sub-interface; Flexible Ethernet (FlexE); generic network slice templates (see e.g., *Generic Network Slice Template*, GSMA Permanent Reference Document (PRD) NG.116 v7.0 (17 Jun. 2022), the contents of which are hereby incorporated by reference in its entirety), and/or the like.

In various implementations, the slicing mgmt 635 is responsible for abstracting and/or aggregating the monitored/collected telemetry data, and provides the telemetry data to identified service provider environments 236 (e.g., specific clouds and/or edge networks hosting the services 236c). After a service 236c is deployed in the service provider environment 236, the slicing mgmt 635 may attach, map, assign, or otherwise associate that service 236c with a network slice 622 or multiple network slices 622 in the NW 620. Here, the service provider environment 236 may be part of the NW 620, the DCN 640, or a separate platform (e.g., an edge network such as any of those discussed herein). Before, after, or concurrently with the service 236c being matched to the network slice 622, the network slice 622 is attached, mapped, assigned, or otherwise associated with a virtual lane 652 or multiple virtual lanes 652. The slicing mgmt 635 may also provide the telemetry data to various intermediate tiers such as, for example, different infrastructure connections (e.g., interfaces 634 and/or 643), cloud infrastructure, DCN 640, and/or the like.

The DCN 640 includes infrastructure/equipment such as, for example, servers (e.g., rack mount, blade mount, and/or the like), data processing units (DPUs) and/or infrastructure processing units (IPUs), hardware accelerators and/or accelerator pools, NICs and/or smartNICs, routers, bridges, switches, relays, network fabrics, network appliances, gateways devices, cooling plant, and/or the like. Additionally or alternatively, the infrastructure/equipment in the DCN 640 may be arranged in any suitable topology such as, for example, basic tree, fat-tree, Leaf-Spine, clos network, VL2, JellyFish, DCell, BCube, Xpander, FiConn, Scafida, and/or the like. In some examples, the DCN 640 is owned or operated by a DCSP. The DCSP may be a CSP that provides cloud computing services. Additionally or alternatively, the DCSP may be an edge computing service provider and the DCN 640 may be an edge data center or represent an edge computing network (see e.g., edge layer 937 of FIG. 9) that is deployed at or near one or more NANs (e.g., NANs 930 of FIG. 9). For example, the DCN 640 may be a containerized data center housed within one or more shipping containers or other like enclosure(s) that can be deployed at various locations. In any of these examples, at least some of the DCN resources and/or infrastructure/equipment in DCN 640 may be or host the service provider environment 236 of FIG. 2.

The DCN 640 provides individual virtual lanes 652 for respective network slices 622. For example, virtual lane 652-1 corresponds to network slice 622-1, virtual lane 652-2 corresponds to network slice 622-2, and so forth to virtual lane 652-N which corresponds to network slice 622-N. As examples, the virtual lanes 652 can be DCB virtual lanes, priority-based flow control (PFC) priority groups (see e.g., [IEEE802.1Q]), Fibre Channel (FC) virtual links, virtual LAN (VLAN) channels, and/or the like and/or combinations thereof.

In various implementations, a virtual lane 652 and a network slice 622 are combined, attached, merged, mapped, assigned, or otherwise associated with one another to provide a corresponding flow-specific slice 662 and/or e2e QoS enhancements discussed herein for one or more services 612. For example, flow-specific slice 662-1 comprises network slice 622-1 and virtual lane 652-1, flow-specific slice 662-2 comprises network slice 622-2 and virtual lane 652-2, and so forth to flow-specific slice 662-N comprising network slice 622-N and virtual lane 652-N. In some examples, flow-specific slice 662 may be referred to as a "flow-based slice 662", an "e2e QoS construct 662", an "e2e QoS path 662", and/or the like. In some examples, each flow-based slice 662 includes one network slice 622 and one virtual lane 652. In other examples, a flow-based slice 662 can include a set of one or more network slices 622 and a set of one or more virtual lanes 652. Additionally or alternatively, a flow-based slice 662 can include virtual lanes 652 in different NWs and/or NOP domains (e.g., a first set of network slices 622 of in a flow-based slice 662 can be in NOP domain 220-1 and a second set of network slices 622 of in the flow-based slice 662 can be in NOP domain 220-2). In various implementations, the network slice(s) 622 and virtual lane(s) 652 can be set up when for a flow-specific slice 662 is requested by a subscriber or service consumer. Additionally or alternatively, newly instantiated virtual lane(s) 652 can be mapped or assigned to existing (or already instantiated) network slice(s) 622 to form or otherwise create a flow-specific slice 662 when flow-specific slice 662 creation is requested. Additionally or alternatively, newly instantiated network slice(s) 622 can be mapped or assigned to existing (or already instantiated) virtual lane(s) 652 to form or otherwise create a flow-specific slice 662 when flow-specific slice 662 creation is requested. Additionally or alternatively, existing (or already instantiated) network slice(s) 622 can be mapped or assigned to existing (or already instantiated) virtual lane(s) 652 to form or otherwise create a flow-specific slice 662 when flow-specific slice 662 creation is requested. Additionally or alternatively, existing and/or already instantiated network slice(s) 622 can be merged together and mapped to one or more virtual lane(s) 652 for a flow-specific slice 662. Additionally or alternatively, existing and/or already instantiated virtual lane(s) 652 can be merged together and mapped to one or more network slice(s) 622 for a flow-specific slice 662. In these ways, network slice(s) 622 and virtual lane(s) 652 can be "cobbled together" in various ways to form or create flow-specific slices 662 on an as-needed basis.

The DCN 640 includes a DCN orchestrator 645 that assists in providing e2e QoS slicing for various services 612. The DCN orchestrator 645 may also be referred to as "orchestrator 645", "virtual lane controller 645", "DCB controller 645", "DCB function 645", "DCN management function 645", and/or the like. In some examples, the orchestrator 645 may be the same or similar as any one or more of the orchestrators 236a, 625, 725, 736a, 1160, 1231 and/or container managers 1211, 1221 discussed herein. The DCN orchestrator 645 manages NF and virtual lane aspects, and provides various management services including, for example, provisioning, fault supervision; performance assurance; trace management; file management; application management; communication monitoring; startup, registration, and/or termination/tear-down of PNFs; instantiation and termination/tear-down of VNFs; scaling management services for PNFs and/or VNFs; among many other management services. The DCN orchestrator 645 manages the provisioning, maintenance, (resource) scaling, and termination of individual virtual lanes 652. In various implementations, the DCN orchestrator 645 also handles the mapping or association of network slices 622 and virtual lanes 652 that make up one or more flow-based slices 662.

The DCN orchestrator 645 includes a QoS management function ("QoS mgmt") 642, one or more interfaces 643, feedback generator 644, packet processor 655, and telemetry processor 656. The interfaces 643 may include various backhaul interfaces (e.g., between the NW 620 and the DCN 640, and/or interfaces between various DCN infrastructure elements).

The QoS mgmt 642 configures and manages QoS aspects of flow-based slices 662 and/or virtual lanes 652. This can include scheduling, assigning, and/or prioritizing resources for individual virtual lanes 652 that are mapped to a particular slice 622. The QoS mgmt 642 is configured to implement various QoS mechanisms based on network slice identifiers/identities. For example, the QoS mgmt 642 is capable of instantiating the virtual lanes 652, and mapping, attaching, assigning, or otherwise associating the instantiated virtual lanes 652 with one or more network slices 622 in the NW 6. Additionally or alternatively, the QoS mgmt

642 can dynamically create and manage temporal or temporary virtual lanes 652 when a network slice 622 crosses into an NOP domain that has not been setup with the virtual lane 662. In some implementations, the QoS mgmt 642 labels and/or configures QoS policies/configurations to be aligned with QoS policies/QoS configurations 633 in the NW 620. In some implementations, this may be done when the DCN 640 and/or the QoS mgmt 642 implements differentiated QoS (e.g., based on the DSCP field as shown by FIGS. 4 and 5). Additionally or alternatively, the QoS mgmt 642 can proactively allocate or de-allocate resources to/from a virtual lane 652 based on various factors such as, for example, the amount of load that is seen at the network slicing 662, metrics and/or measurement indicating that SLAs/SLSs are not being met (or are predicted to not be met), and/or other factors.

In some implementations, the QoS mgmt 642 provides an interface for clients/subscribers to query and set network policies for the flow-based slices 662. The network policies define a set of conditions and actions such as allowing specific types of network traffic to be assigned to traffic classes (e.g., DCB traffic classes, PFC priorities, and/or the like) for ingress packets, egress packets, packet processing, and/or prioritized delivery. For example, a condition may define or specify QoS parameters and/or characteristics, and ingress and/or egress packet that match the specified condition are assigned to corresponding action(s). The policy actions can specify a QoS class, priority level, and/or traffic class to which the packets should be assigned, destination ports or addresses, and/or other actions.

The feedback generator 644 generates, measures, and/or collects metrics, measurements, and/or telemetry data of individual slices 622, virtual lanes 652, and/or flow-specific slices 662, and generates feedback based on the metrics, measurements, and/or telemetry data. The feedback generator 644 provides the feedback to the NW 620 to perform various actions to support the flow-specific slices 662. The feedback can include the collected metrics/measurements, hints, status updates, instructions, QoS configuration data, and/or other suitable data that can be used to support flow-specific slices 662. For example, the feedback generator 644 and/or the QoS mgmt 642 may determine that the NW 620 (or a specific NF or (R)AN function) to perform certain optimizations (if possible) for one or more slices 622 depending on various factors (e.g., a current or predicted utilization of one or more interfaces 634 and/or interfaces 643). In this example, the generated feedback can include instructions or indicators to perform the optimizations for the one or more slices 622. This allows the telemetry and/or metrics/measurements of individual slices 622 to be scaled-up or scaled down so that the flow-specific slices 662 can be allocated and/or managed in an efficient manner. Additionally or alternatively, the feedback generator 644 and/or the QoS mgmt 642 may implement various traffic shaping schemes, traffic splitting schemes, traffic switching schemes, traffic steering schemes, compression schemes, and/or the like. This may depend on the functionalities available on the hardware (e.g., CPUs, accelerators, DPUs/IPUs, and/or the like) in the NW 620 and/or in the DCN 640.

The packet processor 655 performs various packet processing functions and/or operates one or more packet processing pipelines. Examples of packet processing functions include packetization; assembly; application of filters, rules, policies, and/or classifiers to data and/or ingress and/or egress packets; checking cycling redundancy codes (CRCs) and/or CRC re-generation; framing; encapsulation; encryption and/or decryption; packet reordering; routing-related tasks; and/or other packet processing functions or tasks. In some examples, the packet processor 655 extracts metadata (e.g., NOP ID 421 and/or slice ID 422) from individual packets as the individual packets enter or exit the DCN 640, and the packet processor 655 applies classifiers, rules, policies, and/or matching criteria can be applied to each packet entering or exiting the DCN 640 to map or assign the individual packets to a flow-specific slice 662. Additionally or alternatively, the packet processor 655 can insert, inject, append, or otherwise add metadata (e.g., NOP ID 421 and/or slice ID 422).

The telemetry processor 656 can store packets/data and/or performance data (e.g., measurements, metrics, statistics, key performance indicators (KPIs), and/or the like), and/or other like data generated and/or otherwise associated with NSIs and/or virtual lane instances 652. In some examples, the NW 620 may include statistics functions and/or telemetry functions (e.g., telemetry function 223, 323) that provide various metrics/measurements and/or telemetry data to the telemetry processor 656. The manner in which the telemetry data, statistics, metrics/measurements, and/or KPIs is collected may be based on the implementation and/or deployment model and/or topology of the NW 620 and/or DCN 640. To store the telemetry data and/or metrics/measurements, the DCN 640 and/or telemetry processor 656 can include any suitable combination of statistics collection elements (and memory/storage circuitry such as any of those discussed herein. Additionally, the telemetry processor 656 can store various sets of telemetry data, statistics, metrics/measurements, and/or KPIs in suitable databases, time-series databases, key-value stores, and/or other data structures. In some implementations, the telemetry processor 656 provides the collected and/or stored telemetry data, statistics, metrics/measurements, and/or KPIs to the QoS mgmt 642, and the QoS mgmt 642 abstracts and/or aggregates the data and provides the abstracted/aggregated data to various intermediate tiers such as, for example, different NW infrastructure nodes, cloud infrastructure, and/or other compute nodes in the DCN 640 via the interfaces 643 and/or the like.

In some implementations, the feedback generator 644, the packet processor 655, and/or the telemetry processor 656 are embodied as one or more stream processors. The stream processor(s) process data directly as it is produced or received, and detect conditions from the data streams within a relatively small time period (e.g., measured in terms of microseconds to minutes). The stream processor(s) can be implemented as software components (e.g., software engines, software agents, artificial intelligence (AI) agents, modules, objects, or other like logical units), as individual hardware elements (e.g., general-purpose processing elements and/or special-purpose processing elements), or a combination thereof. In an example software-based implementation, the stream processor(s) are developed using a suitable programming language(s) and/or development tools/environments, which are executed by one or more processors of one or more computing systems (see e.g., processor circuitry 1452 of FIG. 14). In this example, logic and/or program code of the stream processor(s) may be executed by a single processor or by multiple processing devices. In an example hardware-based implementation, the stream processor(s) are implemented by respective hardware elements, such as GPUs (or floating point units within one or more GPUs), hardware accelerators (e.g., FPGAs, ASICs, DSPs, SoCs, digital signal controllers (DSCs), etc.) that are configured with appropriate logic blocks, bit stream(s), etc. to perform their respective functions, AI accelerating co-processor(s), tensor processing units (TPUs), and/or the like.

In some embodiments, the stream processor(s) may be implemented using stream processor(s), which are systems and/or applications that send or receive data streams and execute the applications or analytics logic in response to detecting events or triggers from the data streams. The stream processor(s) process data directly as it is produced or received and detect conditions from the data streams within a relatively small time period (e.g., measured in terms of milliseconds to minutes). The stream processor(s) may be implemented using any stream/event processing engines or stream analytics engines such as, for example, Apache® Kafka®, Apache® Storm®, Apache® Flink®, Apache® Apex®, Apache® Spark®, IBM® Spade, Nvidia® CUDA™, Intel® Ct™, Ampa™ provided by Software AGO, StreamC™ from Stream Processors, Inc., and/or the like. In some implementations, the stream processor(s) may implement or operate virtual machines (VMs), virtualization containers, or other suitable runtime environment(s) in which various packet processing applications, telemetry analysis applications, and/or other applications may be executed.

Additionally or alternatively, the various elements in orchestrator 625 and/or orchestrator 645 can be implemented as separate virtualization containers, which may be deployed and managed using a suitable containerization technology/framework. Examples of the virtualization/containerization frameworks that can be used include Docker®, Kubernetes®, containerd, Google® Container Engine, and/or any of the other container and/or virtualization technologies discussed herein, or combination(s) thereof. Other combinations of container and orchestration technologies can be used in other implementations. Any of these example implementations can be combined with any of the aforementioned example implementations, and/or any other example implementations discussed herein.

1.2. Flow-Specific Slicing Procedures

Figure 7:
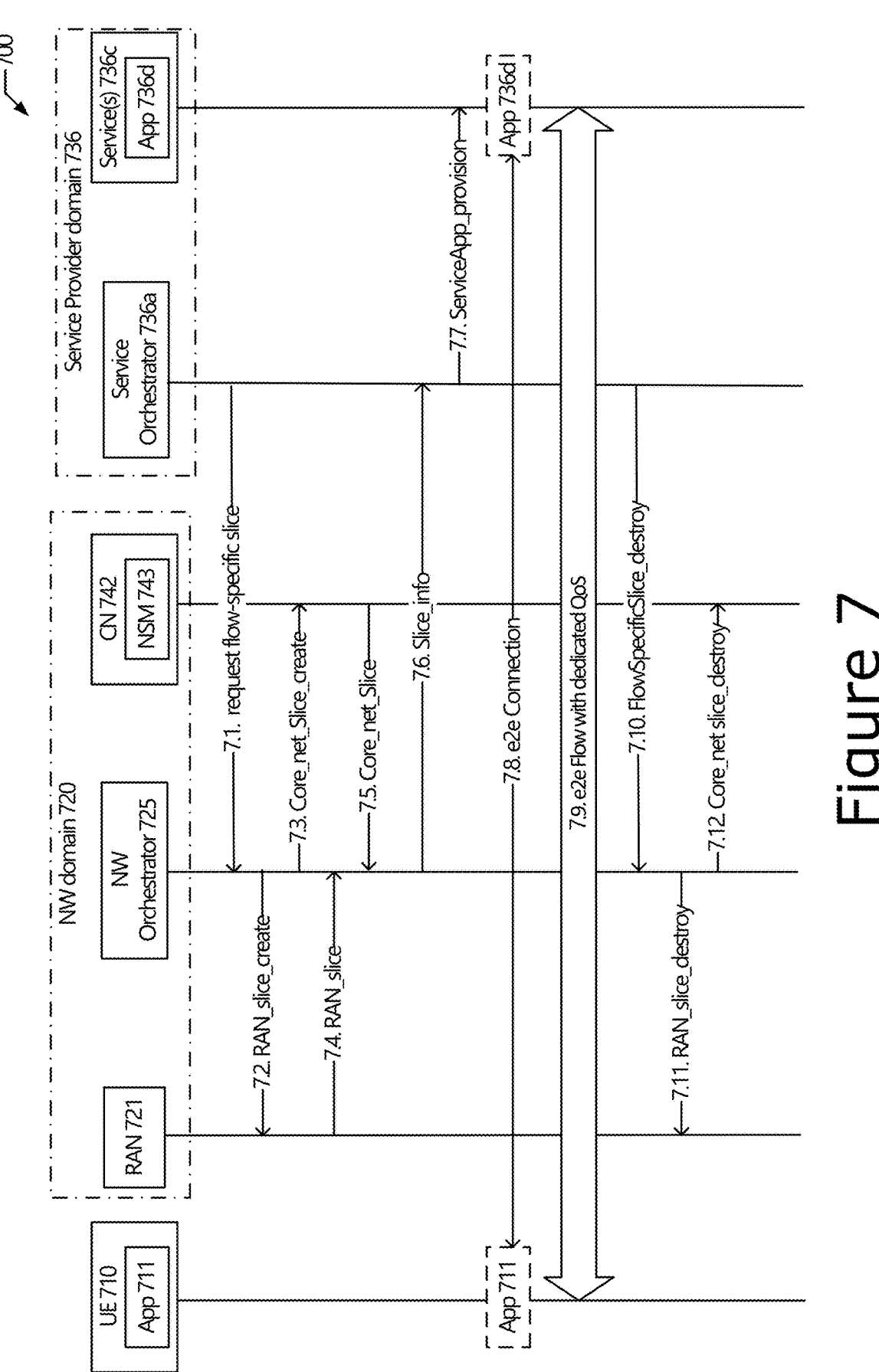
FIG. 7 depicts an example e2e QoS procedure.

FIG. 7 shows an example flow-specific slicing procedure 700, which allows for the creation/termination of flow-specific slicing as opposed to service based QoS in 5G systems. The procedure 700 takes place between a UE 710, a NW domain 720, and a service provider domain 736. The NW domain 720 includes a RAN 721 which may include one or more NANs and/or other network elements/functions, an NW orchestrator 725, and a CN 742 which includes a network slice manager (NSM) 743 or some other NF that handles network slicing, among many other NFs such as those discussed in [TS23501]. The service provider domain 736 includes a service orchestrator 736a and implemented/provisioned service(s) 736c which may be based on one or more applications (apps). Additionally, the UE 710 operates a user/client app 711 that corresponds to the service provider app 736d in the service provider domain 736. Procedure 700 may operate as follows.

At operation 7.1, the service orchestrator 736a sends a request or indicator for a flow-specific slice 662 to the NW orchestrator 725. In some implementations, the request/indicator includes an e2e QoS configuration and/or QoS/slice requirements. For example, the request/indicator can be in the form shown by example instruction [2].

FlowSlice_create(user_info, QoS_info, app_info, duration, ... }    [2]

In example instruction [2], "user info" includes various information related to user 710, "QoS_info" includes the QoS configuration/requirements for the flow-specific slice 662, "app_info" includes information about the service 736c and/or service provider app 736d, and/or the corresponding user/client app 711 related to the flow and/or the flow-specific slice 662, "duration" is a length of time and/or a set of time periods that the flow-specific slice 662 and/or the network slice 622 should be active, and the ellipsis ( . . . ) indicates that additional information may be provided (e.g., thresholds, conditions, variables, filter rules, and/or other parameters). In one example, example instruction [2] can additionally or alternatively include "flow_info", which is or includes a flow configuration and/or a set of parameters/characteristics of a flow to which the flow-specific slice 662 belongs. In some implementations, the QoS and/or flow characteristics can be configured by an NOP or user/subscriber. In some implementations, the service orchestrator 736a or the orchestrator 725 extract flow properties/characteristics of an individual flow. In these ways, a dynamic resolution for the flow-specific slice 662 can be specified. In one example, the QoS configuration and/or flow configuration may indicate that packets belonging to the flow will be sent at 30 millisecond (ms) intervals, and therefore, the network slice 622 and/or the flow-specific slice 662 should be activated every 30 ms. In another example, the QoS configuration and/or flow configuration may specify or define an application-specific or user-specific traffic classification for packets belonging to the flow, and how to identify packets belonging to different classes of the application-specific or user-specific traffic classification. Other configuration options are also possible in various implementations.

Additionally or alternatively, the orchestrator 725 can operate or use one or more machine learning models to derive the QoS/flow characteristics for individual flows. In one example, packets belonging to individual flows may be marked or labeled to instruct or notify the orchestrator 725 to use those packets for training or inference determinations. Additionally, the orchestrator 725 can also send the inferences/predictions to the service orchestrator 736a or other edge/cloud functions, which can then use the inferences/predictions to update or adjust parameters/characteristics of the flow-specific slice 662 and/or update parameters/characteristics of the QoS/flow configurations.

At operation 7.2, the NW orchestrator 725 sends an instruction or indicator to the RAN 721 to create a network slice 622 for the flow-specific slice 662, and at operation 7.3 the orchestrator 725 sends an instruction or indicator to the CN 742 (or NSM 743) to create the network slice 622 for the flow-specific slice 622. The instruction/indicator at operation 7.2 may be in the form shown by example instruction [3], and the instruction/indicator at operation 7.3 may be in the form shown by example instruction [4], where the parameters in the instructions/indicators may be the same or similar to those discussed previously with respect to example instruction [2].

RanSlice_create{user_info, QoS_info, app_info, duration, ... }    [3]

Core_net_Slice_create{user_info, QoS_info, app_info, duration, ... }    [4]

In some implementations, at operation 7.2 the NW orchestrator 725 sends an instruction or indicator to the RAN 721 to allocate one or more existing or already instantiated network slices 622 to the flow-specific slice 662. Additionally or alternatively, at operation 7.3 the NW orchestrator 725 sends an instruction or indicator to the CN 742 (or NSM 743) to allocate one or more existing or already instantiated network slices 622 to the flow-specific slice 662.

At operation 7.4, the RAN 721 performs various operations/tasks to set up a network slice 622 (or allocate existing network slice(s) 622) for the flow-specific slice 662, and sends RAN slice information to the NW orchestrator 725. Similarly, at operation 7.5, the CN 742 (or NSM 743) performs various operations/tasks to set up the network slice 622 (or allocate existing network slice(s) 622) for the flow-specific slice 662, and sends CN slice information to the NW orchestrator 725. The RAN slice information may be in the form shown by example instruction [5], and the CN slice information may be in the form shown by example instruction [6].

RAN_slice{Slice_id, QoS_info, duration, ...}    [5]

Core_net_slice{Slice_id, QoS_info, duration, ... }    [6]

In instructions [5] and [6], the "Slice_id" is an identifier or identity of the network slice 622 (e.g., NSSAI, S-NSSAI, slice ID 422, and/or the like). The "QoS_info" is the QoS flow configuration/characteristics of the network slice 622 (e.g., in a 5G system, this may include a QoS profile provided to the NAN by an SMF, one or more QoS rule(s) and/or QoS Flow level QoS parameters provided by the SMF and intended for the UE 710, and/or one or more uplink and/or downlink packet detection rules (PDRs) provided by the SMF and intended for a UPF). The "duration" indicates a time period or set of intervals during which the network slice 622 will be active or inactive. In some implementations, the RAN slice information and/or the CN slice information can include a service profile and/or a network slice profile of the network slice 622, and/or may include resource model information, management model information, and/or capability information of the network slice 622, an NSI, and/or constituent network slice subnets of the network slice 622.

At operation 7.6, the NW orchestrator 725 compiles, aggregates, or otherwise processes the slice information obtained from the RAN 721 and the CN 742 (or NSM 743), and sends the network slice information to the NW orchestrator 725. The network slice information may be in the form shown by example instruction [7], which may include the same or similar parameters discussed previously with respect to instructions [2], [3], [4], [5], and/or [6].

Slice_info{user_info, app_info, QoS_info, duration, ... }    [7]

In this example, the Slice_info may represent or indicate the resources and/or other network slice aspects that the RAN 721 can reserve for the network slice 622. Sending the Slice_info to the service orchestrator 736a allows the service orchestrator 736a to know which slice parameters can be adjusted or altered. Additionally or alternatively, the example instruction [7] can include the Slice_id received from the NW orchestrator 725. Furthermore, various operations/tasks may be performed by the RAN 721 and/or CN 742 (or NSM 743) to set up network slice 622 before, during, or after performance of operations 7.2, 7.3, 7.4, and/or 7.5.

At operation 7.7, the service orchestrator 736a provisions the various slice information into the service 736c and/or app 736*d*. The provisioning information may be in the form shown by example instruction [8], which may include the same or similar parameters discussed previously with respect to instructions [2], [3], [4], [5], [6], and/or [7].

ServiceApp_provision{user_info, app_info, QoS_info, duration, ...}    [8]

In some examples, the example instruction [8] can also include the Slice_id received from the NW orchestrator 725. Additionally or alternatively, the service orchestrator 736*a* may update a mapping or other data structure to include a mapping or association between the network slice(s) 622 and one or more virtual lanes 652 created for the flow-specific slice 662. The way in which services 736*c* and/or apps 736*d* are provisioned with the slicing information may be implementation-specific, use case-specific, application-specific, and/or based on design choice, and may vary from implementation to implementation. In some examples, a service mesh is employed for provisioning the services 736*c* and/or apps 736*d* with flow/QoS parameters/configuration data. Examples of the service mesh technologies that can be used include Istio (see e.g., FIG. 8), Linkerd, Consul, and/or some other suitable service mesh technology.

After the e2e dedicated resources (e.g., flow-specific slice resources) have been set up at operation 7.7, an e2e connection (e.g., flow-specific slice 662) is established between app 711 and app 736*d* at operation 7.8. In various implementations, the e2e connection (e.g., flow-specific slice 662) may flow between app 711 and app 736*d* through the NW domain 720 and the service provider domain 736. At operation 7.9, an e2e flow with dedicated QoS takes place using the established e2e connection (or through the flow-specific slice 662) where packets belonging to the flow are conveyed or communicated between app 711 and app 736*d*. In various implementations, there can be loopbacks and/or feedback of various statistics, metrics, measurements, KPIs, and/or the like related to the flow-specific slice 662, which can be fed to the service orchestrator 736*a* and are used to update or adjust the QoS/flow parameters of the flow-specific slice 662 during the e2e flow with dedicated QoS. In these ways, the QoS/flow parameters of the flow-specific slice 662 are more adaptive and rapidly deployable in comparison to existing slicing technologies, which allows the flow-specific slice 662 to be expanded or otherwise scaled in a more efficient manner than existing slicing technologies, and beyond the traditional latency and throughput calculations used by existing slicing technologies. In particular, the flow-specific slice 662 can be heterogeneous and/or multidimensional, which is not possible for existing slicing technologies.

When the e2e flow with dedicated QoS is completed, the e2e connection (or flow-specific slice 662) can be terminated by performing operations 7.10, 7.11, and 7.12. At operation 7.10, the service orchestrator 736*a* sends an instruction, command, or indicator to the NW orchestrator 725 to destroy or terminate the e2e connection (or flow-specific slice 662). The termination instruction, command, or indicator sent at operation 7.10 may be in the form shown by example instruction [9], which may include the slice ID discussed previously with respect to instructions [5], [6], [7], and/or [8].

FlowSpecificSlice_destroy{Slice_id}    [9]

The NW orchestrator 725 sends respective termination instructions, commands, or indicators with the slice ID to the RAN 730 and/or the CN 742 (or NSM 743). The termination instructions, commands, or indicators with the slice ID to the RAN 730 and/or the CN 742 (or NSM 743) may be in the form shown by example instructions [10] and [11], respectively, which include the slice ID discussed previously with respect to instructions [5], [6], [7], [8], and/or [9].

RanSlice_destroy{Slice_id}    [10]

Core_net_Slice_destroy{Slice_id}    [11]

In FIG. 7, the instructions [2], [3], [4], [5], [6], [7], [8], [9], [10], and/or [11] may be conveyed using any suitable APIs, web services, and/or interfaces between the NW domain 720 and the service provider domain 736, and/or using various APIs, web services, and/or interfaces between the elements within the NW domain 720 and among elements in the service provider domain 736. Additionally, in some examples, the NW orchestrator 725 may be a RAN orchestrator, a CN orchestrator, or some other NF that handles orchestration functions. Additionally or alternatively, the service provider domain 736 may be, or may be implemented in or by a cloud computing environment and/or an edge computing network, and the service provider orchestrator 736*a* may be a cloud orchestrator, an edge computing orchestrator, a container orchestrator, and/or one or more virtualization technologies. Additionally or alternatively, the service provider app 736*d* may be a cloud native application. Additionally or alternatively, the UE 710 may be the same or similar as the end point devices 160, 1060 and/or UEs 910, the NW orchestrator 725 may be the same or similar as the orchestrator 625, container manager 1211, 1221, and/or container orchestrator 1231, and the service provider orchestrator 736*a* may be the same or similar as the orchestrator 236*a*, container manager 1211, 1221, and/or container orchestrator 1231.

In any of the examples discussed herein, any of the orchestrators 236*a*, 625, 645, 725, 736*a* may be embodied as one or more (or a collection of) network functions (NFs) that provide slicing functionality such as, for example, a Network Slice Admission Control Function (NSACF), Network Slice-specific and SNPN Authentication and Authorization Function (NSSAAF), Network Slice Selection Function (NSSF), Network Slice Management Function (NSMF), Network Slice Subnet Management Function (NSSMF), and/or other NFs such as those discussed in relevant 3GPP standards/specifications such as [TS23501], [TS28533], 3GPP TS 28.530 v17.2.0 (2021 Dec. 23) ("[TS28530]"), 3GPP TS 28.531 v17.42.0 (2022 Jun. 16) ("[TS28531]"), and/or the like. Additionally or alternatively, any of the orchestrators 236*a*, 625, 645, 725, 736*a* may encompass one or more (or a collection of) other network slice functions such as an IETF Network Slice service provider and/or IETF Network Slice Controller (NSC), and/or an IETF 5G E2E Network Slice Orchestrator as discussed in Geng et al., *5G End-to-end Network Slice Mapping from the view of Transport Network*, IETF Network Working Group, draft-geng-teas-network-slice-mapping-05 (7 Mar. 2022), https://www.ietf.org/archive/id/draft-geng-teas-network-slice-mapping-05.html ("[IETF-Geng]") and Farrel et al., *Framework for IETF Network Slices*, IETF Network Working Group, draft-ietf-teas-ietf-network-slices-14 (3 Aug. 2022), https://www.ietf.org/archive/id/draft-ietf-teasetf-network-slices-14.html ("[IETF-Farrel]"), the contents of each of which are hereby incorporated by reference in their entireties. Additionally or alternatively, the NW orchestrator 725 and/or service orchestrator 736*a* may be the same or similar as the Intelligent Network Slice Manager (INSM) discussed in Int'l App. No. PCT/US2022/035759 filed on Jun. 30, 2022 ("['759pct]"), the contents of which is hereby incorporated by reference in its entirety and for all purposes.

Additionally or alternatively, one or more of the orchestrators 236*a*, 625, 645, 725, 736*a* can be deployed at or in a RAN such as in or by a central unit (CU) of a CU/DU split architecture (see e.g., [TS38401] and ['658]), in a network access node (NAN) such as at or co-located with a DU of a CU/DU split architecture (see e.g., [TS38401] and ['658]), and/or the like. Additionally or alternatively, one or more of the orchestrators 236*a*, 625, 645, 725, 736*a* may be implemented as a service management and orchestration (SMO) entity, a RAN Intelligent Controller (RIC) (see e.g., [O-RAN]), and/or some other like entity/element. For example, some or all of the functionalities of one or more of the orchestrators 236*a*, 625, 645, 725, 736*a* can be implemented as one or multiple xApps located at Near-Real-Time (RT) RAN Intelligent Controller (RIC) and/or one or multiple rApps at Non-RT RIC in O-RAN framework (see e.g., [O-RAN]). In one example implementation, the NW orchestrator 725 can be implemented as a near-RT RIC and the service orchestrator 736*a* can be implemented as an O-RAN SMO. In another example implementation, the NW orchestrator 725 can be implemented as a near-RT RIC and the service orchestrator 736*a* can be implemented as a non-RT RIC. In another example implementation, the NW orchestrator 725 can be implemented as a non-RT RIC and the service orchestrator 736*a* can be implemented as an O-RAN SMO.

Additionally or alternatively, one or more of the orchestrators 236*a*, 625, 645, 725, 736*a* is/are deployed at an edge compute node (e.g., edge compute node 936 in FIG. 9). For example, one or more of the orchestrators 236*a*, 625, 645, 725, 736*a* can be implemented as an edge application (app) such as a MEC app operating in a MEC host (see e.g., [MEC]), an Edge Application Server (EAS) and/or Edge Configuration Server (ECS) in a 3GPP edge computing framework (see e.g., [SA6Edge]), or as a management function based on Zero-touch System Management (ZSM) architecture (see e.g., ETSI GS ZSM 001 V1.1.1 (2019 October), ETSI GS ZSM 002 v1.1.1 (2019 August), ETSI GS ZSM 003 v1.1.1 (2021 June) ETSI GS ZSM 009-1 V1.1.1 (2021 June), ETSI GS ZSM 009-2 V1.1.1 (2022 June), ETSI GS ZSM 007 V1.1.1 (2019 August) (collectively referred to as "[ZSM]"), the contents of each of which are hereby incorporated by reference in their entireties). Additionally or alternatively, one or more of the orchestrators 236*a*, 625, 645, 725, 736*a* can be implemented as, or embodied as, an ONAP module in the Linux Foundation® Open Network Automation Platform (ONAP) (see e.g., ONAP Architecture, Rev. 9e77fad2 (updated 7 Jun. 2022), https://docs.onap.org/en/latest/guides/onap-developer/architecture/index.html, the contents of which are hereby incorporated by reference in its entirety). The various orchestration concepts described in the present disclosure can be applied to any or all of the aforementioned frameworks.

Figure 8:
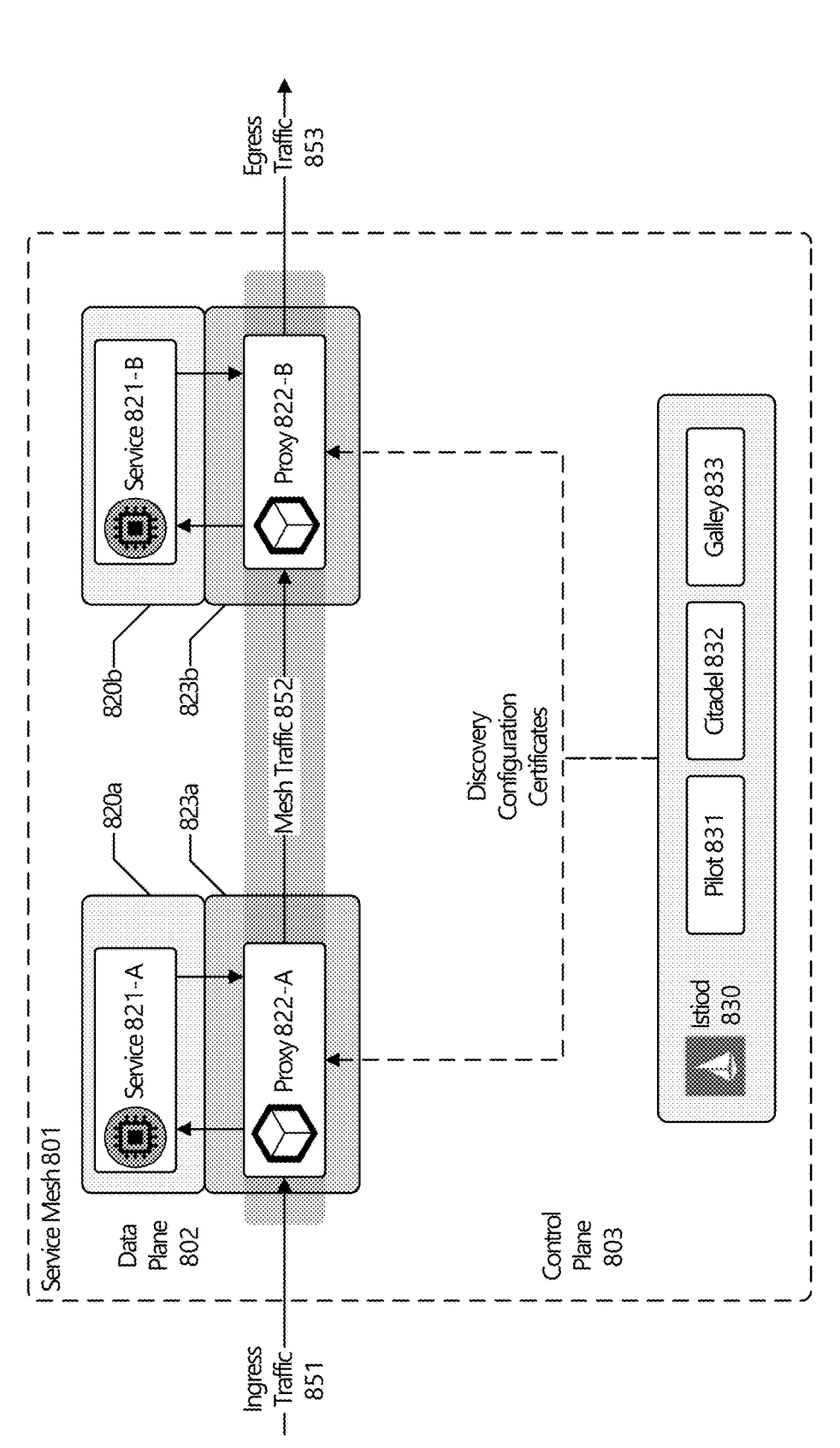
FIG. 8 depicts an example service mesh architecture.

FIG. 8 shows an example service mesh architecture 800, which may be used in various implementations discussed herein. The service mesh architecture 800 is based on the Istio architecture discussed in the *Istio documentation*, version 1.14.3 (2022), https://istio.io/v1.14.3/docs/, the contents of which is hereby incorporated by reference in its entirety and for all purposes. However, other service mesh technologies can be used such as any of those discussed herein.

The service mesh architecture 800 includes a service mesh 801. The service mesh 801 (also referred to as Istio mesh 801 or mesh 801) is an infrastructure layer that enables managed, observable and secure communication between workload instances. A workload instance, at least in some examples, is a single instantiation of a workload's binary, and a workload is a binary deployed by one or more operators to deliver some function of a service mesh application. Workloads have names, namespaces, and unique IDs. In some examples, operators are methods of packaging, deploying, and managing a containerized application (e.g., a Kubernetes® application and/or the like). In some examples, the service 236*c* and/or service 736*c* discussed previously may be workload instances.

A workload instance can expose zero or more service endpoints, and can consume zero or more services (e.g., services 821-A and services 821-B in FIG. 8). At least in some examples, a service 821 is, or includes, a delineated group of related behaviors within the service mesh 801. Services 821 are identified using a service name, which are used to apply Istio policies such as, for example, load balancing and routing. A service 821 can be materialized by one or more service endpoints (e.g., a network-reachable manifestation of a service 821), and may include one or multiple service versions (e.g., a distinct variant of a service 821, which can be backed by different versions of a workload binary). In this example, each service 821 is deployed within a respective container 820 (including container 820*a* and 820*b* in FIG. 8). As an example, at least one of the services 821 may correspond to the service 236*c* and/or service 736*c* discussed previously. The containers 820 may be implemented using any suitable containerization technology such as, for example, Kubernetes™, Docker™, Linux Containers (LXC), Solaris containers, Microsoft® Hyper-V containers, and/or any other suitable containerization technology such as any of those discussed herein. Additionally, each container 820 may use the same or different containerization technologies from one another. Workload instances have a number of properties including, for example, a name and namespace; unique ID; network address (e.g., IP address and/or the like); labels; principal.

The service mesh 801 is logically split into a data plane 802 and a control plane 803. The data plane 802 is the part of a mesh 801 that directly controls communication between workload instances. The control plane 803 includes a set of system services that configure the mesh 801 or a subset of the mesh 801 to manage the communication between the workload instances within the mesh 801. The control plane 803 manages and configures the intelligent proxies 822 to route traffic appropriately.

The data plane 802 includes a set of intelligent proxies 822 (including proxies 822-A and 822-B in FIG. 8) deployed as sidecars to mediate and control traffic that the mesh services send and receive. The intelligent proxies 822 mediate and/or control some or all network communication between services 821 and/or microservices (also referred to as "microservices 821") (e.g., the mesh traffic 852 between proxies 822-A and 822-B). The intelligent proxies 822 also collect and report telemetry on some or all mesh traffic 852. In this example, each proxy 822 is deployed within a respective container 823 (including container 823*a* and 823*b* in FIG. 8). The containers 823 may be implemented using the same or different containerization technology as the containers 820 and/or may use the same or different containerization technologies from one another.

In some examples, the intelligent proxies 822 are implemented as envoy proxies (also referred to herein as "envoys 822") (see e.g., Envoy documentation, version 1.23 (15 Jul. 2022), https://www.envoyproxy.io/docs/envoy/v1.23.0/(" [Envoy]"), the contents of which is hereby incorporated by reference in its entirety and for all purposes). Envoy is a high level (e.g., L7) proxy and communication bus designed for relatively large modern service oriented architectures (SOAs). Envoy can be used to mediate inbound traffic (e.g., ingress traffic 851) and outbound traffic (e.g., egress traffic 853) for various services 821 in the service mesh 801. In some implementations, envoy proxies 822 are the only components that interact with data plane traffic.

In some implementations, envoy proxies 822 are deployed as sidecars to services 821, logically augmenting the services 821 with other features such as, for example, dynamic service discovery, load balancing, transport layer security (TLS) termination, HTTP/2 and gRPC proxies, health checks, staged rollouts with percentage-based traffic split, rich metrics, traffic control features (e.g., enforcement of fine-grained traffic control with rich routing rules for HTTP, gRPC, WebSocket, and TCP traffic), network resiliency features (e.g., setup retries, failovers, circuit breakers, and fault injection), security and authentication features (e.g., enforcement of security policies and enforcement of access control and rate limiting defined through the configuration API(s)), and/or pluggable extensions model based on WebAssembly that allows for custom policy enforcement and telemetry generation for mesh traffic 852. The sidecars may be sidecar containers, which extend and enhance a main container and share resources like pod storage, storage volumes, network interfaces, and the like. The main and sidecar containers also share a pod network, allowing them to communicate with each other on the same network using localhost or the pod's network address thereby reducing latency between the two containers. This sidecar deployment allows Istio to enforce policy decisions and extract rich telemetry which can be sent to monitoring systems to provide information about the behavior of the entire mesh 801. The sidecar proxy model also allows Istio capabilities to be added to an existing deployment without requiring re-architecting or code rewrites.

The control plane 803 includes an Istiod component 830. The Istiod 830 provides service discovery, configuration, and certificate management. In some implementations, the Istiod 830 converts high level routing rules that control traffic behavior into envoy-specific configurations, and propagates them to the sidecars at runtime. In this example, the Istiod component 830 is a consolidated control plane binary that encapsulates the following functions (or microservices): pilot 831, a citadel 832, and a galley 833.

The pilot 831 provides service discovery for the Envoy sidecars, traffic management capabilities for intelligent routing (e.g., A/B tests, canary rollouts, and/or the like), and resiliency (timeouts, retries, circuit breakers, and/or the like). The pilot 831 programs the envoy proxies 822, which are responsible for service discovery, load balancing, and routing. The pilot 831 converts high level routing rules that control traffic behavior into Envoy-specific configurations, and propagates them to the sidecars at runtime. The pilot 831 abstracts platform-specific service discovery mechanisms and synthesizes them into a standard format that a sidecar can consume. Istio can support discovery for multiple environments such as containers (e.g., Kubernetes containers and/or the like) and/or virtual machines (VMs). The pilot

831 can be configured to refine the envoy configurations to exercise more granular control over the traffic in the service mesh 801 via the Istio traffic management API.

The citadel 832 enables service-to-service and end-user authentication with built-in identity and credential management. The citadel 832 can be used to upgrade unencrypted traffic in the service mesh 801. Using the citadel 832, operators can enforce policies based on service identity rather than on relatively unstable layer 3 or layer 4 network identifiers. The citadel 832 is also responsible for certificate generation. The citadel 832 acts as a certificate authority (CA) and generates certificates to allow secure mutual TLS (mTLS) communication in the data plane 802.

The galley 833 is a component that is responsible for configuration management, which can include, for example configuration validation, ingestion, processing and distribution. The galley 833 is responsible for insulating the rest of the Istio components from the details of obtaining user configuration from the underlying platform (e.g., Kubernetes®, Docker®, and/or the like). The control plane 803 can also include a mixer function/microservice (not shown by FIG. 8), which provides extensibility and/or acts as a policy and telemetry hub. The mixer is a platform-independent component that enforces access control and usage policies across the service mesh 801, and collects telemetry data from the envoy proxies 822 and/or other services 821. The proxies 822 extract request level attributes (e.g., data that describes a property of a specific service request and/or the environment for the request) and sends them to the mixer for evaluation. In some implementations, the mixer may be, or may be replaced with a Proxy WebAssembly (Wasm) plugins.

Traffic management in the service mesh 801 may be based on Istio traffic management services. The Istio traffic management includes virtual services, destination rules, gateways, service entities, and sidecars. A virtual service allows users to configure how requests are routed to a "real" service 821 within the service mesh 801. Each virtual service includes a set of routing rules (also referred to as "traffic rules") that are evaluated in order, which allows a proxy 822 to match each given request to the virtual service to a specific destination within the mesh 801. The routing rules in a virtual service specify how a proxy 822 is to send the virtual service's traffic to appropriate destination(s). Route destinations can be versions of the same service 822 or entirely different services 822. The routing/traffic rules can be configured in combination with gateways (e.g., envoy gateways and/or gateway APIs) to control ingress traffic 851 and egress traffic 853. The destination rules specify conditions and/or actions for traffic for a particular destination. Destination rules are applied after virtual service routing rules are evaluated, and apply to the traffic's "real" destination (e.g., a desired service 821).

The gateways (e.g., envoy gateways and/or gateway APIs) manage inbound and outbound traffic (e.g., ingress traffic 851, mesh traffic 852, and/or egress traffic 853) and can be configured to control the traffic that remains inside the mesh 801 and/or leaves the mesh 801. For example, gateway configurations are applied to standalone envoy proxies that run at the edge of the mesh 801, rather than sidecar envoy proxies 822 running alongside a service 821. A service entry allows entries to be added to a service registry, which allows traffic to be sent to/from external services as if it was that service were inside the mesh 801. Configuring service entries allows you to manage traffic for services running outside of the mesh, including redirect and forward traffic for external destinations, such as APIs consumed from the web, or traffic to services in legacy infrastructure; defining retry, timeout, and fault injection policies for external destinations; and running a mesh service 821 in a VM and/or adding VMs to the mesh 801. Moreover, sidecar configurations allow for the definition of ports and protocols to be permitted by envoy proxies 822 and limiting the set of services that individual envoy proxies 822 can reach.

Based on the example of FIG. 7, the flow-specific slicing information/configuration (see e.g., operation 7.7 in FIG. 7) is provided to the control plane function 830, and then the various parameters, properties, and/or data of the flow-specific slicing information/configuration is applied to a proxy 822 associated with the service 821 associated with the flow-specific slice 662. The control plane function 830 configures the virtual services, destination rules, gateways, service entities, and/or sidecars for the proxies 822 based on the received flow-specific slicing information/configuration data. The proxies 822 use these configurations to control packets for individual flow-specific slices 662. Here, received packets (e.g., ingress traffic 851) may enter an ingress gateway (not shown by FIG. 8), and then be passed to a proxy 822 that is a sidecar of a service 82 corresponding to a flow-specific slice 662. As packets (e.g., ingress traffic 851) flow through the proxy 822, the proxy 822 will compare data included in the packets (e.g., NOP ID 421 and/or slice ID 422) with the configured traffic routing rules and/or destination rules for the flow-specific slice 662. When the data included in the packets matches the traffic routing rules and/or destination rules, the packets are provided to the service 821. The service 821 processes the data, and the data/packets can be routed through the mesh 801 (e.g., as mesh traffic 852) and/or exits the mesh 801 (e.g., egress traffic 853) through an egress gateway (not shown by FIG. 8).

1.3. Example Use Case

As alluded to previously, with the current network slicing paradigms, such as the 3GPP 5G network slicing (see e.g., [TS23501] and [TS38300]), a network slice can be provisioned that has a specified QoS treatment (e.g., specified or configured QoS parameters and QoS characteristics). However, these network slices are logical or virtual versions of an entire 5G system including a 5G access network (5G-AN) and 5G Core Network (5GC). However, these network slices may still be too broad for certain applications, services, and/or use cases. For example, some services, applications, and/or use cases may not need to use some 5GC NFs and/or RAN NFs, which would automatically be provisioned in conventional network slices. In another example, some services, applications, and/or use cases may only need to be active for a certain period of time, or for certain time intervals, and therefore, resources allocated to a conventional network slice for those periods/intervals may not be used and are not allocated for other purposes. The present disclosure provides mechanisms for provisioning or otherwise providing flow-specific slices 662, which are more granular than the network slices provided by existing network slicing paradigms.

An example use case for utilizing the flow-specific slices involves control systems, such as those that utilize programmable logic controllers (PLCs) to monitor aspects of one or more amusement rides in an amusement park (or theme park). Examples of such amusement rides include roller coasters, vertical rides (e.g., Ferris wheels), pendulum rides, among many others. The amusement rides include various components such as gondolas or cars that carry passengers (where two or more cars hooked together are referred to as a "train") and ride-dependent components. For example, roller coasters include ride-dependent components such as railroad tracks, launch equipment/systems (e.g., electromagnet, hydraulic, pneumatic, flywheel-based, catapults, and/or friction wheels), chain lifts, braking systems (e.g., block brakes, trim brakes, and the like), mechanical and/or hydraulic car safety systems, and embedded computer system(s). The computer system(s) ensure that there is adequate space between individual cars and/or individual trains to avoid potential accidents, and also control mechanical equipment, especially components of the launch system. In some cases, some amusement rides can incorporate virtual reality (VR) and/or augmented reality (AR) applications into the rides wherein riders/passengers wear VR/AR headsets that consume and display VR/AR images, video, animations, holograms, and the like during the ride.

In this example use case, various PLCs are disposed on or in individual cars and/or on different parts of amusement rides (e.g., along roller coaster tracks, at the arms and/or axels of a pendulum ride, and so forth). In some examples, some or all PLCs are connected to the embedded computer system(s) and/or an electronic system(s) disposed on or in individual amusement ride components. In these examples, a PLC is able to access hardware/system state information, and/or other data generated by the computer and/or the electronic system. Additionally, the PLCs collect data on the amusement ride components to which they are attached/connected, generate status information (e.g., alerts, and/or other data) based on the collected data, and communicate the status information to a centralized control center (also referred to as an "operations center") at the amusement park. The control center includes various compute nodes that monitor the status information received from individual PLCs, and can control the operation of individual amusement rides and/or perform other suitable functions based on the status information. Individuals in the control center monitor the amusement rides based on the status information to ensure that the amusement rides are operating properly and to identify potential failures in the amusement rides.

The compute nodes in the control center operate various applications that evaluate the operational health and/or system diagnostics of the component/parts of amusement rides, and the amusement rides as a whole, to ensure that the amusement rides are safe or otherwise operating as intended. The control center applications and applications/logic operated by individual PLCs are developed in such a way that they generate data/traffic in a known traffic pattern, which could be specific to a particular amusement ride and/or based on other conditions or characteristics of the amusement rides, PLCs, and/or control center compute nodes. The traffic pattern and/or the communication interfaces between the PLCs and the control center may be based on the Common Industrial Protocol (CIP™) or the like.

For example, the traffic pattern may involve each PLC generating and transmitting a safety packet to the control center every 30 ms. Additionally, the safety packets may be assigned a highest QoS class, traffic class, or priority in comparison to packets having other QoS classes, traffic classes, and/or priorities. Furthermore, the safety packets may traverse multiple intermediate nodes and/or take different paths from individual PLCs to the control center.

Here, the safety packets generated and transmitted by one or more PLCs may be assigned to a safety data flow that is mapped to a particular flow-specific slice 662, and the control center applications that evaluate the operational health and/or system diagnostics of the component/parts of amusement rides may be associated with a safety monitoring service 236c, 736c. Additionally, the amusement park owner/operator may be a network slice customer/subscriber to a 3GPP 5G NOP and an edge computing service provider or CSP, and the 3GPP 5G NOP may provision a network slice 622 to the amusement park owner/operator for use by the control center and PLCs. In this example, the amusement park owner/operator may configure or otherwise specify that the safety flow-specific slice 662 should be active at 30 ms intervals such that the safety packets can be communicated throughout the amusement park with little or no interference from other packets associated with other services 236c, 736c. Additionally or alternatively, the amusement park owner/operator may configure or otherwise specify that other packets (e.g., non-safety packets) may be communicated throughout the amusement packet outside of the 30 ms safety intervals with higher latencies (e.g., 210 ms or the like). For example, the flow-specific slice 662 may specify a 30 ms latency requirement for safety packets at 30 ms time intervals, and may prioritize VR and/or AR packets outside of the 30 ms time intervals.

2. Edge Computing System Configurations and Arrangements

Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific HW, security related functions (e.g., key management, trust anchor management, etc.), and other tasks related to the provisioning and lifecycle of isolated user spaces.

Applications that have been adapted for edge computing include but are not limited to virtualization of traditional network functions including include, for example, Software-Defined Networking (SDN), NFV, distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

The present disclosure provides specific examples relevant to various edge computing configurations provided within and various access/network implementations. Any suitable standards and network implementations are applicable to the edge computing concepts discussed herein. For example, many edge computing/networking technologies may be applicable to the present disclosure in various combinations and layouts of devices located at the edge of a network. Examples of such edge computing/networking technologies include [MEC]; [O-RAN]; [ISEO]; [SA6Edge]; Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

FIG. 9 illustrates an example edge computing environment 900 including different layers of communication, starting from an endpoint layer 910a (also referred to as "sensor layer 910a", "things layer 910a", or the like) including one or more IoT devices 911 (also referred to as "endpoints 910a" or the like) (e.g., in an Internet of Things (IoT) network, wireless sensor network (WSN), fog, and/or mesh network topology); increasing in sophistication to intermediate layer 910b (also referred to as "client layer 910b", "gateway layer 910b", or the like) including various user equipment (UEs) 912a, 912b, and 912c (also referred to as "intermediate nodes 910b" or the like), which may facilitate the collection and processing of data from endpoints 910a; increasing in processing and connectivity sophistication to access layer 930 including a set of network access nodes (NANs) 931, 932, and 933 (collectively referred to as "NANs 930" or the like); increasing in processing and connectivity sophistication to edge layer 937 including a set of edge compute nodes 936a-c (collectively referred to as "edge compute nodes 936" or the like) within an edge computing framework 935 (also referred to as "ECT 935" or the like); and increasing in connectivity and processing sophistication to a backend layer 940 including core network (CN) 942, cloud 944, and server(s) 950. The processing at the backend layer 940 may be enhanced by network services as performed by one or more remote servers 950, which may be, or include, one or more CN functions, cloud compute nodes or clusters, application (app) servers, and/or other like systems and/or devices. Some or all of these elements may be equipped with or otherwise implement some or all features and/or functionality discussed herein.

The environment 900 is shown to include end-user devices such as intermediate nodes 910*b* and endpoint nodes 910*a* (collectively referred to as "nodes 910", "UEs 910", or the like), which are configured to connect to (or communicatively couple with) one or more communication networks (also referred to as "access networks," "radio access networks," or the like) based on different access technologies (or "radio access technologies") for accessing application, edge, and/or cloud services. These access networks may include one or more NANs 930, which are arranged to provide network connectivity to the UEs 910 via respective links 903*a* and/or 903*b* (collectively referred to as "channels 903", "links 903", "connections 903", and/or the like) between individual NANs 930 and respective UEs 910.

As examples, the communication networks and/or access technologies may include cellular technology such as LTE, MuLTEfire, and/or NR/5G (e.g., as provided by Radio Access Network (RAN) node 931 and/or RAN nodes 932), WiFi or wireless local area network (WLAN) technologies (e.g., as provided by access point (AP) 933 and/or RAN nodes 932), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 910*b* include UE 912*a*, UE 912*b*, and UE 912*c* (collectively referred to as "UE 912" or "UEs 912"). In this example, the UE 912*a* is illustrated as a vehicle system (also referred to as a vehicle UE or vehicle station), UE 912*b* is illustrated as a smartphone (e.g., handheld touchscreen mobile computing device connectable to one or more cellular networks), and UE 912*c* is illustrated as a flying drone or unmanned aerial vehicle (UAV). However, the UEs 912 may be any mobile or non-mobile computing device, such as desktop computers, workstations, laptop computers, tablets, wearable devices, PDAs, pagers, wireless handsets smart appliances, single-board computers (SBCs) (e.g., Raspberry Pi, Arduino, Intel Edison, etc.), plug computers, and/or any type of computing device such as any of those discussed herein.

The endpoints 910 include UEs 911, which may be IoT devices (also referred to as "IoT devices 911"), which are uniquely identifiable embedded computing devices (e.g., within the Internet infrastructure) that comprise a network access layer designed for low-power IoT applications utilizing short-lived UE connections. The IoT devices 911 are any physical or virtualized, devices, sensors, or "things" that are embedded with HW and/or SW components that enable the objects, devices, sensors, or "things" capable of capturing and/or recording data associated with an event, and capable of communicating such data with one or more other devices over a network with little or no user intervention. As examples, IoT devices 911 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 911 can utilize technologies such as M2M or MTC for exchanging data with an MTC server (e.g., a server 950), an edge server 936 and/or ECT 935, or device via a PLMN, ProSe or D2D communication, sensor networks, or IoT networks. The M2M or MTC exchange of data may be a machine-initiated exchange of data.

The IoT devices 911 may execute background applications (e.g., keep-alive messages, status updates, etc.) to facilitate the connections of the IoT network. Where the IoT devices 911 are, or are embedded in, sensor devices, the IoT network may be a WSN. An IoT network describes an interconnecting IoT UEs, such as the IoT devices 911 being connected to one another over respective direct links 905. The IoT devices may include any number of different types of devices, grouped in various combinations (referred to as an "IoT group") that may include IoT devices that provide one or more services for a particular user, customer, organizations, etc. A service provider (e.g., an owner/operator of server(s) 950, CN 942, and/or cloud 944) may deploy the IoT devices in the IoT group to a particular area (e.g., a geolocation, building, etc.) in order to provide the one or more services. In some implementations, the IoT network may be a mesh network of IoT devices 911, which may be termed a fog device, fog system, or fog, operating at the edge of the cloud 944. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 944 to Things (e.g., IoT devices 911). The fog may be established in accordance with specifications released by the OFC, the OCF, among others. Additionally or alternatively, the fog may be a tangle as defined by the IOTA foundation.

The fog may be used to perform low-latency computation/aggregation on the data while routing it to an edge cloud computing service (e.g., edge nodes 930) and/or a central cloud computing service (e.g., cloud 944) for performing heavy computations or computationally burdensome tasks. On the other hand, edge cloud computing consolidates human-operated, voluntary resources, as a cloud. These voluntary resource may include, inter-alia, intermediate nodes 920 and/or endpoints 910, desktop PCs, tablets, smartphones, nano data centers, and the like. In various implementations, resources in the edge cloud may be in one to two-hop proximity to the IoT devices 911, which may result in reducing overhead related to processing data and may reduce network delay.

Additionally or alternatively, the fog may be a consolidation of IoT devices 911 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

Additionally or alternatively, the fog may operate at the edge of the cloud 944. The fog operating at the edge of the cloud 944 may overlap or be subsumed into an edge network 930 of the cloud 944. The edge network of the cloud 944 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the afore-mentioned edge compute nodes 936 or edge devices). The Fog layer resides on top of the edge layer and is a consoli-dation of networking devices such as the intermediate nodes 920 and/or endpoints 910 of FIG. 9.

Data may be captured, stored/recorded, and communi-cated among the IoT devices 911 or, for example, among the intermediate nodes 920 and/or endpoints 910 that have direct links 905 with one another as shown by FIG. 9. Analysis of the traffic flow and control schemes may be implemented by aggregators that are in communication with the IoT devices 911 and each other through a mesh network. The aggregators may be a type of IoT device 911 and/or network appliance. In the example of FIG. 9, the aggregators may be edge nodes 930, or one or more designated inter-mediate nodes 920 and/or endpoints 910. Data may be uploaded to the cloud 944 via the aggregator, and commands can be received from the cloud 944 through gateway devices that are in communication with the IoT devices 911 and the aggregators through the mesh network. Unlike the tradi-tional cloud computing model, in some implementations, the cloud 944 may have little or no computational capabilities and only serves as a repository for archiving data recorded and processed by the fog. In these implementations, the cloud 944 centralized data storage system and provides reliability and access to data by the computing resources in the fog and/or edge devices. Being at the core of the architecture, the Data Store of the cloud 944 is accessible by both Edge and Fog layers of the aforementioned edge-fog network.

As mentioned previously, the access networks provide network connectivity to the end-user devices 920, 910 via respective NANs 930. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. Additionally or alternatively, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. Additionally or alternatively, the CRAN, CR, or vBBUP may implement a RANF split, wherein one or more communication protocol layers are operated by the CRAN/CR/vBBUP and other communica-tion protocol entities are operated by individual RAN nodes 931, 932. This virtualized framework allows the freed-up processor cores of the NANs 931, 932 to perform other virtualized applications, such as virtualized applications for various elements discussed herein. Furthermore, the NANs 930 may each be, or may include one or more RANFs such as those discussed herein.

The UEs 910 may utilize respective connections (or channels) 903a, each of which comprises a physical com-munications interface or layer. The connections 903a are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. Addi-tionally or alternatively, the UEs 910 and the NANs 930 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 910 and NANs 930 may operate using LAA, enhanced LAA (eLAA), and/or further eLAA (fe-LAA) mechanisms. The UEs 910 may further directly exchange communication data via respective direct links 905, which may be LTE/NR Proximity Services (ProSe) link or PC5 interfaces/links, or WiFi based links or a personal area network (PAN) based links (e.g., [IEEE802154] based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

Additionally or alternatively, individual UEs 910 provide radio information to one or more NANs 930 and/or one or more edge compute nodes 936 (e.g., edge servers/hosts, etc.). The radio information may be in the form of one or more measurement reports, and/or may include, for example, signal strength measurements, signal quality mea-surements, and/or the like. Each measurement report is tagged with a timestamp and the location of the measure-ment (e.g., the UEs 910 current location). As examples, the measurements collected by the UEs 910 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet error ratio (PER), packet loss rate, packet reception rate (PRR), data rate, peak data rate, end-to-end (e2e) delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/NO), energy per chip to interference power density ratio (Ec/IOT), energy per chip to noise power density ratio (Ec/NO), peak-to-average power ratio (PAPR), reference signal received power (RSRP), reference signal received quality (RSRQ), received signal strength indicator (RSSI), received channel power indicator (RCPI), received signal to noise indicator (RSNI), Received Signal Code Power (RSCP), average noise plus interference (ANPI), GNSS timing of cell frames for UE positioning for E-UTRAN or 5G/NR (e.g., a timing between an AP or RAN node refer-ence time and a GNSS-specific reference time for a given GNSS), GNSS code measurements (e.g., the GNSS code phase (integer and fractional parts) of the spreading code of the ith GNSS satellite signal), GNSS carrier phase measure-ments (e.g., the number of carrier-phase cycles (integer and fractional parts) of the ith GNSS satellite signal, measured since locking onto the signal; also called Accumulated Delta Range (ADR)), channel interference measurements, thermal noise power measurements, received interference power measurements, power histogram measurements, channel load measurements, STA statistics, and/or other like mea-surements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR), and RSRP, RSSI, RSRQ, RCPI, RSNI, and/or ANPI mea-surements of various beacon, Fast Initial Link Setup (FILS) discovery frames, or probe response frames for WLAN/WiFi (e.g., [IEEE80211]) networks. Other measurements may be additionally or alternatively used, such as those discussed in 3GPP TS 36.214 v17.0.0 (2022 Mar. 31) ("[TS36214]"), 3GPP TS 38.215 v17.1.0 (2022 Apr. 1) ("[TS38215]"), 3GPP TS 38.314 v17.1.0 (2022 Jul. 17) ("[TS38314]"), [IEEE80211], and/or the like. Additionally or alternatively, any of the aforementioned measurements (or combination of measurements) may be collected by one or more NANs 930 and provided to the edge compute node(s) 936.

Additionally or alternatively, the measurements can include one or more of the following measurements: measurements related to Data Radio Bearer (DRB) (e.g., number of DRBs attempted to setup, number of DRBs successfully setup, number of released active DRBs, in-session activity time for DRB, number of DRBs attempted to be resumed, number of DRBs successfully resumed, etc.); measurements related to Radio Resource Control (RRC) (e.g., mean number of RRC connections, maximum number of RRC connections, mean number of stored inactive RRC connections, maximum number of stored inactive RRC connections, number of attempted, successful, and/or failed RRC connection establishments, etc.); measurements related to UE Context (UECNTX); measurements related to Radio Resource Utilization (RRU) (e.g., DL total PRB usage, UL total PRB usage, distribution of DL total PRB usage, distribution of UL total PRB usage, DL PRB used for data traffic, UL PRB used for data traffic, DL total available PRBs, UL total available PRBs, etc.); measurements related to Registration Management (RM); measurements related to Session Management (SM) (e.g., number of PDU sessions requested to setup; number of PDU sessions successfully setup; number of PDU sessions failed to setup, etc.); measurements related to GTP Management (GTP); measurements related to IP Management (IP); measurements related to Policy Association (PA); measurements related to Mobility Management (MM) (e.g., for inter-RAT, intra-RAT, and/or Intra/Inter-frequency handovers and/or conditional handovers: number of requested, successful, and/or failed handover preparations; number of requested, successful, and/or failed handover resource allocations; number of requested, successful, and/or failed handover executions; mean and/or maximum time of requested handover executions; number of successful and/or failed handover executions per beam pair, etc.); measurements related to Virtualized Resource(s) (VR); measurements related to Carrier (CARR); measurements related to QoS Flows (QF) (e.g., number of released active QoS flows, number of QoS flows attempted to release, in-session activity time for QoS flow, in-session activity time for a UE 910, number of QoS flows attempted to setup, number of QoS flows successfully established, number of QoS flows failed to setup, number of initial QoS flows attempted to setup, number of initial QoS flows successfully established, number of initial QoS flows failed to setup, number of QoS flows attempted to modify, number of QoS flows successfully modified, number of QoS flows failed to modify, etc.); measurements related to Application Triggering (AT); measurements related to Short Message Service (SMS); measurements related to Power, Energy and Environment (PEE); measurements related to network service(s) and/or NF service (NFS); measurements related to Packet Flow Description (PFD); measurements related to Random Access Channel (RACH); measurements related to Measurement Report (MR); measurements related to Layer 1 Measurement (L1M); measurements related to Network Slice Selection (NSS); measurements related to Paging (PAG); measurements related to Non-IP Data Delivery (NIDD); measurements related to external parameter provisioning (EPP); measurements related to traffic influence (TI); measurements related to Connection Establishment (CE); measurements related to Service Parameter Provisioning (SPP); measurements related to Background Data Transfer Policy (BDTP); measurements related to Data Management (DM); and/or any other performance measurements such as those discussed in 3GPP TS 28.552 v17.7.1 (2022 Jun. 17) ("[TS28552]"), 3GPP TS 32.425 v17.1.0 (2021 Jun. 24) ("[TS32425]"), the contents of each of which are hereby incorporated by reference in their entireties.

The radio information may be reported in response to a trigger event and/or on a periodic basis. Additionally or alternatively, individual UEs 910 report radio information either at a low periodicity or a high periodicity depending on a data transfer that is to take place, and/or other information about the data transfer. Additionally or alternatively, the edge compute node(s) 936 may request the measurements from the NANs 930 at low or high periodicity, or the NANs 930 may provide the measurements to the edge compute node(s) 936 at low or high periodicity. Additionally or alternatively, the edge compute node(s) 936 may obtain other relevant data from other edge compute node(s) 936, core network functions (NFs), application functions (AFs), and/or other UEs 910 such as Key Performance Indicators (KPIs), with the measurement reports or separately from the measurement reports.

Additionally or alternatively, in cases where is discrepancy in the observation data from one or more UEs, one or more RAN nodes, and/or core network NFs (e.g., missing reports, erroneous data, etc.) simple imputations may be performed to supplement the obtained observation data such as, for example, substituting values from previous reports and/or historical data, apply an extrapolation filter, and/or the like. Additionally or alternatively, acceptable bounds for the observation data may be predetermined or configured. For example, CQI and MCS measurements may be configured to only be within ranges defined by suitable 3GPP standards. In cases where a reported data value does not make sense (e.g., the value exceeds an acceptable range/ bounds, or the like), such values may be dropped for the current learning/training episode or epoch. For example, on packet delivery delay bounds may be defined or configured, and packets determined to have been received after the packet delivery delay bound may be dropped.

In any of the embodiments discussed herein, any suitable data collection and/or measurement mechanism(s) may be used to collect the observation data. For example, data marking (e.g., sequence numbering, etc.), packet tracing, signal measurement, data sampling, and/or timestamping techniques may be used to determine any of the aforementioned metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a HW configuration/implementation or non-HW-specific, or may be based on various software parameters (e.g., OS type and version, etc.). Various configurations may be used to define any of the aforementioned data collection parameters. Such configurations may be defined by suitable specifications/standards, such as 3GPP (e.g., [SA6Edge]), ETSI (e.g., [MEC]), O-RAN (e.g., [O-RAN]), Intel® Smart Edge Open (formerly OpenNESS) (e.g., [ISEO]), IETF (e.g., [MAMS]), IEEE/WiFi (e.g., [IEEE80211], [WiMAX], [IEEE16090], etc.), and/or any other like standards such as those discussed herein.

The UE 912b is shown as being capable of accessing access point (AP) 933 via a connection 903b. In this example, the AP 933 is shown to be connected to the Internet without connecting to the CN 942 of the wireless system. The connection 903b can comprise a local wireless connection, such as a connection consistent with any [IEEE802] protocol (e.g., [IEEE80211] and variants thereof), wherein the AP 933 would comprise a WiFi router. Additionally or alternatively, the UEs 910 can be configured to communicate using suitable communication signals with each other or with any of the AP 933 over a single or multicarrier communication channel in accordance with various communication techniques, such as, but not limited to, an OFDM communication technique, a single-carrier frequency division multiple access (SC-FDMA) communication technique, and/or the like, although the scope of the present disclosure is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 931 and 932 that enable the connections 903a may be referred to as "RAN nodes" or the like. The RAN nodes 931, 932 may comprise ground stations (e.g., terrestrial access points) or satellite stations providing coverage within a geographic area (e.g., a cell). The RAN nodes 931, 932 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 931 is embodied as a NodeB, evolved NodeB (eNB), or a next generation NodeB (gNB), and the RAN nodes 932 are embodied as relay nodes, distributed units, or Road Side Unites (RSUs). Any other type of NANs can be used.

Any of the RAN nodes 931, 932 can terminate the air interface protocol and can be the first point of contact for the UEs 912 and IoT devices 911. Additionally or alternatively, any of the RAN nodes 931, 932 can fulfill various logical functions for the RAN including, but not limited to, RANF(s) (e.g., radio network controller (RNC) functions and/or NG-RANFs) for radio resource management, admission control, UL and DL dynamic resource allocation, radio bearer management, data packet scheduling, etc. Additionally or alternatively, the UEs 910 can be configured to communicate using OFDM communication signals with each other or with any of the NANs 931, 932 over a multicarrier communication channel in accordance with various communication techniques, such as, but not limited to, an OFDMA communication technique (e.g., for DL communications) and/or an SC-FDMA communication technique (e.g., for UL and ProSe or sidelink communications), although the scope of the present disclosure is not limited in this respect.

For most cellular communication systems, the RANF(s) operated by the RAN or individual NANs 931-932 organize DL transmissions (e.g., from any of the RAN nodes 931, 932 to the UEs 910) and UL transmissions (e.g., from the UEs 910 to RAN nodes 931, 932) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 910 at each transmission time interval (TTI). A TTI is the duration of a transmission on a radio link 903a, 905, and is related to the size of the data blocks passed to the radio link layer from higher network layers.

The NANs 931, 932 may be configured to communicate with one another via respective interfaces or links (not shown), such as an X2 interface for LTE implementations (e.g., when CN 942 is an Evolved Packet Core (EPC)), an Xn interface for 5G or NR implementations (e.g., when CN 942 is an Fifth Generation Core (5GC)), or the like. The NANs 931 and 932 are also communicatively coupled to CN 942. Additionally or alternatively, the CN 942 may be an evolved packet core (EPC) network, a NextGen Packet Core (NPC) network, a 5G core (5GC), or some other type of CN. The CN 942 is a network of network elements and/or network functions (NFs) relating to a part of a communications network that is independent of the connection technology used by a terminal or user device. The CN 942 comprises a plurality of network elements/NFs configured to offer various data and telecommunications services to customers/subscribers (e.g., users of UEs 912 and IoT devices 911) who are connected to the CN 942 via a RAN. The components of the CN 942 may be implemented in one physical node or separate physical nodes including components to read and execute instructions from a machine-readable or computer-readable medium (e.g., a non-transitory machine-readable storage medium). Additionally or alternatively, NFV may be utilized to virtualize any or all of the above-described network node functions via executable instructions stored in one or more computer-readable storage mediums (described in further detail infra). A logical instantiation of the CN 942 may be referred to as a network slice, and a logical instantiation of a portion of the CN 942 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 942 components/functions.

The CN 942 is shown to be communicatively coupled to an application server 950 and a network 950 via an IP communications interface 955. the one or more server(s) 950 comprise one or more physical and/or virtualized systems for providing functionality (or services) to one or more clients (e.g., UEs 912 and IoT devices 911) over a network. The server(s) 950 may include various computer devices with rack computing architecture component(s), tower computing architecture component(s), blade computing architecture component(s), and/or the like. The server(s) 950 may represent a cluster of servers, a server farm, a cloud computing service, or other grouping or pool of servers, which may be located in one or more datacenters. The server(s) 950 may also be connected to, or otherwise associated with one or more data storage devices (not shown). Moreover, the server(s) 950 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 950 offer applications or services that use IP/network resources. As examples, the server(s) 950 may provide traffic management services, cloud analytics, content streaming services, immersive gaming experiences, social networking and/or microblogging services, and/or other like services. In addition, the various services provided by the server(s) 950 may include initiating and controlling software and/or firmware updates for applications or individual components implemented by the UEs 912 and IoT devices 911. The server(s) 950 can also be configured to support one or more communication services (e.g., Voice-over-Internet Protocol (VoIP) sessions, PTT sessions, group communication sessions, social networking services, etc.) for the UEs 912 and IoT devices 911 via the CN 942.

The Radio Access Technologies (RATs) employed by the NANs 930, the UEs 910, and the other elements in FIG. 9 may include, for example, any of the communication protocols and/or RATs discussed herein. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.). These RATs may include one or more V2X RATs, which allow these elements to communicate directly with one another, with infrastructure equipment (e.g., NANs 930), and other devices. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize a C-V2X air interface and the WLAN V2X RAT may utilize an W-V2X air interface.

The W-V2X RATs include, for example, *IEEE Guide for Wireless Access in Vehicular Environments (WAVE) Architecture*, IEEE 1609.0-2019 (10 Apr. 2019) ("[IEEE16090]"), V2X *Communications Message Set Dictionary*, SAE INT'L (23 Jul. 2020) ("[J2735_202007]"), Intelligent Transport Systems in the 5 GHz frequency band (ITS-G5), the [IEEE80211p] (which is the layer 1 (L1) and layer 2 (L2) part of WAVE, DSRC, and ITS-G5), and/or [WiMAX]. The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including [IEEE80211p] RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020 January) (hereinafter "[EN302663]") and describes the access layer of the ITS-S reference architecture. The ITS-G5 access layer comprises [IEEE80211] (which now incorporates [IEEE80211p]), as well as features for Decentralized Congestion Control (DCC) methods discussed in ETSI TS 102 687 V1.2.1 (2018 April) ("[TS102687]"). The access layer for 3GPP LTE-V2X based interface(s) is outlined in, inter alia, ETSI EN 303 613 V1.1.1 (2020-01), 3GPP TS 23.285 v16.2.0 (2019-12); and 3GPP 5G/NR-V2X is outlined in, inter alia, 3GPP TR 23.786 v16.1.0 (2019-06) and 3GPP TS 23.287 v16.2.0 (2020 March).

The cloud 944 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 944 include application capabilities type, infrastructure capabilities type, and platform capabilities type. A cloud capabilities type is a classification of the functionality provided by a cloud service to a cloud service customer (e.g., a user of cloud 944), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 944 may provide include, for example, Communications as a Service (CaaS), which is a cloud service category involving real-time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; NSaaS; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

Additionally or alternatively, the cloud 944 may represent one or more cloud servers, application servers, web servers, and/or some other remote infrastructure. The remote/cloud servers may include any one of a number of services and capabilities such as, for example, any of those discussed herein. Additionally or alternatively, the cloud 944 may represent a network such as the Internet, a local area network (LAN), a wide area network (WAN), a wireless local area network (WLAN), or a wireless wide area network (WWAN) including proprietary and/or enterprise networks for a company or organization, or combinations thereof. The cloud 944 may be a network that comprises computers, network connections among the computers, and software routines to enable communication between the computers over network connections. In this regard, the cloud 944 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 944 may be via a wired or a wireless connection using the various communication protocols discussed infra. More than one network may be involved in a communication session between the illustrated devices. Connection to the cloud 944 may require that the computers execute software routines which enable, for example, the seven layers of the OSI model of computer networking or equivalent in a wireless (cellular) phone network. Cloud 944 may be used to enable relatively long-range communication such as, for example, between the one or more server(s) 950 and one or more UEs 910. Additionally or alternatively, the cloud 944 may represent the Internet, one or more cellular networks, local area networks, or wide area networks including proprietary and/or enterprise networks, TCP/Internet Protocol (IP)-based network, or combinations thereof. In these implementations, the cloud 944 may be associated with network operator who owns or controls equipment and other elements necessary to provide network-related services, such as one or more base stations or access points, one or more servers for routing digital data or telephone calls (e.g., a core network or backbone network), etc. The backbone links 955 may include any number of wired or wireless technologies, and may be part of a LAN, a WAN, or the Internet. In one example, the backbone links 955 are fiber backbone links that couple lower levels of service providers to the Internet, such as the CN 912 and cloud 944.

As shown by FIG. 9, each of the NANs 931, 932, and 933 are co-located with edge compute nodes (or "edge servers") 936a, 936b, and 936c, respectively. These implementations may be small-cell clouds (SCCs) where an edge compute node 936 is co-located with a small cell (e.g., pico-cell, femto-cell, etc.), or may be mobile micro clouds (MCCs) where an edge compute node 936 is co-located with a macro-cell (e.g., an eNB, gNB, etc.). The edge compute node 936 may be deployed in a multitude of arrangements other than as shown by FIG. 9. In a first example, multiple NANs 930 are co-located or otherwise communicatively coupled with one edge compute node 936. In a second example, the edge servers 936 may be co-located or operated by RNCs, which may be the case for legacy network deployments, such as 3G networks. In a third example, the edge servers 936 may be deployed at cell aggregation sites or at multi-RAT aggregation points that can be located either within an enterprise or used in public coverage areas. In a fourth example, the edge servers 936 may be deployed at the edge of CN 942. These implementations may be used in follow-me clouds (FMC), where cloud services running at distributed data centers follow the UEs 910 as they roam throughout the network.

In any of the implementations discussed herein, the edge servers 936 provide a distributed computing environment for application and service hosting, and also provide storage and processing resources so that data and/or content can be processed in close proximity to subscribers (e.g., users of UEs 910) for faster response times The edge servers 936 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 936 from the UEs 910, CN 942, cloud 944, and/or server(s) 950, or vice versa. For example, a device application or client application operating in a UE 910 may offload application tasks or workloads to one or more edge servers 936. In another example, an edge server 936 may offload application tasks or workloads to one or more UE 910 (e.g., for distributed ML computation or the like).

The edge compute nodes 936 may include or be part of an edge system 935 that employs one or more ECTs 935. The edge compute nodes 936 may also be referred to as "edge hosts 936" or "edge servers 936." The edge system 935 includes a collection of edge servers 936 and edge management systems (not shown by FIG. 9) necessary to run edge computing applications within an operator network or a subset of an operator network. The edge servers 936 are physical computer systems that may include an edge platform and/or virtualization infrastructure, and provide compute, storage, and network resources to edge computing applications. Each of the edge servers 936 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to UEs 910. The VI of the edge servers 936 provide virtualized environments and virtualized resources for the edge hosts, and the edge computing applications may run as VMs and/or application containers on top of the VI.

In one example implementation, the ECT 935 operates according to the MEC framework, as discussed in ETSI GS MEC 003 V3.1.1 (2022 March), ETSI GS MEC 009 V3.1.1 (2021 June), ETSI GS MEC 010-1 v1.1.1 (2017 October), ETSI GS MEC 010-2 v2.2.1 (2022 February), ETSI GS MEC 011 v2.2.1 (2020 December), ETSI GS MEC 012 V2.2.1 (2022 February), ETSI GS MEC 013 v2.2.1 (2022 January), ETSI GS MEC 014 V1.1.1 (2021 February), ETSI GS MEC 015 v2.1.1 (2020 June), ETSI GS MEC 016 v2.2.1 (2020 April), ETSI GS MEC 021 v2.2.1 (2022 February), ETSI GS MEC 028 v2.2.1 (2021 July), ETSI GS MEC 029 v2.2.1 (2022 January), ETSI MEC GS 030 v2.2.1 (2022 May), ETSI GS NFV-MAN 001 v1.1.1 (2014 December), U.S. Provisional App. No. 63/003,834 filed Apr. 1, 2020 ("['834]"), and Int'l App. No. PCT/US2020/066969 filed on

53

Dec. 23, 2020 ("['969]") (collectively referred to herein as "[MEC]"), the contents of each of which are hereby incorporated by reference in their entireties. This example implementation (and/or in any other example implementation discussed herein) may also include NFV and/or other like virtualization technologies such as those discussed in ETSI GR NFV 001 V1.3.1 (2021 March), ETSI GS NFV 002 V1.2.1 (2014 December), ETSI GR NFV 003 V1.6.1 (2021 March), ETSI GS NFV 006 V2.1.1 (2021 January), ETSI GS NFV-INF 001 V1.1.1 (2015 January), ETSI GS NFV-INF 003 V1.1.1 (2014 December), ETSI GS NFV-INF 004 V1.1.1 (2015 January), ETSI GS NFV-MAN 001 v1.1.1 (2014 December), and/or Open Source MANO documentation, version 12 (June 2022), https://osm.etsi.org/docs/user-guide/v12/index.html ("[OSM]") (collectively referred to as "[ETSINFV]"), the contents of each of which are hereby incorporated by reference in their entireties. Other virtualization technologies and/or service orchestration and automation platforms may be used such as, for example, those discussed in *E2E Network Slicing Architecture*, GSMA, Official Doc. NG.127, v1.0 (3 Jun. 2021), https://www.gsma.com/newsroom/wp-content/uploads//NG.127-v1.0-2.pdf, *Open Network Automation Platform (ONAP) documentation*, Release Istanbul, v9.0.1 (17 Feb. 2022), https://docs.onap.org/en/latest/index.html ("[ONAP]"), 3GPP Service Based Management Architecture (SBMA) as discussed in 3GPP TS 28.533 v17.2.0 (2022 Mar. 22) ("[TS28533]"), the contents of each of which are hereby incorporated by reference in their entireties.

In another example implementation, the ECT 935 operates according to the O-RAN framework. Typically, front-end and back-end device vendors and carriers have worked closely to ensure compatibility. The flip-side of such a working model is that it becomes quite difficult to plug-and-play with other devices and this can hamper innovation. To combat this, and to promote openness and inter-operability at every level, several key players interested in the wireless domain (e.g., carriers, device manufacturers, academic institutions, and/or the like) formed the Open RAN alliance ("O-RAN") in 2018. The O-RAN network architecture is a building block for designing virtualized RAN on programmable hardware with radio access control powered by AI. Various aspects of the O-RAN architecture are described in *O-RAN Architecture Description* v06.00, O-RAN ALLIANCE WG1 (March 2022); *O-RAN Operations and Maintenance Architecture Specification* v04.00, O-RAN ALLIANCE WG1 (February 2021); *O-RAN Operations and Maintenance Interface Specification* v04.00, O-RAN ALLIANCE WG1 (February 2021) *O-RAN Information Model and Data Models Specification* v01.00, O-RAN ALLIANCE WG1 (February 2021); *O-RAN Working Group 1 Slicing Architecture* v06.00, O-RAN ALLIANCE WG1 (March 2022); *O-RAN Working Group 2 (Non-RT RIC and A1 interface WG) A1 interface: Application Protocol* v03.01, O-RAN ALLIANCE WG2 (June 2021); *O-RAN Working Group 2 (Non-RT RIC and A1 interface WG) A1 interface: Type Definitions* v02.03, O-RAN ALLIANCE WG2 (October 2021); *O-RAN Working Group 2 (Non-RT RIC and A1 interface WG) A1 interface: Transport Protocol* v01.01, O-RAN ALLIANCE WG2 (June 2021); *O-RAN Working Group 2 AI/ML workflow description and requirements* v01.03 O-RAN ALLIANCE WG2 (October 2021); *O-RAN Working Group 2 Non-RT RIC Architecture* v01.00 O-RAN ALLIANCE WG2 (October 2021); *O-RAN Working Group 2 Non-RT RIC: Functional Architecture* v01.01, O-RAN ALLIANCE WG2 (July 2021); *O-RAN Working Group 2 (Non-RT RIC and A1 interface WG): R1 interface: General Aspects and Principles* v01.00, O-RAN ALLIANCE WG2 (March 2022); *O-RAN Working Group 3 Near-Real-time Intelligent Controller Architecture & E2 General Aspects and Principles* v02.01, O-RAN ALLIANCE WG3 (March 2022); *O-RAN Working Group 3 Near-Real-time Intelligent Controller E2 Service Model (E2SM)* v02.01, O-RAN ALLIANCE WG3 (March 2022); *O-RAN Working Group 3 Near-Real-time Intelligent Controller E2 Service Model (E2SM) RAN Function Network Interface (NI)* v01.00, O-RAN ALLIANCE WG3 (February 2020); *O-RAN Working Group 3 Near-Real-time Intelligent Controller E2 Service Model (E2SM) KPM* v02.01, O-RAN ALLIANCE WG3 (March 2022); *O-RAN Working Group 3 Near-Real-time Intelligent Controller E2 Service Model (E2SM) RAN Control* v01.01, O-RAN ALLIANCE WG3 (March 2022); *O-RAN Working Group 3, Near-Real-time Intelligent Controller, E2 Application Protocol (E2AP)* v02.01, O-RAN ALLIANCE WG3 (March 2022); *O-RAN Working Group 3 Near-Real-time Intelligent Controller Near-RT RIC Architecture* v02.01, O-RAN ALLIANCE WG3 (March 2022); *O-RAN Working Group 4 (Open Fronthaul Interfaces WG) Control, User and Synchronization Plane Specification* v08.01, O-RAN ALLIANCE WG4 (May 2022); and *O-RAN Working Group 4 (Open Fronthaul Interfaces WG) Control, User and Synchronization Plane Specification* v07.02, O-RAN ALLIANCE WG4 (May 2022); *O-RAN Fronthaul Working Group 4 Cooperative Transport Interface Transport Control Plane Specification* v02.00, O-RAN ALLIANCE WG4 (June 2021); *O-RAN Fronthaul Working Group 4 Cooperative Transport Interface Transport Management Plane Specification* v02.00, O-RAN ALLIANCE WG4 (June 2021); *O-RAN Fronthaul Working Group 4 Management Plane Specification* v08.00, O-RAN ALLIANCE WG4 (March 2022); *O-RAN Fronthaul Working Group 4 Management Plane Specification* v07.01, O-RAN ALLIANCE WG4 (April 2022); *O-RAN Alliance Working Group 5 O1 Interface specification for O-DU* v03.00, O-RAN ALLIANCE WG5 (March 2022); *O-RAN Open F1/W1/E1/X2/Xn Interfaces Working Group Transport Specification* v01.00, O-RAN ALLIANCE WG5 (April 2020); *Cloud Architecture and Deployment Scenarios for O-RAN Virtualized RAN* v02.02, O-RAN ALLIANCE WG6 (October 2021); *Cloud Platform Reference Designs* v02.00, O-RAN ALLIANCE WG6 (February 2021); *O-RAN O2 Interface General Aspects and Principles* v01.02, O-RAN ALLIANCE WG6 (March 2022); *O-RAN Acceleration Abstraction Layer General Aspects and Principles* v02.00, O-RAN ALLIANCE WG6 (March 2022); *O-RAN White Box Hardware Working Group Hardware Reference Design Specification for Indoor Pico Cell with Fronthaul Split Option 6* v02.00, O-RAN ALLIANCE WG7 (October 2021); *O-RAN WG7 Hardware Reference Design Specification for Indoor Picocell (FR1) with Split Option 7-2* v03.00, O-RAN ALLIANCE WG7 (October 2021); *O-RAN White Box Hardware Working Group Hardware Reference Design Specification for Outdoor Micro Cell with Split Architecture Option 7.2* v02.00, O-RAN ALLIANCE WG7 (October 2021); *O-RAN WG7 Hardware Reference Design Specification for Indoor Picocell (FR1) with Split Option 8* v03.00, O-RAN ALLIANCE WG7 (October 2021); *O-RAN Open X-haul Transport Working Group Management interfaces for Transport Network Elements* v03.00, O-RAN ALLIANCE WG9 (March 2022); *O-RAN Open X-haul Transport Working Group Synchronization Architecture and Solution Specification*, O-RAN ALLIANCE WG9 (March 2022); *O-RAN Open Xhaul Transport WG9 WDM-based Fronthaul Transport*, O-RAN ALLIANCE WG9 (March 2022); *O-RAN Open Transport Working Group 9 Xhaul Packet Switched Architectures and Solutions* v02.00, O-RAN ALLIANCE WG9 (October 2021); *O-RAN Operations and Maintenance Architecture* v06.00, O-RAN Alliance WG10 (March 2022); *O-RAN Operations and Maintenance Interface Specification* v06.00, O-RAN Alliance WG10 (March 2022); *O-RAN: Towards an Open and Smart RAN*, O-RAN Alliance, White Paper (October 2018); and U.S. application Ser. No. 17/484,743 filed on 24 Sep. 2021 (collectively referred to as "[O-RAN]") the contents of each of which are hereby incorporated by reference in their entireties.

In another example implementation, the ECT 935 operates according to the 3$^{rd}$ Generation Partnership Project (3GPP) System Aspects Working Group 6 (SA6) Architecture for enabling Edge Applications (referred to as "3GPP edge computing", "3GPP EdgeApp", or the like) as discussed in 3GPP TS 23.558 v17.4.0 (2022 Jun. 13) ("[TS23558]"), 3GPP TS 23.501 v17.5.0 (2022 Jun. 15) ("[TS23501]"), and U.S. application Ser. No. 17/484,719 filed on 24 Sep. 2021 ("['719]") (collectively referred to as "[SA6Edge]"), the contents of each of which is hereby incorporated by reference in their entireties.

In another example implementation, the ECT 935 operates according to the Intel® Smart Edge Open framework (formerly known as OpenNESS) as discussed in Intel® Smart Edge Open Developer Guide, version 21.09 (30 Sep. 2021), available at: <https://smart-edge-open.github.io/> ("[ISEO]"), the contents of which are hereby incorporated by reference in its entirety.

In another example implementation, the ECT 935 operates according to the Multi-Access Management Services (MAMS) framework as discussed in Kanugovi et al., *Multi-Access Management Services (MAMS)*, Internet Engineering Task Force (IETF), Request for Comments (RFC) 8743 (March 2020), Ford et al., *TCP Extensions for Multipath Operation with Multiple Addresses*, IETF RFC 8684, (March 2020), De Coninck et al., *Multipath Extensions for QUIC (MP-QUIC)*, IETF draft-deconinck-quic-multipath-07, IETA, QUIC Working Group (3 May 2021), Zhu et al., *User Plane Protocols for Multiple Access Management Service*, IETF draft-zhu-intarea-mams-user-protocol-09, IETA, INTAREA (4 Mar. 2020), and Zhu et al., *Generic Multi-Access (GMA) Convergence Encapsulation Protocols*, IETF draft-zhu-intarea-gma-14, IETA, INTAREA/Network Working Group (24 Nov. 2021) (collectively referred to as "[MAMS]"), the contents of each of which are hereby incorporated by reference in their entireties. In these implementations, an edge compute node and/or one or more cloud computing nodes/clusters may be one or more MAMS servers that includes or operates a Network Connection Manager (NCM) for downstream/DL traffic, and the client include or operate a Client Connection Manager (CCM) for upstream/UL traffic. An NCM is a functional entity that handles MAMS control messages from clients (e.g., a client that configures the distribution of data packets over available access paths and (core) network paths, and manages user-plane treatment (e.g., tunneling, encryption, and/or the like) of the traffic flows (see e.g., [MAMS]). The CCM is the peer functional element in a client (e.g., a client that handles MAMS control-plane procedures, exchanges MAMS signaling messages with the NCM, and configures the network paths at the client for the transport of user data (e.g., network packets, and/or the like) (see e.g., [MAMS]).

It should be understood that the aforementioned edge computing frameworks and services deployment examples are only one illustrative example of edge computing systems/networks 935, and that the present disclosure may be applicable to many other edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

FIG. 10 is a block diagram 1000 showing an overview of a configuration for edge computing, which includes a layer of processing referred to in many of the following examples as an "edge cloud". As shown, the edge cloud 1010 is co-located at an edge location, such as a NAN 1040 (e.g., access point, base station, or the like), a local processing hub 1050, or a central office 1020, and thus, may include multiple entities, devices, and equipment instances. The edge cloud 1010 is located much closer to the endpoint (consumer and producer) data sources 1060 (e.g., autonomous vehicles 1061, user equipment 1062, business and industrial equipment 1063, video capture devices 1064, drones 1065, smart cities and building devices 1066, sensors and IoT devices 1067, and/or the like) than the cloud data center 1030. Compute, memory, and storage resources which are offered at the edges in the edge cloud 1010 are critical to providing ultra-low latency response times for services and functions used by the endpoint data sources 1060 as well as reduce network backhaul traffic from the edge cloud 1010 toward cloud data center 1030 thus improving energy consumption and overall network usages among other benefits.

Compute, memory, and storage are scarce resources, and generally decrease depending on the edge location (e.g., fewer processing resources being available at consumer endpoint devices, than at a base station, than at a central office 1020). However, the closer that the edge location is to the endpoint 1060, the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The edge cloud 1010 architecture that covers multiple potential deployments and addresses restrictions that some network operators or service providers may have in their own infrastructures. These include, variation of configurations based on the edge location because edges at a NAN level, for instance, may have more constrained performance and capabilities in a multi-tenant scenario; configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a paradigm where computing is performed at or closer to the "edge" of a network, typically through the use of an appropriately arranged compute platform (e.g., x86, ARM, Nvidia, and/or other CPU/GPU based compute hardware architecture) implemented at NANs 1040, gateways, network routers, and/or other devices which are much closer to endpoint devices 1060 producing and consuming the data. For example, edge gateway servers (e.g., local processing hub 1050) may be equipped with pools of memory and storage resources to perform computation in real-time for low latency use-cases (e.g., autonomous driving or video surveillance) for connected client devices 1060. In another example, NANs 1040 may be augmented with compute and acceleration resources to directly process service workloads for connected UEs 1060, without further communicating data via backhaul networks. In another example, central office network management hardware 1020 may be replaced with standardized compute HW (e.g., COTS HW) that performs virtualized network functions and offers compute resources for the execution of services and consumer functions for connected devices 1060. Additionally or alternatively, an arrangement with HW combined with virtualized functions, commonly referred to as a hybrid arrangement, may also be implemented. Within edge computing networks, there may be scenarios in services which the compute resource will be "moved" to the data, as well as scenarios in which the data will be "moved" to the compute resource. In an example, NAN 1040 compute, acceleration, and network resources can provide services in order to scale to workload demands on an as-needed basis by activating dormant capacity (e.g., subscription, capacity on-demand, and so forth) in order to manage corner cases, emergencies, and/or to provide longevity for deployed resources over a significantly longer implemented lifecycle.

Figure 11:
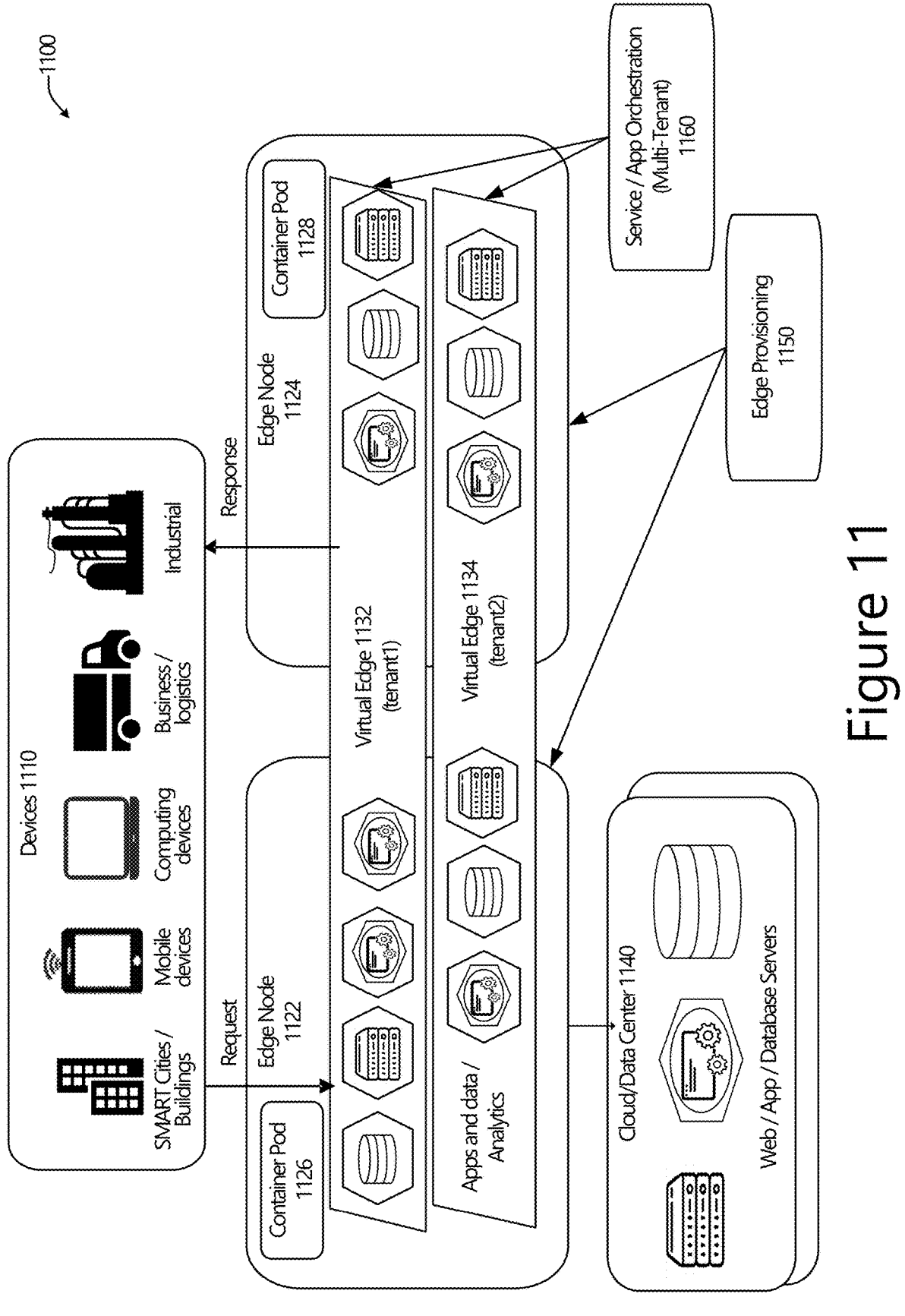
FIG. 11 depicts a virtual edge configuration in an edge computing system.

FIG. 11 illustrates deployment and orchestration for virtualized and container-based edge configurations across an edge computing system 1100 operated among multiple edge nodes and/or multiple tenants (e.g., users, providers, subscribers, and the like) which use such edge nodes. The edge computing system 1100 includes a first edge node 1122 and a second edge node 1124 that are coordinated to fulfill requests and responses for various endpoint devices 1110 (e.g., smart cities, building systems, mobile devices, computing devices, business/logistics systems, industrial systems, and/or the like), which access various virtual edge instances 1132, 1134. Additionally or alternatively, the endpoint devices 1110 can be the same or similar as the end point devices 160, end point devices 1060, and/or any other device discussed herein. Here, the virtual edge instances 1132, 1134 provide edge compute capabilities and processing in an edge cloud, with access to a cloud/data center 1140 for higher-latency requests for websites, applications, database servers, and/or the like. However, the edge cloud 1010 enables coordination of processing among multiple edge nodes for multiple tenants or entities.

The virtual edge instances include a first virtual edge 1132 offered to a first tenant (Tenant 1), which offers a first combination of edge storage, computing, and services; and a second virtual edge 1134 offering a second combination of edge storage, computing, and services. The virtual edge instances 1132, 1134 are distributed among the edge nodes 1122, 1124, and may include scenarios in which a request and response are fulfilled from the same or different edge nodes. The configuration of the edge nodes 1122, 1124 to operate in a distributed yet coordinated fashion occurs based on edge provisioning functions 1150. The functionality of the edge nodes 1122, 1124 to provide coordinated operation for applications and services, among multiple tenants, occurs based on orchestration functions 1160.

Some of the devices in 1110 are multi-tenant devices where tenant 1 may function within a tenant1 'slice' while a tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a device identity composition engine (DICE) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 1122, 1124 may operate as security feature enforcement points for local resources allocated to multiple tenants per node. Additionally, tenant runtime and application execution (e.g., in instances 1132, 1134) may serve as an enforcement point for a security feature that creates a virtual edge abstraction of resources spanning potentially multiple physical hosting platforms. Finally, the orchestration functions 1160 at an orchestration entity may operate as a security feature enforcement point for marshalling resources along tenant boundaries.

Edge compute nodes may partition resources (e.g., memory, central processing unit (CPU), graphics processing unit (GPU), interrupt controller, input/output (I/O) controller, memory controller, bus controller, and/or the like) where respective partitionings may contain a RoT capability and where fan-out and layering according to a DICE model may further be applied to Edge Nodes. Cloud computing nodes often use containers, FaaS engines, Servlets, servers, or other computation abstraction that may be partitioned according to a DICE layering and fan-out structure to support a RoT context for each. Accordingly, the respective RoTs spanning devices 1110, 1122, and 1140 may coordinate the establishment of a distributed trusted computing base (DTCB) such that a tenant-specific virtual trusted secure channel linking all elements end to end can be established.

In some cases, a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 11. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; and/or the like). The virtual edge instances may also be spanned across systems of multiple owners at different geographic locations (or, respective computing systems and resources which are co-owned or co-managed by multiple owners).

For instance, each edge node 1122, 1124 may implement the use of containers, such as with the use of a container pod 1126, 1128 providing a group of one or more containers. In a setting that uses one or more container pods, a pod controller or orchestrator 1160 is responsible for local control and orchestration of the containers in the pod 1126, 1128. Various edge node resources (e.g., storage, compute, services, depicted with hexagons in FIG. 11) are provided for the respective edge slices 1132, 1134, and are partitioned according to the needs of each container. Here, each container pod 1126, 1128 can host a service instance 236c, slice instance 622 and/or virtual lane instance 652 that provide e2e QoS constructs/channels/lanes according to the various example implementations discussed herein, and the pod controller/orchestrator 1160 may be the same or similar as the controller/orchestrators 236a, 625, 645, 725, 736a discussed previously. With the use of container pods, a pod controller oversees the partitioning and allocation of containers and resources. The pod controller receives instructions from an orchestrator 1160 that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 1160 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 12:
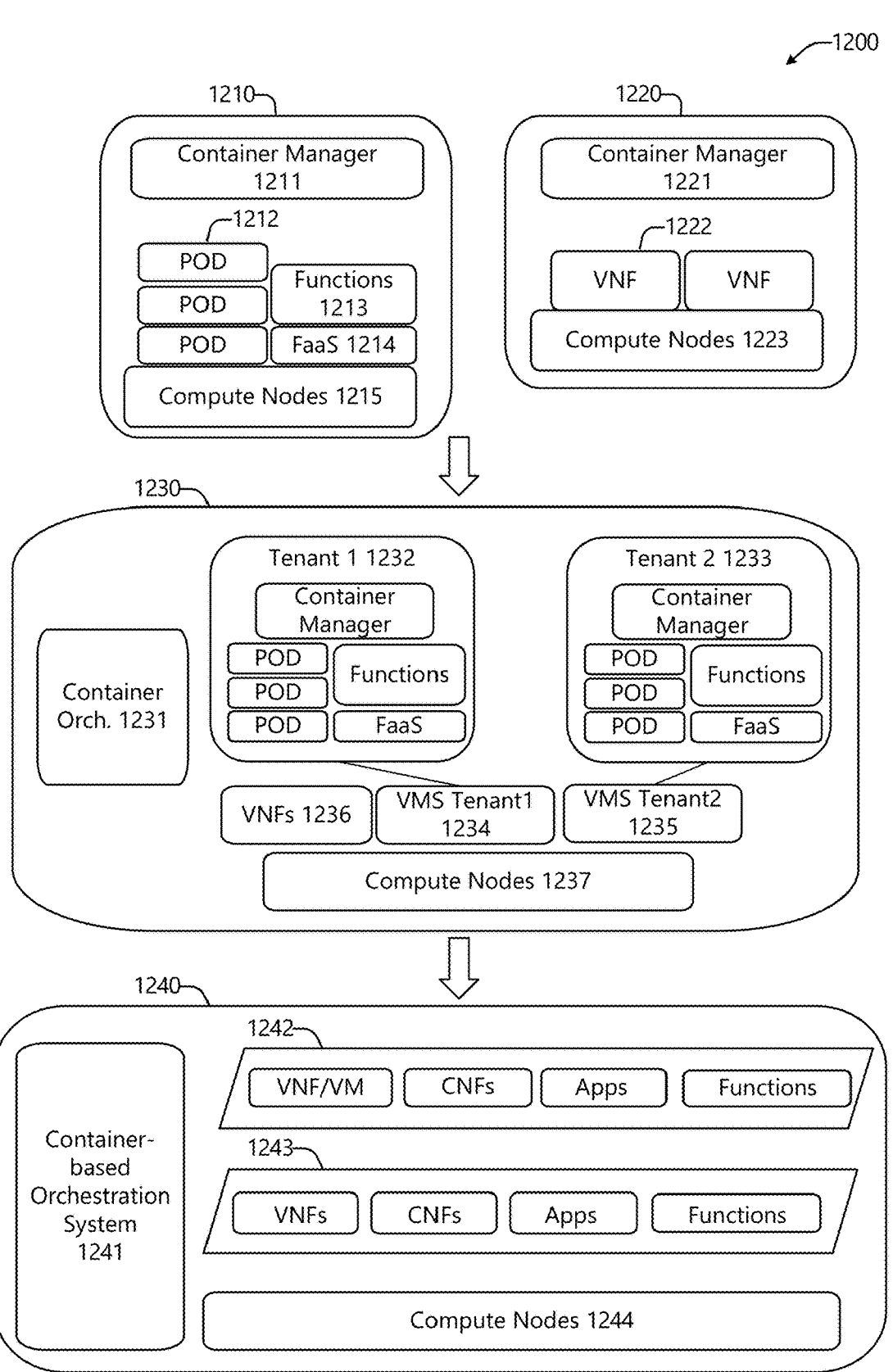
FIG. 12 illustrates various compute arrangements deploying containers in an edge computing system.

FIG. 12 illustrates additional compute arrangements deploying containers in an edge computing system 1200. As an example, system arrangements 1210, 1220 depict settings in which a pod controller (e.g., container managers 1211, 1221, and container orchestrator 1231) is adapted to launch containerized pods, functions, and FaaS instances through execution via compute nodes 1215 in arrangement 1210, and/or to separately execute containerized VNFs through execution via compute nodes 1223 in arrangement 1220. This arrangement is adapted for use of multiple tenants in arrangement 1230 using compute nodes 1237, where containerized pods 1212, functions 1213, VNFs 1222, 1236, and FaaS instances 1214 are launched within VMs 1234, 1235 for tenants 1232, 1233 specific to respective tenants (aside from the execution of VNFs). This arrangement is further adapted for use in arrangement 1240, which provides containers 1242, 1243 and/or execution of the VNFs, applications, and functions on compute nodes 1244, as coordinated by a container-based orchestration system 1241.

In an example implementation, compute nodes 1215, 1223, 1237, 1244 may be or include infrastructure in the service provider environment 236, infrastructure in the NOP domain 220, 320, and/or infrastructure in the DCN 640; the pods 1212, functions 1213, VNFs 1222, 1236, FaaS instances 1214, and/or containers 1242, 1243 correspond to one or more service instances 236c, slice instances 622, and/or virtual lane instances 652; and the container managers 1211, 1221, container orchestrator 1231, and/or container-based orchestration system 1241 correspond to the orchestrators 236a, 625, 645, 725, 736a, 1160, discussed previously.

The system arrangements in FIG. 12 provide an architecture that treats VMs, containers, and functions equally in terms of application composition, and resulting applications are combinations of these three ingredients. Each ingredient may involve use of one or more accelerator components (e.g., FPGAs, ASICs, and the like) as a local backend. In this manner, applications can be split across multiple edge owners, coordinated by an orchestrator. In the context of FIG. 12, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

3. Hardware Components, Configurations, and Arrangements

Figures 13, 14:
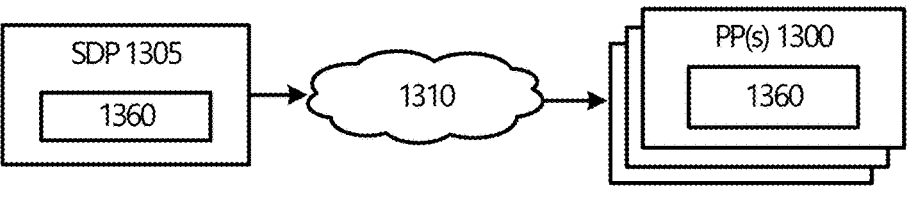
FIG. 13 illustrates an example software distribution platform.
FIG. 14 depict example components of a compute node, which may be deployed in an edge computing system(s).

FIG. 13 illustrates an example software (SW) distribution platform (SDP) 1305 to distribute software 1360, such as the example computer readable instructions 1481, 1482, 1483 of FIG. 14, to one or more devices, such as example processor platform(s) (pp) 1300, connected edge devices 1462 (see e.g., FIG. 14), and/or any of the other computing systems/ devices discussed herein. The SDP 1305 (or components thereof) may be implemented by any computer server, data facility, cloud service, CDN, edge computing framework, etc., capable of storing and transmitting software (e.g., code, scripts, executable binaries, containers, packages, compressed files, and/or derivatives thereof) to other computing devices (e.g., third parties, the example connected edge devices 1462 of FIG. 14). The SDP 1305 (or components thereof) may be located in a cloud (e.g., data center, etc.), a local area network, an edge network, a wide area network, on the Internet, and/or any other location communicatively coupled with the pp 1300.

The pp 1300 and/or connected edge devices 1462 connected edge devices 1462 may include customers, clients, managing devices (e.g., servers), third parties (e.g., customers of an entity owning and/or operating the SDP 1305), IoT devices, and the like. The pp 1300/connected edge devices 1462 may operate in commercial and/or home automation environments. In some examples, a third party is a developer, a seller, and/or a licensor of software such as the example computer readable media 1481, 1482, 1483 of FIG. 14. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.). In some examples, the pp 1300/connected edge devices 1462 can be physically located in different geographic locations, legal jurisdictions, etc.

In FIG. 13, the SDP 1305 includes one or more servers (referred to as "servers 1305") and one or more storage devices (referred to as "storage 1305"). The storage 1305 store the computer readable instructions 1360, which may correspond to the instructions 1481, 1482, 1483 of FIG. 14. The servers 1305 are in communication with a network 1310, which may correspond to any one or more of the Internet and/or any of the example networks as described herein. The servers 1305 are responsive to requests to transmit the software to a requesting party as part of a commercial transaction. Payment for the delivery, sale and/or license of the software may be handled by the servers 1305 and/or via a third-party payment entity. The servers 1305 enable purchasers and/or licensors to download the computer readable instructions 1360 from the SDP 1305.

The servers 1305 are communicatively connected to one or more security domains and/or security devices through which requests and transmissions of the example computer readable instructions 1360 must pass. Additionally or alternatively, the servers 1305 periodically offer, transmit, and/or force updates to the software 1360 to ensure improvements, patches, updates, etc. are distributed and applied to the software at the end user devices. The computer readable instructions 1360 are stored on storage 1305 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.), and/or any other format such as those discussed herein. In some examples, the computer readable instructions 1360 stored in the SDP 1305 are in a first format when transmitted to the pp 1300. Additionally or alternatively, the first format is an executable binary in which particular types of the pp 1300 can execute. Additionally or alternatively, the first format is uncompiled code that requires one or more preparation tasks to transform the first format to a second format to enable execution on the pp 1300. For example, the receiving pp 1300 may need to compile the computer readable instructions 1360 in the first format to generate executable code in a second format that is capable of being executed on the pp 1300. Additionally or alternatively, the first format is interpreted code that, upon reaching the pp 1300, is interpreted by an interpreter to facilitate execution of instructions. Additionally or alternatively, different components of the computer readable instructions 1482 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

FIG. 14 illustrates an example of components that may be present in a computing node 1450 for implementing the techniques (e.g., operations, processes, methods, and methodologies) described herein. The compute node 1450 provides a closer view of the respective components of node 1400 when implemented as or as part of a computing device (e.g., as a mobile device, a base station, server, gateway, and/or the like). The compute node 1450 may include any combinations of the hardware or logical components referenced herein, and it may include or couple with any device usable with an edge communication network or a combination of such networks. The components may be implemented as integrated circuitry (ICs), a System on Chip (SoC), portions thereof, discrete electronic devices, or other modules, instruction sets, programmable logic or algorithms, hardware, hardware accelerators, software, firmware, or a combination thereof adapted in the compute node 1450, or as components otherwise incorporated within a chassis of a larger system.

In some embodiments, the compute node 1450 may correspond to the end point devices 160, AN 130', NAN 130, and/or other elements shown and described with respect to FIG. 1; data producers 272, NANs 240, service provider environment 236, and/or NOP domains 220 in FIG. 2; NOP domain 320 of FIG. 3; UE 610, NW 620, NW orchestrator 625, DCN 640, and/or DCN orchestrator 645 of FIG. 6; UE 710, NW domain 720, RAN 721, NW orchestrator 725, CN 742, NSM 743, service provider domain 736, and/or service orchestrator 736a of FIG. 7; service mesh 801 of FIG. 8 and/or components therein; UEs 910, NANs 930, edge compute node(s) 936, CN 942 (or compute node(s) therein), cloud 944 (or compute node(s) therein), and/or server(s) 950 of FIG. 9; end point devices 1060, a local processing hub 1050, NAN 1040, and/or edge cloud 1010 of FIG. 10; software distribution platform 1305 and/or processor platform(s) 1300 of FIG. 13; and/or any other component, device, and/or system discussed herein. The compute node 1450 may be embodied as a type of device, appliance, computer, or other "thing" capable of communicating with other edge, networking, or endpoint components. For example, compute node 1450 may be embodied as a smartphone, a mobile compute device, a smart appliance, an in-vehicle compute system (e.g., a navigation system), an edge compute node, a NAN, switch, router, bridge, hub, and/or other device or system capable of performing the described functions.

The compute node 1450 includes processing circuitry in the form of one or more processors 1452. The processor circuitry 1452 includes circuitry such as, but not limited to one or more processor cores and one or more of cache memory, low drop-out voltage regulators (LDOs), interrupt controllers, serial interfaces such as SPI, I²C or universal programmable serial interface circuit, real-time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1452 may include one or more hardware accelerators (e.g., same or similar to acceleration circuitry 1464), which may be microprocessors, programmable processing devices (e.g., FPGA, ASIC, etc.), or the like. The one or more accelerators may include, for example, computer vision and/or deep learning accelerators. In some implementations, the processor circuitry 1452 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor circuitry 1452 may be, for example, one or more processor cores (CPUs), application processors and/or application processing units (APUs), graphics processing units (GPUs), RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, a special purpose processing unit and/or specialized processing unit, or any other known processing elements, or any suitable combination thereof. In some implementations, the processor circuitry 1452 may be embodied as a specialized x-processing unit (xPU) also known as a data processing unit (DPU), infrastructure processing unit (IPU), or network processing unit (NPU). An xPU may be embodied as a standalone circuit or circuit package, integrated within an SoC, or integrated with networking circuitry (e.g., in a SmartNIC, or enhanced SmartNIC), acceleration circuitry, storage devices, storage disks, and/or AI hardware (e.g., GPUs or programmed FPGAs). The xPU may be designed to receive programming to process one or more data streams and perform specific tasks and actions for the data streams (e.g., hosting microservices, performing service management or orchestration, organizing or managing server or data center hardware, managing service meshes, or collecting and distributing telemetry), outside of a CPU or general purpose processing hardware. However, an xPU, a SoC, a CPU, and other variations of the processor circuitry 1452 may work in coordination with each other to execute many types of operations and instructions within and on behalf of the compute node 1450.

The processors (or cores) 1452 may be coupled with or may include memory/storage and may be configured to execute instructions stored in the memory/storage to enable various applications or operating systems to run on the platform 1450. The processors (or cores) 1452 is configured to operate application software to provide a specific service to a user of the platform 1450. Additionally or alternatively, the processor(s) 1452 may be a special-purpose processor (s)/controller(s) configured (or configurable) to operate according to the elements, features, and implementations discussed herein.

As examples, the processor(s) 1452 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1452 may be a part of a system on a chip (SoC), System-in-Package (SiP), a multi-chip package (MCP), and/or the like, in which the processor(s) 1452 and other components are formed into a single integrated circuit, or a single package, such as the Edison™ or Galileo™ SoC boards from Intel® Corporation. Other examples of the processor(s) 1452 are mentioned elsewhere in the present disclosure.

The processor(s) 1452 may communicate with system memory 1454 over an interconnect (IX) 1456. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1458 may also couple to the processor 1452 via the IX 1456.

In an example, the storage 1458 may be implemented via a solid-state disk drive (SSDD) and/or high-speed electrically erasable memory (commonly referred to as "flash memory"). Other devices that may be used for the storage 1458 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 1454 and/or storage circuitry 1458 may also incorporate three-dimensional (3D) cross-point (XPOINT) memories from Intel® and Micron®.

In low power implementations, the storage 1458 may be on-die memory or registers associated with the processor 1452. However, in some examples, the storage 1458 may be implemented using a micro hard disk drive (HDD). Further, any number of new technologies may be used for the storage 1458 in addition to, or instead of, the technologies described, such resistance change memories, phase change memories, holographic memories, or chemical memories, among others.

The components of edge computing device 1450 may communicate over an interconnect (IX) 1456. The IX 1456 may represent any suitable type of connection or interface such as, for example, metal or metal alloys (e.g., copper, aluminum, etc.), fiber, and/or the like. The IX 1456 may include any number of IX, fabric, and/or interface technologies, including instruction set architecture (ISA), extended ISA (eISA), Inter-Integrated Circuit (I2C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX technology, RapidIO™ IX, Coherent Accelerator Processor Interface (CAPI), OpenCAPI, cache coherent interconnect for accelerators (CCIX), Gen-Z Consortium IXs, Hyper-Transport IXs, NVLink provided by NVIDIA®, a Time-Trigger Protocol (TTP) system, a FlexRay system, PROFI-BUS, ARM® Advanced eXtensible Interface (AXI), ARM® Advanced Microcontroller Bus Architecture (AMBA) IX, HyperTransport, Infinity Fabric (IF), and/or any number of other IX technologies. The IX 1456 may be a proprietary bus, for example, used in a SoC based system.

The IX 1456 couples the processor 1452 to communication circuitry 1466 for communications with other devices, such as a remote server (not shown) and/or the connected edge devices 1462. The communication circuitry 1466 is a hardware element, or collection of hardware elements, used to communicate over one or more networks (e.g., cloud 1463) and/or with other devices (e.g., edge devices 1462).

The transceiver 1466 may use any number of frequencies and protocols, such as 2.4 Gigahertz (GHz) transmissions under [IEEE802154], using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1462. For example, a wireless local area network (WLAN) unit may be used to implement WiFi® communications in accordance with [IEEE80211]. In addition, wireless wide area communications, e.g., according to a cellular or other wireless wide area protocol, may occur via a wireless wide area network (WWAN) unit.

The wireless network transceiver 1466 (or multiple transceivers) may communicate using multiple standards or radios for communications at a different range. For example, the compute node 1450 may communicate with close devices, e.g., within about 10 meters, using a local transceiver based on BLE, or another low power radio, to save power. More distant connected edge devices 1462, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1466 (e.g., a radio transceiver) may be included to communicate with devices or services in the edge cloud 1463 via local or wide area network protocols. The wireless network transceiver 1466 may be an LPWA transceiver that follows [IEEE802154] (or variants thereof), among others. The compute node 1463 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in [IEEE802154] may be used.

Any number of other radio communications and protocols may be used in addition to the systems mentioned for the wireless network transceiver 1466, as described herein. For example, the transceiver 1466 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1466 may include radios that are compatible with any number of 3GPP specifications, such as LTE and 5G/NR communication systems, discussed in further detail at the end of the present disclosure. A network interface controller (NIC) 1468 may be included to provide a wired communication to nodes of the edge cloud 1463 or to other devices, such as the connected edge devices 1462 (e.g., operating in a mesh). The wired communication may provide an Ethernet connection or may be based on other types of networks, such as Fiber Channel (FC), FC over Ethernet (FCoE), or FCoE Initiator Protocol (FIP), iSCSI, Controller Area Network (CAN), Local Interconnect Network (LIN), DeviceNet, ControlNet, Data Highway+, or PROFINET, among many others. An additional NIC 1468 may be included to enable connecting to a second network, for example, a first NIC 1468 providing communications to the cloud over Ethernet, and a second NIC 1468 providing communications to other devices over another type of network.

Given the variety of types of applicable communications from the device to another component or network, applicable communications circuitry used by the device may include or be embodied by any one or more of components 1464, 1466, 1468, or 1470. Accordingly, in various examples, applicable means for communicating (e.g., receiving, transmitting, etc.) may be embodied by such communications circuitry.

The compute node 1450 may include or be coupled to acceleration circuitry 1464, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 1464 may comprise logic blocks or logic fabric and other interconnected resources that may be programmed (configured) to perform various functions, such as the procedures, methods, functions, etc. discussed herein. In such implementations, the acceleration circuitry 1464 may also include memory cells (e.g., EPROM, EEPROM, flash memory, static memory (e.g., SRAM, anti-fuses, etc.) used to store logic blocks, logic fabric, data, etc. in LUTs and the like.

The IX 1456 also couples the processor 1452 to a sensor hub or external interface 1470 that is used to connect additional devices or subsystems. The additional/external devices may include sensors 1472, actuators 1474, and positioning circuitry 1475. The sensor circuitry 1472 includes devices, modules, or subsystems whose purpose is to detect events or changes in its environment and send the information (sensor data) about the detected events to some other a device, module, subsystem, etc. Examples of such sensors 1472 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 1450); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and/or the like.

The actuators 1474, allow platform 1450 to change its state, position, and/or orientation, or move or control a mechanism or system. The actuators 1474 comprise electrical and/or mechanical devices for moving or controlling a mechanism or system, and converts energy (e.g., electric current or moving air and/or liquid) into some kind of motion. The actuators 1474 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1474 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 1450 may be configured to operate one or more actuators 1474 based on one or more captured events and/or instructions or control signals received from a service provider and/or various client systems.

The positioning circuitry 1475 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1475 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 1475 may include a Micro-Technology for Positioning, Navigation, and Timing (Micro-PNT) IC that uses a master timing clock to perform position tracking/estimation without GNSS assistance. The positioning circuitry 1475 may also be part of, or interact with, the communication circuitry 1466 to communicate with the nodes and components of the positioning network. The positioning circuitry 1475 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 1475 is, or includes an INS, which is a system or device that uses sensor circuitry 1472 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the platform 1450 without the need for external references.

In some optional examples, various input/output (I/O) devices may be present within or connected to, the compute node 1450, which are referred to as input circuitry 1486 and output circuitry 1484 in FIG. 14. The input circuitry 1486 and output circuitry 1484 include one or more user interfaces designed to enable user interaction with the platform 1450 and/or peripheral component interfaces designed to enable peripheral component interaction with the platform 1450. Input circuitry 1486 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1484 may be included to show information or otherwise convey information, such as sensor readings, actuator position(s), or other like information. Data and/or graphics may be displayed on one or more user interface components of the output circuitry 1484. Output circuitry 1484 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1450. The output circuitry 1484 may also include speakers or other audio emitting devices, printer(s), and/or the like. Additionally or alternatively, the sensor circuitry 1472 may be used as the input circuitry 1484 (e.g., an image capture device, motion capture device, or the like) and one or more actuators 1474 may be used as the output device circuitry 1484 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1476 may power the compute node 1450, although, in examples in which the compute node 1450 is mounted in a fixed location, it may have a power supply coupled to an electrical grid, or the battery may be used as a backup or for temporary capabilities. The battery 1476 may be a lithium ion battery, or a metal-air battery, such as a zinc-air battery, an aluminum-air battery, a lithium-air battery, and the like.

A battery monitor/charger 1478 may be included in the compute node 1450 to track the state of charge (SoCh) of the battery 1476, if included. The battery monitor/charger 1478 may be used to monitor other parameters of the battery 1476 to provide failure predictions, such as the state of health (SoH) and the state of function (SoF) of the battery 1476. The battery monitor/charger 1478 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1478 may communicate the information on the battery 1476 to the processor 1452 over the IX 1456. The battery monitor/charger 1478 may also include an analog-to-digital (ADC) converter that enables the processor 1452 to directly monitor the voltage of the battery 1476 or the current flow from the battery 1476. The battery parameters may be used to determine actions that the compute node 1450 may perform, such as transmission frequency, mesh network operation, sensing frequency, and the like.

A power block 1480, or other power supply coupled to a grid, may be coupled with the battery monitor/charger 1478 to charge the battery 1476. In some examples, the power block 1480 may be replaced with a wireless power receiver to obtain the power wirelessly, for example, through a loop antenna in the compute node 1450. A wireless battery charging circuit, such as an LTC4020 chip from Linear Technologies of Milpitas, California, among others, may be included in the battery monitor/charger 1478. The specific charging circuits may be selected based on the size of the battery 1476, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1458 may include instructions 1483 in the form of software, firmware, or hardware commands to implement the techniques described herein. Although such instructions 1482, 1483 are shown as code blocks included in the memory 1454 and the storage 1458, any of the code blocks 1482, 1483 may be replaced with hardwired circuits, for example, built into an application specific integrated circuit (ASIC) or programmed into an FPGA, or the like.

In an example, the instructions 1481, 1482, 1483 provided via the memory 1454, the storage 1458, or the processor 1452 may be embodied as a non-transitory machine-readable medium (NTMRM) 1460 including code to direct the processor 1452 to perform electronic operations in the compute node 1450. The processor 1452 may access the NTMRM 1460 over the IX 1456. For instance, the NTMRM 1460 may be embodied by devices described for the storage 1458 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The NTMRM 1460 may include instructions to direct the processor 1452 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Computer program code for carrying out operations of the present disclosure (e.g., computational logic and/or instructions 1481, 1482, 1483) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code 1481, 1482, 1483 for carrying out operations of the present disclosure may also be written in any combination of the programming languages discussed herein. The program code may execute entirely on the system 1450, partly on the system 1450, as a stand-alone software package, partly on the system 1450 and partly on a remote computer or entirely on the remote computer or server. In the latter scenario, the remote computer may be connected to the system 1450 through any type of network, including a LAN or WAN, or the connection may be made to an external computer (e.g., through the Internet using an Internet Service Provider (ISP)).

In an example, the instructions 1481, 1482, 1483 on the processor circuitry 1452 (separately, or in combination with the instructions 1481, 1482, 1483) may configure execution or operation of a trusted execution environment (TEE) 1490. The TEE 1490 operates as a protected area accessible to the processor circuitry 1402 to enable secure access to data and secure execution of instructions. In some embodiments, the TEE 1490 may be a physical hardware device that is separate from other components of the system 1450 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 1490 may be implemented as secure enclaves, which are isolated regions of code and/or data within the processor and/or memory/storage circuitry of the system 1450. Only code executed within a secure enclave may access data within the same secure enclave, and the secure enclave may only be accessible using the secure application (which may be implemented by an application processor or a tamper-resistant microcontroller). Various implementations of the TEE 1490, and an accompanying secure area in the processor circuitry 1452 or the memory circuitry 1454 and/or storage circuitry 1458 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1400 through the TEE 1490 and the processor circuitry 1452. Additionally or alternatively, the memory circuitry 1454 and/or storage circuitry 1458 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 1404 and/or storage circuitry 1408 may be divided into one or more trusted memory regions for storing applications or software modules of the TEE 1490.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

FIG. 14 depicts a high-level view of components of a varying device, subsystem, or arrangement of a compute node. However, some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

The components of the device 1450 and/or any of the devices and/or systems discussed herein may be servers, appliances, network infrastructure, machines, robots, drones, and/or any other type of computing devices. For example, an edge cloud may include an appliance computing device that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., electromagnetic interference (EMI), and/or radio-frequency interference (RFI), electromagnetic radiation, vibration, relatively extreme temperatures, and the like), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 14. The edge cloud may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

4. Example Implementations

Additional examples of the presently described methods, devices, systems, and networks discussed herein include the following, non-limiting implementations. Each of the following non-limiting examples may stand on its own or may be combined in any permutation or combination with any one or more of the other examples provided below or throughout the present disclosure.

Example 1 includes a method for providing flow-specific slicing, the method comprising: causing instantiation of a virtual lane in a data center network (DCN) to be used for a flow-specific slice for a service hosted by a service provider environment; mapping a network slice instance (NSI) in a communication network (NW) to the instantiated virtual lane; and causing an end-to-end (e2e) connection to be established for the flow-specific slice, wherein the e2e connection is established between a user application operated by a user device and a service provider application operated by the service provider environment, and the flow-specific slice includes the instantiated virtual lane and the NSI based on the mapping.

Example 2 includes the method of example 1 and/or any other example(s) herein, wherein the method includes: sending a request for network slice creation to an NW orchestrator in the NW, wherein the request is to cause the NW orchestrator to create the NSI.

Example 3 includes the method of example 2 and/or any other example(s) herein, wherein the request is to cause the NW orchestrator to instruct a radio access network (RAN) to provision resources for the network slice.

Example 4 includes the method of examples 2-3 and/or any other example(s) herein, wherein the request is to cause the NW orchestrator to instruct a core network (CN) to provision resources for the network slice.

Example 5 includes the method of examples 2-4 and/or any other example(s) herein, wherein the request includes quality of service (QoS) parameters for the flow-specific slice or the NSI.

Example 6 includes the method of example 5 and/or any other example(s) herein, wherein the QoS parameters are based on a service level agreement (SLA) defined for the flow-specific slice.

Example 7 includes the method of examples 2-6 and/or any other example(s) herein, wherein the request includes user information related to the user device.

Example 8 includes the method of examples 2-7 and/or any other example(s) herein, wherein the request includes a length of time or a set of time periods during which the flow-specific slice is to be active or inactive.

Example 9 includes the method of examples 2-8 and/or any other example(s) herein, wherein the method includes: receiving, from the NW orchestrator, a response based on the request for network slice creation, wherein the response includes network slice configuration information for the NSI.

Example 10 includes the method of example 9 and/or any other example(s) herein, wherein the response includes a network slice identifier (ID) assigned to the NSI.

Example 11 includes the method of examples 9-10 and/or any other example(s) herein, wherein the method includes: provisioning the service provider application with a flow-specific slice configuration based on the network slice configuration information.

Example 12 includes the method of example 11 and/or any other example(s) herein, wherein the method includes: receiving network slice feedback from the NW, wherein the feedback includes metrics related to operation of the network slice in the NW; updating the flow-specific slice configuration based on the received feedback; and provisioning the service provider application with the updated flow-specific slice configuration, wherein the updated flow-specific slice configuration is to cause changes to QoS parameters of the flow-specific slice or cause changes to resources allocated to the flow-specific slice.

Example 13 includes the method of examples 1-12 and/or any other example(s) herein, wherein the flow-specific slice belongs to a data flow, and flow-specific packets belonging to the data flow are communicated between the user application and the service provider application in the flow-specific slice.

Example 14 includes the method of example 13 and/or any other example(s) herein, wherein the method includes: determining whether received packets belong to the data flow based on metadata included in the received packets.

Example 15 includes the method of example 14 and/or any other example(s) herein, wherein the determining whether received packets belong to the data flow includes: extracting the metadata from the received packets; comparing the extracted metadata with flow-specific slice information of the flow-specific slice; and routing the received packets to be sent over the flow-specific slice when the extracted metadata matches the flow-specific slice information.

Example 16 includes the method of example 15 and/or any other example(s) herein, wherein a service mesh is used to route the received packets to the service provider application, and route packets processed by the service provider application to the flow-specific slice.

Example 17 includes the method of example 13 and/or any other example(s) herein, wherein the method includes: receiving packets from the service provider application that belong to the data flow; and inserting metadata into the received packets, wherein the inserted metadata is to cause the received packets to be routed through the flow-specific slice to the user application.

Example 18 includes the method of examples 14-17 and/or any other example(s) herein, wherein the metadata includes a flow-specific slice ID assigned to the flow-specific slice.

Example 19 includes the method of examples 14-18 and/or any other example(s) herein, wherein the metadata includes a network operator ID assigned to the NW.

Example 20 includes the method of examples 18-19 and/or any other example(s) herein, wherein the metadata is included in a header section of the received packets or included in a payload section of the received packets.

Example 21 includes the method of examples 2-20 and/or any other example(s) herein, wherein the NW orchestrator is one or more of an RAN intelligent controller (RIC) in an Open RAN Alliance (O-RAN) framework; a Network Slice Management Function (NSMF) in a Third Generation Partnership Project (3GPP) Fifth Generation (5G) system, a 3GPP 5G Network Slice Orchestrator, a Zero-touch System Management (ZSM) function in a ZSM framework, an Open Network Automation Platform (ONAP) module in an ONAP framework, a Network Slice Controller in an IETF Network Slice framework, a Network Slice Orchestrator in an IETF Network Slice framework, and a container orchestration engine in a containerization framework.

Example 22 includes the method of examples 1-21 and/or any other example(s) herein, wherein the NW is a cellular network or a wireless local area network (WLAN).

Example 23 includes the method of example 22 and/or any other example(s) herein, wherein the cellular network is a 3GPP 5G network or a 3GPP LTE network, and the WLAN network is a WiFi network.

Example 24 includes the method of examples 1-23 and/or any other example(s) herein, wherein the DCN includes a cloud computing service or an edge computing network.

Example 25 includes the method of examples 1-24 and/or any other example(s) herein, wherein the method is performed by a service provider orchestrator in the service provider environment or a DCN orchestrator in the DCN.

Example 26 includes the method of example 25 and/or any other example(s) herein, wherein the service provider orchestrator is one or more of a RIC in an O-RAN framework; an NSMF in a 3GPP 5G system, a Network Slice Orchestrator in a 3GPP 5G system, a ZSM function in a ZSM framework, an ONAP module in an ONAP framework, a Network Slice Controller in an IETF Network Slice framework, a Network Slice Orchestrator in an IETF Network Slice framework, and a container orchestration engine in a containerization framework.

Example 27 includes the method of examples 25-26 and/or any other example(s) herein, wherein the DCN orchestrator is one or more of a RIC in an O-RAN framework; an NSMF in a 3GPP 5G system, a Network Slice Orchestrator in a 3GPP 5G system, a ZSM function in a ZSM framework, an ONAP module in an ONAP framework, a Network Slice Controller in an IETF Network Slice framework, a Network Slice Orchestrator in an IETF Network Slice framework, and a container orchestration engine in a containerization framework.

Example 28 includes the method of examples 1-27 and/or any other example(s) herein, wherein a first end of the e2e connection is the user application and a second end of the e2e connection is the service provider application.

Example 29 includes the method of example 28 and/or any other example(s) herein, wherein the service provider application is a cloud computing service or an application operated by one or more cloud compute nodes.

Example 30 includes the method of example 28 and/or any other example(s) herein, wherein the service provider application is an edge computing application operated by one or more edge compute nodes.

Example 31 includes the method of example 28 and/or any other example(s) herein, wherein the service provider application is a radio access network (RAN) function operated by one or more RAN nodes in a RAN.

Example 32 includes the method of example 31 and/or any other example(s) herein, wherein the RAN belongs to the NW.

Example 33 includes the method of example 28 and/or any other example(s) herein, wherein the service provider application is a network function within a core network of the NW.

Example 34 includes the method of example 28 and/or any other example(s) herein, wherein the service provider application is a network function within a core network of the NW.

Example 35 includes the method of examples 1-34 and/or any other example(s) herein, wherein the service provider environment is an edge computing network including at least one edge compute node.

Example 36 includes the method of example 35 and/or any other example(s) herein, wherein the edge compute node is co-located with a RAN node.

Example 37 includes the method of examples 1-34 and/or any other example(s) herein, wherein the service provider environment is a cloud computing service or a cluster of cloud compute nodes in the cloud computing service.

Example 38 includes the method of examples 1-34 and/or any other example(s) herein, wherein the service provider environment includes a cluster of cloud compute nodes of a cloud computing service and a set of edge compute nodes in an edge computing network.

Example 39 includes the method of examples 1-34 and/or any other example(s) herein, wherein the service provider environment is an edge cloud including a set of edge compute nodes and a cloud data center.

Example 40 includes the method of examples 1-34 and/or any other example(s) herein, wherein the service provider environment is a RAN.

Example 41 includes the method of examples 1-40 and/or any other example(s) herein, wherein the service provider environment includes a set of servers within the DCN, wherein zero or more servers of the set of servers within the DCN are virtual machines.

Example 42 includes the method of example 41 and/or any other example(s) herein, wherein the DCN is an edge data center implemented by one or more edge compute nodes.

Example 43 includes the method of examples 41-42 and/or any other example(s) herein, wherein the DCN is part of a cloud computing service.

Example 44 includes one or more computer readable media comprising instructions, wherein execution of the instructions by processor circuitry is to cause the processor circuitry to perform the method of any of examples 1-43 and/or any other example(s) herein. Example 45 includes a computer program comprising the instructions of example 44 and/or any other example(s) herein. Example 46 includes an Application Programming Interface defining functions, methods, variables, data structures, and/or protocols for the computer program of example 45 and/or any other example(s) herein. Example 47 includes an apparatus comprising circuitry loaded with the instructions of example 44 and/or any other example(s) herein. Example 48 includes an apparatus comprising circuitry operable to run the instructions of example 44 and/or any other example(s) herein. Example 49 includes an integrated circuit comprising one or more of the processor circuitry and the one or more computer readable media of example 44 and/or any other example(s) herein. Example 50 includes a computing system comprising the one or more computer readable media and the processor circuitry of example 44 and/or any other example(s) herein. Example 51 includes an apparatus comprising means for executing the instructions of example 44 and/or any other example(s) herein. Example 52 includes a signal generated as a result of executing the instructions of example 44 and/or any other example(s) herein. Example 53 includes a data unit generated as a result of executing the instructions of example 44 and/or any other example(s) herein, wherein the data unit is a datagram, network packet, data frame, data segment, a Protocol Data Unit (PDU), a Service Data Unit (SDU), a message, or a database object. Example 54 includes a signal encoded with the data unit of example 53 and/or any other example(s) herein. Example 55 includes an electromagnetic signal carrying the instructions of example 44 and/or any other example(s) herein. Example 56 includes an apparatus comprising means for performing the method of any of examples 1-43 and/or any other example(s) herein.

5. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" at least in some examples refers to two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "colocated" or "co-located" at least in some examples refers to two or more elements being in the same place or location, or relatively close to one another (e.g., within some predetermined distance from one another). Additionally or alternatively, the term "colocated" or "co-located" at least in some examples refers to the placement or deployment of two or more compute elements or compute nodes together in a secure dedicated storage facility, or within a same enclosure or housing.

The term "establish" or "establishment" at least in some examples refers to (partial or in full) acts, tasks, operations, etc., related to bringing or the readying the bringing of something into existence either actively or passively (e.g., exposing a device identity or entity identity). Additionally or alternatively, the term "establish" or "establishment" at least in some examples refers to (partial or in full) acts, tasks, operations, etc., related to initiating, starting, or warming communication or initiating, starting, or warming a relationship between two entities or elements (e.g., establish a session, establish a session, etc.). Additionally or alternatively, the term "establish" or "establishment" at least in some examples refers to initiating something to a state of working readiness. The term "established" at least in some examples refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some examples refers to (partial or in full) acts, tasks, operations, etc., of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive the stream of packets (or the following parameters and templates or template values).

The term "receipt" at least in some examples refers to any action (or set of actions) involved with receiving or obtaining an object, data, data unit, etc., and/or the fact of the object, data, data unit, etc. being received. The term "receipt" at least in some examples refers to an object, data, data unit, and the like, being pushed to a device, system, element, etc. (e.g., often referred to as a push model), pulled by a device, system, element, etc. (e.g., often referred to as a pull model), and/or the like.

The term "element" at least in some examples refers to a unit that is indivisible at a given level of abstraction and has a clearly defined boundary, wherein an element may be any type of entity including, for example, one or more devices, systems, controllers, network elements, modules, etc., or combinations thereof.

The term "measurement" at least in some examples refers to the observation and/or quantification of attributes of an object, event, or phenomenon. Additionally or alternatively, the term "measurement" at least in some examples refers to a set of operations having the object of determining a measured value or measurement result, and/or the actual instance or execution of operations leading to a measured value.

The term "signal" at least in some examples refers to an observable change in a quality and/or quantity. Additionally or alternatively, the term "signal" at least in some examples refers to a function that conveys information about of an object, event, or phenomenon. Additionally or alternatively, the term "signal" at least in some examples refers to any time varying voltage, current, or electromagnetic wave that may or may not carry information. The term "digital signal" at least in some examples refers to a signal that is constructed from a discrete set of waveforms of a physical quantity so as to represent a sequence of discrete values.

The term "lightweight" or "lite" at least in some examples refers to an application or computer program designed to use a relatively small amount of resources such as having a relatively small memory footprint, low processor usage, and/or overall low usage of system resources. The term "lightweight protocol" at least in some examples refers to a communication protocol that is characterized by a relatively small overhead. Additionally or alternatively, the term "lightweight protocol" at least in some examples refers to a protocol that provides the same or enhanced services as a standard protocol, but performs faster than standard proto-cols, has lesser overall size in terms of memory footprint, uses data compression techniques for processing and/or transferring data, drops or eliminates data deemed to be nonessential or unnecessary, and/or uses other mechanisms to reduce overall overheard and/or footprint.

The term "identifier" at least in some examples refers to a value, or a set of values, that uniquely identify an identity in a certain scope. Additionally or alternatively, the term "identifier" at least in some examples refers to a sequence of characters that identifies or otherwise indicates the identity of a unique object, element, or entity, or a unique class of objects, elements, or entities. Additionally or alternatively, the term "identifier" at least in some examples refers to a sequence of characters used to identify or refer to an application, program, session, object, element, entity, variable, set of data, and/or the like. The "sequence of characters" mentioned previously at least in some examples refers to one or more names, labels, words, numbers, letters, symbols, and/or any combination thereof. Additionally or alternatively, the term "identifier" at least in some examples refers to a name, address, label, distinguishing index, and/or attribute. Additionally or alternatively, the term "identifier" at least in some examples refers to an instance of identification. The term "persistent identifier" at least in some examples refers to an identifier that is reused by a device or by another device associated with the same person or group of persons for an indefinite period.

The term "identification" at least in some examples refers to a process of recognizing an identity as distinct from other identities in a particular scope or context, which may involve processing identifiers to reference an identity in an identity database.

The terms "ego" (as in, e.g., "ego device") and "subject" (as in, e.g., "data subject") at least in some examples refers to an entity, element, device, system, etc., that is under consideration or being considered. The terms "neighbor" and "proximate" (as in, e.g., "proximate device") at least in some examples refers to an entity, element, device, system, etc., other than an ego device or subject device.

The term "network path" or "path" at least in some examples refers to a data communications feature of a communication system describing the sequence and identity of system components visited by one or more packets, where the components of the path may be either logical or physical. The term "network forwarding path" at least in some examples refers to an ordered list of connection points forming a chain of NFs and/or nodes, along with policies associated to the list.

The term "circuitry" at least in some examples refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" at least in some examples refers to, is part of, or includes circuitry capable of sequentially and automatically carrying out a sequence of arithmetic or logical operations, or recording, storing, and/or transferring digital data. The term "processor circuitry" at least in some examples refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some examples refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data. The term "memory footprint" at least in some examples refers to the amount of memory that a program, application, or other unit of software or program code uses or references while running.

The term "interface circuitry" at least in some examples refers to, is part of, or includes circuitry that enables the exchange of information between two or more components or devices. The term "interface circuitry" at least in some examples refers to one or more hardware interfaces, for example, buses, I/O interfaces, peripheral component interfaces, network interface cards, and/or the like.

The term "device" at least in some examples refers to a physical entity embedded inside, or attached to, another physical entity in its vicinity, with capabilities to convey digital information from or to that physical entity.

The term "entity" at least in some examples refers to a distinct component of an architecture or device, or information transferred as a payload.

The term "controller" at least in some examples refers to an element or entity that has the capability to affect a physical entity, such as by changing its state or causing the physical entity to move.

The term "terminal" at least in some examples refers to point at which a conductor from a component, device, or network comes to an end. Additionally or alternatively, the term "terminal" at least in some examples refers to an electrical connector acting as an interface to a conductor and creating a point where external circuits can be connected. In some embodiments, terminals may include electrical leads, electrical connectors, electrical connectors, solder cups or buckets, and/or the like.

The term "compute node" or "compute device" at least in some examples refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some examples refers to any type interconnected electronic devices, computer devices, or components thereof. Additionally, the terms "computer system" and/or "system" at least in some examples refer to various components of a computer that are communicatively coupled with one another. Furthermore, the term "computer system" and/or "system" at least in some examples refer to multiple computer devices and/or multiple computing systems that are communicatively coupled with one another and configured to share computing and/or networking resources.

The term "architecture" at least in some examples refers to a computer architecture or a network architecture. The term "computer architecture" at least in some examples refers to a physical and logical design or arrangement of software and/or hardware elements in a computing system or platform including technology standards for interacts therebetween. The term "network architecture" at least in some examples refers to a physical and logical design or arrangement of software and/or hardware elements in a network including communication protocols, interfaces, and media transmission.

The term "platform" at least in some examples refers to an environment in which software, applications, program code, and the like can be executed or otherwise operate. The term "platform" at least in some examples can include one or more of hardware, virtualized hardware, an embedded system (e.g., IoT device, or the like), an operating system (OS), a virtual machine, a container, a client application (e.g., web browser, mobile app, or the like), a distributed application, a web platform, cloud computing service, APIs, an integrated development environment, a sandbox, and/or other elements that program code is executed in or with.

The term "appliance," "computer appliance," or the like, at least in some examples refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some examples refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. Examples of UEs, client devices, etc., include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmet-mounted display devices, augmented reality (AR) devices, virtual reality (VR) devices, mixed reality (MR) devices, and/or other like systems or devices.

The term "station" or "STA" at least in some examples refers to a logical entity that is a singly addressable instance of a medium access control (MAC) and physical layer (PHY) interface to the wireless medium (WM). The term "wireless medium" or WM" at least in some examples refers to the medium used to implement the transfer of protocol data units (PDUs) between peer physical layer (PHY) entities of a wireless local area network (LAN).

The term "network element" at least in some examples refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "network controller" at least in some examples refers to a functional block that centralizes some or all of the control and management functionality of a network domain and may provide an abstract view of the network domain to other functional blocks via an interface.

The term "access point" or "AP" at least in some examples refers to an entity that contains one station (STA) and provides access to the distribution services, via the wireless medium (WM) for associated STAs. An AP comprises a STA and a distribution system access function (DSAF).

The term "network access node" or "NAN" at least in some examples refers to a network element in a radio access network (RAN) responsible for the transmission and reception of radio signals in one or more cells or coverage areas to or from a UE or station. A "network access node" or "NAN" can have an integrated antenna or may be connected to an antenna array by feeder cables. Additionally or alternatively, a "network access node" or "NAN" may include specialized digital signal processing, network function hardware, and/or compute hardware to operate as a compute node. In some examples, a "network access node" or "NAN" may be split into multiple functional blocks operating in software for flexibility, cost, and performance. In some examples, a "network access node" or "NAN" may be a base station (e.g., an evolved Node B (eNB) or a next generation Node B (gNB)), an access point and/or wireless network access point, router, switch, hub, radio unit or remote radio head, Transmission Reception Point (TRxP), a gateway device (e.g., Residential Gateway, Wireline 5G Access Network, Wireline 5G Cable Access Network, Wireline BBF Access Network, and the like), network appliance, and/or some other network access hardware.

The term "network access controller" at least in some examples refers to a functional block that centralizes some or all of the control and management functionality of a network domain and optionally provides an abstract view of its domain to other functional blocks via well-defined interfaces.

The term "E-UTEAN NodeB", "eNodeB", or "eNB" at least in some examples refers to a RAN node providing E-UTRA user plane (PDCP/RLC/MAC/PHY) and control plane (RRC) protocol terminations towards a UE, and connected via an S1 interface to the Evolved Packet Core (EPC). Two or more eNBs are interconnected with each other (and/or with one or more en-gNBs) by means of an X2 interface. The term "next generation eNB" or "ng-eNB" at least in some examples refers to a RAN node providing E-UTRA user plane and control plane protocol terminations towards a UE, and connected via the NG interface to the 5GC. Two or more ng-eNBs are interconnected with each other (and/or with one or more gNBs) by means of an Xn interface. The term "Next Generation NodeB", "gNodeB", or "gNB" at least in some examples refers to a RAN node providing NR user plane and control plane protocol terminations towards a UE, and connected via the NG interface to the 5GC. Two or more gNBs are interconnected with each other (and/or with one or more ng-eNBs) by means of an Xn interface. The term "E-UTRA-NR gNB" or "en-gNB" at least in some examples refers to a RAN node providing NR user plane and control plane protocol terminations towards a UE, and acting as a Secondary Node in E-UTRA-NR Dual Connectivity (EN-DC) scenarios (see e.g., 3GPP TS 37.340 v16.6.0 (2021-07-09)). Two or more en-gNBs are interconnected with each other (and/or with one or more eNBs) by means of an X2 interface. The term "Next Generation RAN node" or "NG-RAN node" at least in some examples refers to either a gNB or an ng-eNB.

The term "Central Unit" or "CU" at least in some examples refers to a logical node hosting radio resource control (RRC), Service Data Adaptation Protocol (SDAP), and/or Packet Data Convergence Protocol (PDCP) protocols/layers of an NG-RAN node, or RRC and PDCP protocols of the en-gNB that controls the operation of one or more DUs; a CU terminates an F1 interface connected with a DU and may be connected with multiple DUs. The term "Distributed Unit" or "DU" at least in some examples refers to a logical node hosting Backhaul Adaptation Protocol (BAP), F1 application protocol (F1AP), radio link control (RLC), medium access control (MAC), and physical (PHY) layers of the NG-RAN node or en-gNB, and its operation is partly controlled by a CU; one DU supports one or multiple cells, and one cell is supported by only one DU; and a DU terminates the F1 interface connected with a CU. The term "Radio Unit" or "RU" at least in some examples refers to a logical node hosting PHY layer or Low-PHY layer and radiofrequency (RF) processing based on a lower layer functional split. The term "split architecture" at least in some examples refers to an architecture in which an RU and DU are physically separated from one another, and/or an architecture in which a DU and a CU are physically separated from one another. The term "integrated architecture at least in some examples refers to an architecture in which an RU and DU are implemented on one platform, and/or an architecture in which a DU and a CU are implemented on one platform.

The term "Residential Gateway" or "RG" at least in some examples refers to a device providing, for example, voice, data, broadcast video, video on demand, to other devices in customer premises. The term "Wireline 5G Access Network" or "W-5GAN" at least in some examples refers to a wireline AN that connects to a 5GC via N2 and N3 reference points. The W-5GAN can be either a W-5GBAN or W-5GCAN. The term "Wireline 5G Cable Access Network" or "W-5GCAN" at least in some examples refers to an access network defined in/by CableLabs. The term "Wireline BBF Access Network" or "W-5GBAN" at least in some examples refers to an Access Network defined in/by the Broadband Forum (BBF). The term "Wireline Access Gateway Function" or "W-AGF" at least in some examples refers to a Network function in W-SGAN that provides connectivity to a 3GPP 5G Core network (5GC) to 5G-RG and/or FN-RG. The term "5G-RG" at least in some examples refers to an RG capable of connecting to a 5GC playing the role of a user equipment with regard to the 5GC; it supports secure element and exchanges N1 signaling with 5GC. The 5G-RG can be either a 5G-BRG or 5G-CRG.

The term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

The term "cloud computing" or "cloud" at least in some examples refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "computing resource" or simply "resource" at least in some examples refers to any physical or virtual component, or usage of such components, of limited availability within a computer system or network. Examples of computing resources include usage/access to, for a period of time, servers, processor(s), storage equipment, memory devices, memory areas, networks, electrical power, input/ output (peripheral) devices, mechanical devices, network connections (e.g., channels/links, ports, network sockets, etc.), operating systems, virtual machines (VMs), software/ applications, computer files, and/or the like. A "hardware resource" at least in some examples refers to compute, storage, and/or network resources provided by physical hardware element(s). A "virtualized resource" at least in some examples refers to compute, storage, and/or network resources provided by virtualization infrastructure to an application, device, system, etc. The term "network resource" or "communication resource" at least in some examples refers to resources that are accessible by computer devices/systems via a communications network. The term "system resources" at least in some examples refers to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" at least in some examples refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The term "cloud service provider" (or CSP) indicates an organization which operates typically large-scale "cloud" resources comprised of centralized, regional, and Edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to Edge computing.

The term "data center" at least in some examples refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "data center bridging" or "DCB" at least in some examples refers to a set of protocols and capabilities for use in a data center environment. Additionally or alternatively, the term "data center bridging" or "DCB" at least in some examples refers to a set of enhancements to the Ethernet LAN communication protocol for use in data center environments, and in some examples, for use with clustering and storage area networks. Additionally or alternatively, the term "data center bridging" or "DCB" at least in some examples refers to means for exchanging configuration information according to the Data Center Bridging eXchange protocol (DCBX) (sometimes referred to as the "Data Center Bridging Capabilities Exchange Protocol").

The term "network function" or "NF" at least in some examples refers to a functional block within a network infrastructure that has one or more external interfaces and a defined functional behavior. The term "network service" or "NS" at least in some examples refers to a composition of Network Function(s) and/or Network Service(s), defined by its functional and behavioral specification(s).

The term "RAN function" or "RANF" at least in some examples refers to a functional block within a RAN architecture that has one or more external interfaces and a defined behavior related to the operation of a RAN or RAN node. Additionally or alternatively, the term "RAN function" or "RANF" at least in some examples refers to a set of functions and/or NFs that are part of a RAN.

The term "Application Function" or "AF" at least in some examples refers to an element or entity that interacts with a 3GPP core network in order to provide services. Additionally or alternatively, the term "Application Function" or "AF" at least in some examples refers to an edge compute node or ECT framework from the perspective of a 5G core network.

The term "edge compute function" or "ECF" at least in some examples refers to an element or entity that performs an aspect of an edge computing technology (ECT), an aspect of edge networking technology (ENT), or performs an aspect of one or more edge computing services running over the ECT or ENT.

The term "management function" at least in some examples refers to a logical entity playing the roles of a service consumer and/or a service producer. The term "management service" at least in some examples refers to a set of offered management capabilities.

The term "slice" at least in some examples refers to a set of characteristics and behaviors that separate one instance, traffic, data flow, application, application instance, link or connection, RAT, device, system, entity, element, and the like from another instance, traffic, data flow, application, application instance, link or connection, RAT, device, system, entity, element, and the like, or separate one type of instance, and the like, from another instance, and the like. The term "network slice" at least in some examples refers to a logical network that provides specific network capabilities and network characteristics and/or supports various service properties for network slice service consumers. Additionally or alternatively, the term "network slice" at least in some examples refers to a logical network topology connecting a number of endpoints using a set of shared or dedicated network resources that are used to satisfy specific service level objectives (SLOs) and/or service level agreements (SLAs). The term "network slicing" at least in some examples refers to methods, processes, techniques, and technologies used to create one or multiple unique logical and virtualized networks over a common multi-domain infrastructure. Additionally or alternatively, the term "network slicing" at least in some examples refers to means for creating multiple logical and virtualized networks over a common multi-domain infrastructure. The term "access network slice", "radio access network slice", or "RAN slice" at least in some examples refers to a part of a network slice that provides resources in a RAN to fulfill one or more application and/or service requirements (e.g., SLAs, and the like). The term "network slice instance" or "NSF at least in some examples refers to a set of NF instances and the required resources (e.g. compute, storage and networking resources) which form a deployed network slice. Additionally or alternatively, the term "network slice instance" at least in some examples refers to a representation of a service view of a network slice. The term "network instance" at least in some examples refers to information identifying a domain. The term "service consumer" at least in some examples refers to an entity that consumes one or more services.

The term "service producer" at least in some examples refers to an entity that offers, serves, or otherwise provides one or more services. The term "service provider" at least in some examples refers to an organization or entity that provides one or more services to at least one service consumer. For purposes of the present disclosure, the terms "service provider" and "service producer" may be used interchangeably even though these terms may refer to difference concepts. Examples of service providers include cloud service provider (CSP), network service provider (NSP), application service provider (ASP) (e.g., Application software service provider in a service-oriented architecture (ASSP)), internet service provider (ISP), telecommunications service provider (TSP), online service provider (OSP), payment service provider (PSP), managed service provider (MSP), storage service providers (SSPs), SAML service provider, and/or the like. At least in some examples, SLAs may specify, for example, particular aspects of the service to be provided including quality, availability, responsibilities, metrics by which service is measured, as well as remedies or penalties should agreed-on service levels not be achieved. The term "SAML service provider" at least in some examples refers to a system and/or entity that receives and accepts authentication assertions in conjunction with a single sign-on (SSO) profile of the Security Assertion Markup Language (SAML) and/or some other security mechanism(s).

The term "network function virtualization" or "NFV" at least in some examples refers to the principle of separating network functions from the hardware they run on by using virtualization techniques and/or virtualization technologies. Additionally or alternatively, the term "network function virtualization" or "NFV" involves the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. Additionally or alternatively, NFV processing and data storage will occur at the Edge data centers that are connected directly to the local cellular site, within the infrastructure Edge. The term "virtualized NF" or "VNF" at least in some examples refers to an implementation of an NF that can be deployed on a Network Function Virtualization Infrastructure (NFVI). Additionally or alternatively, the term "virtualized NF" or "VNF" at least in some examples refers to a software-based NF operating on multi-function, multi-purpose compute resources (e.g., x86, ARM processing architecture, and the like), which are used by NFV in place of dedicated physical equipment. The term "Network Functions Virtualization Infrastructure Manager" or "NFVI" at least in some examples refers to a totality of all hardware and software components that build up the environment in which VNFs are deployed. The term "Virtualized Infrastructure Manager" or "VIM" at least in some examples refers to a functional block that is responsible for controlling and managing the NFVI compute, storage and network resources, usually within one operator's infrastructure domain.

The term "virtualization container", "execution container", or "container" at least in some examples refers to a partition of a compute node that provides an isolated virtualized computation environment. The term "OS container" at least in some examples refers to a virtualization container utilizing a shared Operating System (OS) kernel of its host, where the host providing the shared OS kernel can be a physical compute node or another virtualization container. Additionally or alternatively, the term "virtualization container" or "container" at least in some examples refers to a lightweight and portable executable image that contains software and some or all of its dependencies. Additionally or alternatively, the term "container" at least in some examples refers to a standard unit of software (or a package) including code and its relevant dependencies, and/or an abstraction at the application layer that packages code and dependencies together. Additionally or alternatively, the term "container" or "container image" at least in some examples refers to a lightweight, standalone, executable software package that includes everything needed to run an application such as, for example, code, runtime environment, system tools, system libraries, and settings.

The term "virtual machine" or "VM" at least in some examples refers to a virtualized computation environment that behaves in a same or similar manner as a physical computer and/or a server. The term "hypervisor" at least in some examples refers to a software element that partitions the underlying physical resources of a compute node, creates VMs, manages resources for VMs, and isolates individual VMs from each other.

The term "edge compute node" or "edge compute device" at least in some examples refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some examples refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some examples refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". In some examples, membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties. Additionally or alternatively, the term "cluster" at least in some examples refers to a set of worker machines (also referred to as "nodes") that run containerized applications. Additionally or alternatively, the term "worker machine" or "node" at least in some examples refers to a physical or virtual machine or computing device.

The term "Data Network" or "DN" at least in some examples refers to a network hosting data-centric services such as, for example, operator services, the internet, third-party services, or enterprise networks. Additionally or alternatively, a DN at least in some examples refers to service networks that belong to an operator or third party, which are offered as a service to a client or user equipment (UE). DNs are sometimes referred to as "Packet Data Networks" or "PDNs". The term "Local Area Data Network" or "LADN" at least in some examples refers to a DN that is accessible by the UE only in specific locations, that provides connectivity to a specific DNN, and whose availability is provided to the UE.

The term "Internet of Things" or "IoT" at least in some examples refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smart home, smart building and/or smart city technologies), and the like. IoT devices are usually low-power devices without heavy compute or storage capabilities. The term "Edge IoT devices" at least in some examples refers to any kind of IoT devices deployed at a network's edge.

The term "protocol" at least in some examples refers to a predefined procedure or method of performing one or more operations. Additionally or alternatively, the term "protocol" at least in some examples refers to a common means for unrelated objects to communicate with each other (sometimes also called interfaces). The term "communication protocol" at least in some examples refers to a set of standardized rules or instructions implemented by a communication device and/or system to communicate with other devices and/or systems, including instructions for packetizing/depacketizing data, modulating/demodulating signals, implementation of protocols stacks, and/or the like. In various implementations, a "protocol" and/or a "communication protocol" may be represented using a protocol stack, a finite state machine (FSM), and/or any other suitable data structure. The term "standard protocol" at least in some examples refers to a protocol whose specification is published and known to the public and is controlled by a standards body. The term "protocol stack" or "network stack" at least in some examples refers to an implementation of a protocol suite or protocol family. In various implementations, a protocol stack includes a set of protocol layers, where the lowest protocol deals with low-level interaction with hardware and/or communications interfaces and each higher layer adds additional capabilities.

The term "application layer" at least in some examples refers to an abstraction layer that specifies shared communications protocols and interfaces used by hosts in a communications network. Additionally or alternatively, the term "application layer" at least in some examples refers to an abstraction layer that interacts with software applications that implement a communicating component, and may include identifying communication partners, determining resource availability, and synchronizing communication. Examples of application layer protocols include HTTP, HTTPs, File Transfer Protocol (FTP), Dynamic Host Configuration Protocol (DHCP), Internet Message Access Protocol (IMAP), Lightweight Directory Access Protocol (LDAP), MQTT, Remote Authentication Dial-In User Service (RADIUS), Diameter protocol, Extensible Authentication Protocol (EAP), RDMA over Converged Ethernet version 2 (RoCEv2), Real-time Transport Protocol (RTP), RTP Control Protocol (RTCP), Real Time Streaming Protocol (RTSP), Skinny Client Control Protocol (SCCP), Session Initiation Protocol (SIP), Session Description Protocol (SDP), Simple Mail Transfer Protocol (SMTP), Simple Network Management Protocol (SNMP), Simple Service Discovery Protocol (SSDP), Small Computer System Interface (SCSI), Internet SCSI (iSCSI), iSCSI Extensions for RDMA (iSER), Transport Layer Security (TLS), voice over IP (VoIP), Virtual Private Network (VPN), Extensible Messaging and Presence Protocol (XMPP), and/or the like.

The term "session layer" at least in some examples refers to an abstraction layer that controls dialogues and/or connections between entities or elements, and may include establishing, managing and terminating the connections between the entities or elements.

The term "transport layer" at least in some examples refers to a protocol layer that provides end-to-end (e2e)

communication services such as, for example, connection-oriented communication, reliability, flow control, and multiplexing. Examples of transport layer protocols include datagram congestion control protocol (DCCP), fibre channel protocol (FBC), Generic Routing Encapsulation (GRE), GPRS Tunneling (GTP), Micro Transport Protocol (μTP), Multipath TCP (MPTCP), MultiPath QUIC (MPQUIC), Multipath UDP (MPUDP), Quick UDP Internet Connections (QUIC), Remote Direct Memory Access (RDMA), Resource Reservation Protocol (RSVP), Stream Control Transmission Protocol (SCTP), transmission control protocol (TCP), user datagram protocol (UDP), and/or the like.

The term "network layer" at least in some examples refers to a protocol layer that includes means for transferring network packets from a source to a destination via one or more networks. Additionally or alternatively, the term "network layer" at least in some examples refers to a protocol layer that is responsible for packet forwarding and/or routing through intermediary nodes. Additionally or alternatively, the term "network layer" or "internet layer" at least in some examples refers to a protocol layer that includes interworking methods, protocols, and specifications that are used to transport network packets across a network. As examples, the network layer protocols include internet protocol (IP), IP security (IPsec), Internet Control Message Protocol (ICMP), Internet Group Management Protocol (IGMP), Open Shortest Path First protocol (OSPF), Routing Information Protocol (RIP), RDMA over Converged Ethernet version 2 (RoCEv2), Subnetwork Access Protocol (SNAP), and/or some other internet or network protocol layer.

The term "link layer" or "data link layer" at least in some examples refers to a protocol layer that transfers data between nodes on a network segment across a physical layer. Examples of link layer protocols include logical link control (LLC), medium access control (MAC), Ethernet, RDMA over Converged Ethernet version 1 (RoCEv1), and/or the like.

The term "radio resource control", "RRC layer", or "RRC" at least in some examples refers to a protocol layer or sublayer that performs system information handling; paging; establishment, maintenance, and release of RRC connections; security functions; establishment, configuration, maintenance and release of Signaling Radio Bearers (SRBs) and Data Radio Bearers (DRBs); mobility functions/services; QoS management; and some sidelink specific services and functions over the Uu interface (see e.g., 3GPP TS 36.331 v17.0.0 (2022-04-13) and/or 3GPP TS 38.331 v17.0.0 (2022-04-19)). The term "Service Data Adaptation Protocol", "SDAP layer", or "SDAP" at least in some examples refers to a protocol layer or sublayer that performs mapping between QoS flows and a data radio bearers (DRBs) and marking QoS flow IDs (QFI) in both DL and UL packets (see e.g., 3GPP TS 37.324 v17.0.0 (2022-04-13)). The term "Packet Data Convergence Protocol", "PDCP layer", or "PDCP" at least in some examples refers to a protocol layer or sublayer that performs transfer user plane or control plane data; maintains PDCP sequence numbers (SNs); header compression and decompression using the Robust Header Compression (ROHC) and/or Ethernet Header Compression (EHC) protocols; ciphering and deciphering; integrity protection and integrity verification; provides timer based SDU discard; routing for split bearers; duplication and duplicate discarding; reordering and in-order delivery; and/or out-of-order delivery (see e.g., 3GPP TS 36.323 v17.0.0 (2022-04-15) and/or 3GPP TS 38.323 v17.0.0 (2022-04-14)). The term "radio link control layer", "RLC layer", or "RLC" at least in some examples refers to a protocol layer or sublayer that performs transfer of upper layer PDUs; sequence numbering independent of the one in PDCP; error Correction through ARQ; segmentation and/or re-segmentation of RLC SDUs; reassembly of SDUs; duplicate detection; RLC SDU discarding; RLC re-establishment; and/or protocol error detection (see e.g., 3GPP TS 38.322 v17.0.0 (2022-04-15) and 3GPP TS 36.322 v17.0.0 (2022-04-15)).

The term "medium access control protocol", "MAC protocol", or "MAC" at least in some examples refers to a protocol that governs access to the transmission medium in a network, to enable the exchange of data between stations in a network. Additionally or alternatively, the term "medium access control layer", "MAC layer", or "MAC" at least in some examples refers to a protocol layer or sublayer that performs functions to provide frame-based, connection-less-mode (e.g., datagram style) data transfer between stations or devices. Additionally or alternatively, the term "medium access control layer", "MAC layer", or "MAC" at least in some examples refers to a protocol layer or sublayer that performs mapping between logical channels and transport channels; multiplexing/demultiplexing of MAC SDUs belonging to one or different logical channels into/from transport blocks (TB) delivered to/from the physical layer on transport channels; scheduling information reporting; error correction through HARQ (one HARQ entity per cell in case of CA); priority handling between UEs by means of dynamic scheduling; priority handling between logical channels of one UE by means of logical channel prioritization; priority handling between overlapping resources of one UE; and/or padding (see e.g., [IEEE802], 3GPP TS 38.321 v17.0.0 (2022-04-14) and 3GPP TS 36.321 v17.0.0 (2022-04-19)). The term "physical layer", "PHY layer", or "PHY" at least in some examples refers to a protocol layer or sublayer that includes capabilities to transmit and receive modulated signals for communicating in a communications network (see e.g., [IEEE802], 3GPP TS 38.201 v17.0.0 (2022-01-05) and 3GPP TS 36.201 v17.0.0 (2022-03-31)).

The term "radio technology" at least in some examples refers to technology for wireless transmission and/or reception of electromagnetic radiation for information transfer. The term "radio access technology" or "RAT" at least in some examples refers to the technology used for the underlying physical connection to a radio based communication network. The term "RAT type" at least in some examples may identify a transmission technology and/or communication protocol used in an access network, for example, new radio (NR), Long Term Evolution (LTE), narrowband IoT (NB-IOTT), untrusted non-3GPP, trusted non-3GPP, trusted Institute of Electrical and Electronics Engineers (IEEE) 802 (e.g., *IEEE Standard for Information Technology—Telecommunications and Information Exchange between Systems—Local and Metropolitan Area Networks—Specific Requirements—Part* 11: *Wireless LAN Medium Access Control (MAC) and Physical Layer (PHY) Specifications*, IEEE Std 802.11-2020, pp. 1-4379 (26 Feb. 2021) ("[IEEE80211]") *IEEE Standard for Local and Metropolitan Area Networks: Overview and Architecture*, IEEE Std 802-2014, pp. 1-74 (30 Jun. 2014) ("[IEEE802]"), *IEEE Standard for Local and Metropolitan Area Network—Bridges and Bridged Networks*, IEEE Std 802.1Q-2018, pp. 1-1993 (6 Jul. 2018) ("[IEEE802.1Q]"), the contents of which is hereby incorporated by reference in its entirety), non-3GPP access, MuLTEfire, WiMAX, wireline, wireline-cable, wireline broadband forum (wireline-BBF), and the like. Examples of RATs and/or wireless communications protocols include Advanced Mobile Phone System (AMPS) technologies such as Digital AMPS (D-AMPS), Total Access Communication System (TACS) (and variants thereof such as Extended TACS (ETACS), and/or the like); Global System for Mobile Communications (GSM) technologies such as Circuit Switched Data (CSD), High-Speed CSD (HSCSD), General Packet Radio Service (GPRS), and Enhanced Data Rates for GSM Evolution (EDGE); Third Generation Partnership Project (3GPP) technologies including, for example, Universal Mobile Telecommunications System (UMTS) (and variants thereof such as UMTS Terrestrial Radio Access (UTRA), Wideband Code Division Multiple Access (W-CDMA), Freedom of Multimedia Access (FOMA), Time Division-Code Division Multiple Access (TD-CDMA), Time Division-Synchronous Code Division Multiple Access (TD-SCDMA), and/or the like), Generic Access Network (GAN)/Unlicensed Mobile Access (UMA), High Speed Packet Access (HSPA) (and variants thereof such as HSPA Plus (HSPA+), and/or the like), Long Term Evolution (LTE) (and variants thereof such as LTE-Advanced (LTE-A), Evolved UTRA (E-UTRA), LTE Extra, LTE-A Pro, LTE LAA, MuLTEfire, and/or the like), Fifth Generation (5G) or New Radio (NR), etc.; ETSI technologies such as High Performance Radio Metropolitan Area Network (Hiper-MAN) and the like; IEEE technologies such as [IEEE802] and/or WiFi (e.g., [IEEE80211] and variants thereof), Worldwide Interoperability for Microwave Access (WiMAX) (see e.g., *IEEE Standard for Air Interface for Broadband Wireless Access Systems*, IEEE Std 802.16-2017, pp. 1-2726 (2 Mar. 2018) ("[WiMAX]") and variants thereof), Mobile Broadband Wireless Access (MBWA)/iBurst (e.g., IEEE 802.20 and variants thereof), etc.; Integrated Digital Enhanced Network (iDEN) (and variants thereof such as Wideband Integrated Digital Enhanced Network (WiDEN); millimeter wave (mmWave) technologies/standards (e.g., wireless systems operating at 10-300 GHz and above such as 3GPP 5G, Wireless Gigabit Alliance (WiGig) standards (e.g., IEEE 802.11ad, IEEE 802.11ay, and the like); short-range and/or wireless personal area network (WPAN) technologies/standards such as Bluetooth (and variants thereof such as Bluetooth 5.3, Bluetooth Low Energy (BLE), and/or the like), IEEE 802.15 technologies/standards (e.g., IEEE Standard for Low-Rate Wireless Networks, IEEE Std 802.15.4-2020, pp. 1-800 (23 Jul. 2020) ("[IEEE802154] "), ZigBee, Thread, IPv6 over Low power WPAN (6LoWPAN), WirelessHART, MiWi, ISA100.11a, IEEE Standard for Local and metropolitan area networks—Part 15.6: Wireless Body Area Networks, IEEE Std 802.15.6-2012, pp. 1-271 (29 Feb. 2012), WiFi-direct, ANT/ANT+, Z-Wave, 3GPP Proximity Services (ProSe), Universal Plug and Play (UPnP), low power Wide Area Networks (LPWANs), Long Range Wide Area Network (LoRA or LoRaWAN™), and the like; optical and/or visible light communication (VLC) technologies/standards such as IEEE Standard for Local and metropolitan area networks—Part 15.7: Short-Range Optical Wireless Communications, IEEE Std 802.15.7-2018, pp. 1-407 (23 Apr. 2019), and the like; V2X communication including 3GPP cellular V2X (C-V2X), *IEEE Guide for Wireless Access in Vehicular Environments (WAVE) Architecture*, IEEE STANDARDS ASSOCIATION, IEEE 1609.0-2019 (10 Apr. 2019) ("[IEEE16090]"), *V2X Communications Message Set Dictionary*, SAE INT'L (23 Jul. 2020) ("[J2735_202007]"), *Wireless Access in Vehicular Environments (WAVE) (IEEE Standard for Information technology—Local and metropolitan area networks—Specific requirements—Part 11: Wireless LAN Medium Access Control (MAC) and Physical Layer (PHY) Specifications Amendment 6: Wireless Access in Vehicular*

*Environments*, IEEE Std 802.11p-2010, pp. 1-51 (15 Jul. 2010) ("[IEEE80211p]"), which is now part of [IEEE80211]), IEEE 802.11bd (e.g., for vehicular ad-hoc environments), Dedicated Short Range Communications (DSRC), Intelligent-Transport-Systems (ITS) (including the European ITS-G5, ITS-G5B, ITS-G5C, ITS-G5, and the like); Sigfox; Mobitex; 3GPP2 technologies such as cdma-One (2G), Code Division Multiple Access 2000 (CDMA 2000), and Evolution-Data Optimized or Evolution-Data Only (EV-DO); Push-to-talk (PTT), Mobile Telephone System (MTS) (and variants thereof such as Improved MTS (IMTS), Advanced MTS (AMTS), and/or the like); Personal Digital Cellular (PDC); Personal Handy-phone System (PHS), Cellular Digital Packet Data (CDPD); Cellular Digital Packet Data (CDPD); DataTAC; Digital Enhanced Cordless Telecommunications (DECT) (and variants thereof such as DECT Ultra Low Energy (DECT ULE), DECT-2020, DECT-5G, and/or the like); Ultra High Frequency (UHF) communication; Very High Frequency (VHF) communication; and/or any other suitable RAT or protocol. In addition to the aforementioned RATs/standards, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" at least in some examples refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some examples refers to a connection between two devices through a RAT for the purpose of transmitting and receiving information.

The term "subframe" at least in some examples at least in some examples refers to a time interval during which a signal is signaled. In some implementations, a subframe is equal to 1 millisecond (ms). The term "time slot" at least in some examples at least in some examples refers to an integer multiple of consecutive subframes. The term "superframe" at least in some examples at least in some examples refers to a time interval comprising two time slots.

The term "reliability" at least in some examples refers to the ability of a computer-related component (e.g., software, hardware, or network element/entity) to consistently perform a desired function and/or operate according to a specification. Additionally or alternatively, the term "reliability" at least in some examples refers to the probability that a product, system, or service will perform its intended function adequately for a specified period of time, or will operate in a defined environment with a low probability of failure. Additionally or alternatively, the term "reliability" in the context of network communications (e.g., "network reliability") at least in some examples refers to the ability of a network to carry out communication. The term "network reliability" at least in some examples refers to a probability or measure of delivering a specified amount of data from a source to a destination (or sink).

The term "flow" at least in some examples refers to a sequence of data and/or data units (e.g., datagrams, packets, or the like) from a source entity/element to a destination entity/element. Additionally or alternatively, the term "flow" at least in some examples refers to a group of packets or datagrams that may follow the same route or path and/or experience the same level of service. Additionally or alternatively, the terms "flow" or "traffic flow" at least in some examples refer to an artificial and/or logical equivalent to a call, connection, or link. Additionally or alternatively, the terms "flow" or "traffic flow" at least in some examples refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms "flow" or "traffic flow" at least in some examples refer to a set of data and/or data units (e.g., datagrams, packets, or the like) passing an observation point in a network during a certain time interval. Additionally or alternatively, the term "flow" at least in some examples refers to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, etc. For purposes of the present disclosure, the terms "traffic flow", "data flow", "dataflow", "packet flow", "network flow", and/or "flow" may be used interchangeably even though these terms at least in some examples refers to different concepts.

The term "dataflow" or "data flow" at least in some examples refers to the movement of data through a system including software elements, hardware elements, or a combination of both software and hardware elements. Additionally or alternatively, the term "dataflow" or "data flow" at least in some examples refers to a path taken by a set of data from an origination or source to destination that includes all nodes through which the set of data travels.

The term "stream" at least in some examples refers to a sequence of data elements made available over time. At least in some examples, functions that operate on a stream, which may produce another stream, are referred to as "filters," and can be connected in pipelines, analogously to function composition; filters may operate on one item of a stream at a time, or may base an item of output on multiple items of input, such as a moving average. Additionally or alternatively, the term "stream" or "streaming" at least in some examples refers to a manner of processing in which an object is not represented by a complete logical data structure of nodes occupying memory proportional to a size of that object, but are processed "on the fly" as a sequence of events.

The term "distributed computing" at least in some examples refers to computation resources that are geographically distributed within the vicinity of one or more localized networks' terminations. The term "distributed computations" at least in some examples refers to a model in which components located on networked computers communicate and coordinate their actions by passing messages interacting with each other in order to achieve a common goal.

The term "service" at least in some examples refers to the provision of a discrete function within a system and/or environment. Additionally or alternatively, the term "service" at least in some examples refers to a functionality or a set of functionalities that can be reused. The term "microservice" at least in some examples refers to one or more processes that communicate over a network to fulfil a goal using technology-agnostic protocols (e.g., HTTP or the like). Additionally or alternatively, the term "microservice" at least in some examples refers to services that are relatively small in size, messaging-enabled, bounded by contexts, autonomously developed, independently deployable, decentralized, and/or built and released with automated processes. Additionally or alternatively, the term "microservice" at least in some examples refers to a self-contained piece of functionality with clear interfaces, and may implement a layered architecture through its own internal components. Additionally or alternatively, the term "microservice architecture" at least in some examples refers to a variant of the service-oriented architecture (SOA) structural style wherein applications are arranged as a collection of loosely-coupled services (e.g., fine-grained services) and may use lightweight protocols. The term "network service" at least in some examples refers to a composition of NF(s) and/or Network Service(s), defined by its functional and behavioral specification.

The term "session" at least in some examples refers to a temporary and interactive information interchange between two or more communicating devices, two or more application instances, between a computer and user, and/or between any two or more entities or elements. Additionally or alternatively, the term "session" at least in some examples refers to a connectivity service or other service that provides or enables the exchange of data between two entities or elements. The term "network session" at least in some examples refers to a session between two or more communicating devices over a network. The term "web session" at least in some examples refers to session between two or more communicating devices over the Internet or some other network. The term "session identifier," "session ID," or "session token" at least in some examples refers to a piece of data that is used in network communications to identify a session and/or a series of message exchanges.

The term "quality" at least in some examples refers to a property, character, attribute, or feature of something as being affirmative or negative, and/or a degree of excellence of something. Additionally or alternatively, the term "quality" at least in some examples, in the context of data processing, refers to a state of qualitative and/or quantitative aspects of data, processes, and/or some other aspects of data processing systems.

The term "Quality of Service" or "QoS' at least in some examples refers to a description or measurement of the overall performance of a service (e.g., telephony and/or cellular service, network service, wireless communication/connectivity service, cloud computing service, etc.). In some cases, the QoS may be described or measured from the perspective of the users of that service, and as such, QoS may be the collective effect of service performance that determine the degree of satisfaction of a user of that service. In other cases, QoS at least in some examples refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein. Additionally or alternatively, the term "Quality of Service" or "QoS' at least in some examples refers to mechanisms that provide traffic-forwarding treatment based on flow-specific traffic classification. In some implementations, the term "Quality of Service" or "QoS" can be used interchangeably with the term "Class of Service" or "CoS".

The term "Class of Service" or "CoS' at least in some examples refers to mechanisms that provide traffic-forwarding treatment based on non-flow-specific traffic classification. In some implementations, the term "Class of Service" or "CoS" can be used interchangeably with the term "Quality of Service" or "QoS".

The term "QoS flow" at least in some examples refers to the finest granularity for QoS forwarding treatment in a network. The term "5G QoS flow" at least in some examples refers to the finest granularity for QoS forwarding treatment in a 5G System (5GS). Traffic mapped to the same QoS flow (or 5G QoS flow) receive the same forwarding treatment. The term "QoS Identifier" at least in some examples refers to a scalar that is used as a reference to a specific QoS forwarding behavior (e.g., packet loss rate, packet delay budget, etc.) to be provided to a QoS flow. This may be implemented in an access network by referencing node specific parameters that control the QoS forwarding treatment (e.g., scheduling weights, admission thresholds, queue management thresholds, link layer protocol configuration, etc.).

The term "forwarding treatment" at least in some examples refers to the precedence, preferences, and/or prioritization a packet belonging to a particular dataflow receives in relation to other traffic of other dataflows. Additionally or alternatively, the term "forwarding treatment" at least in some examples refers to one or more parameters, characteristics, and/or configurations to be applied to packets belonging to a dataflow when processing the packets for forwarding. Examples of such characteristics may include resource type (e.g., non-guaranteed bit rate (GBR), GBR, delay-critical GBR, etc.); priority level; class or classification; packet delay budget; packet error rate; averaging window; maximum data burst volume; minimum data burst volume; scheduling policy/weights; queue management policy; rate shaping policy; link layer protocol and/or RLC configuration; admission thresholds; etc. In some implementations, the term "forwarding treatment" may be referred to as "Per-Hop Behavior" or "PHB".

The term "queue" at least in some examples refers to a collection of entities (e.g., data, objects, events, etc.) are stored and held to be processed later. that are maintained in a sequence and can be modified by the addition of entities at one end of the sequence and the removal of entities from the other end of the sequence; the end of the sequence at which elements are added may be referred to as the "back", "tail", or "rear" of the queue, and the end at which elements are removed may be referred to as the "head" or "front" of the queue. Additionally, a queue may perform the function of a buffer, and the terms "queue" and "buffer" may be used interchangeably throughout the present disclosure. The term "enqueue" at least in some examples refers to one or more operations of adding an element to the rear of a queue. The term "dequeue" at least in some examples refers to one or more operations of removing an element from the front of a queue.

The term "PDU Connectivity Service" at least in some examples refers to a service that provides exchange of protocol data units (PDUs) between a UE and a data network (DN). The term "PDU Session" at least in some examples refers to an association between a UE and a DN that provides a PDU connectivity service (see e.g., 3GPP TS 38.415 v17.0.0 (2022 Apr. 6) ("[TS38415]") and 3GPP TS 38.413 v17.1.1 (2022 Jun. 30) ("[TS38413]"), the contents of each of which are hereby incorporated by reference in their entireties); a PDU Session type can be IPv4, IPv6, IPv4v6, Ethernet (se e.g., Ethernet (e.g., IEEE Standard for Ethernet, IEEE Std 802.3-2018, pp. 1-5600 (31 Aug. 2018) ("[IEEE8023]")), Unstructured, or any other network/connection type, such as those discussed herein. The term "PDU Session Resource" at least in some examples refers to an NG-RAN interface (e.g., NG, Xn, and/or E1 interfaces) and radio resources provided to support a PDU Session. The term "multi-access PDU session" or "MA PDU Session" at least in some examples refers to a PDU Session that provides a PDU connectivity service, which can use one access network at a time or multiple access networks simultaneously.

The term "access traffic shaping" or The term "traffic shaping" at least in some examples refers to a bandwidth management technique that manages data transmission to comply with a desired traffic profile or class of service. Traffic shaping ensures sufficient network bandwidth for time-sensitive, critical applications using policy rules, data classification, queuing, QoS, and other techniques. The term "throttling" at least in some examples refers to the regulation of flows into or out of a network, or into or out of a specific device or element. The term "access traffic steering" or "traffic steering" at least in some examples refers to a procedure that selects an access network for a new data flow and transfers the traffic of one or more data flows over the selected access network. Access traffic steering is applicable between one 3GPP access and one non-3GPP access. The term "access traffic switching" or "traffic switching" at least in some examples refers to a procedure that moves some or all traffic of an ongoing data flow from at least one access network to at least one other access network in a way that maintains the continuity of the data flow. The term "access traffic splitting" or "traffic splitting" at least in some examples refers to a procedure that splits the traffic of at least one data flow across multiple access networks. When traffic splitting is applied to a data flow, some traffic of the data flow is transferred via at least one access channel, link, or path, and some other traffic of the same data flow is transferred via another access channel, link, or path.

The term "network address" at least in some examples refers to an identifier for a node or host in a computer network, and may be a unique identifier across a network and/or may be unique to a locally administered portion of the network. The term "application identifier", "application ID", or "app ID" at least in some examples refers to an identifier that can be mapped to a specific application or application instance; in the context of 3GPP 5G/NR systems, an "application identifier" at least in some examples refers to an identifier that can be mapped to a specific application traffic detection rule. Additionally or alternatively, the term "application identifier", "application ID", or "app ID" at least in some examples refers to a collection of entry points and/or data structures that an application program can access when translated into an application executable. The term "endpoint address" at least in some examples refers to an address used to determine the host/authority part of a target URI, where the target URI is used to access an NF service (e.g., to invoke service operations) of an NF service producer or for notifications to an NF service consumer.

Examples of identifiers that could be used as a network address, app ID, endpoint address, and/or any other identifier discussed herein include a Closed Access Group Identifier (CAG-ID), Bluetooth hardware device address (BD_ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, GPRS tunneling protocol (GTP) tunnel endpoint identifier (TEID) (GTP), Radio Network Temporary Identifier (RNTI) (including any RNTI and variants thereof such as those discussed in [TS38300]), International Mobile Equipment Identity (IMEI), IMEI Type Allocation Code (IMEA/TAC), International Mobile Subscriber Identity (IMSI), IMSI software version (IMSISV), permanent equipment identifier (PEI), Local Area Data Network (LADN) DNN, Mobile Subscriber Identification Number (MSIN), Mobile Subscriber/Station ISDN Number (MSISDN), network identifier (NID), Network Slice Instance (NSI) ID, Network Slice Selection Assistance Information (NSSAI), Single NSSAI (S-NSSAI), Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), a connection endpoint identifier (CEPID), an email address, Enterprise Application Server (EAS) ID, an endpoint address, an Electronic Product Code (EPC) as defined by the EPCglobal Tag Data Standard, a Fully Qualified Domain Name (FQDN), flow ID, flow label (e.g., IPv6 flow label, Flexilink flow label, and the like), an ICMP identifier, Intelligence-Defined Network (IDN) identifier(s), an internet protocol (IP) address in an IP network (e.g., IP version 4 (Ipv4), IP version 6 (IPv6), etc.), an Information-Centric Networking (ICN) name (data packet identifier), an internet packet exchange (IPX) address, Local Area Network (LAN) ID, a media access control (MAC) address, Multiprotocol Label Switching (MPLS) labels, personal area network (PAN) ID, a port number (e.g., Transmission Control Protocol (TCP) port number, User Datagram Protocol (UDP) port number), Preferred Path Route (PPR) Identifier, PPR segment ID (SID), QUIC connection ID, RFID tag, service set identifier (SSID) and variants thereof, socket address, telephone numbers in a public switched telephone network (PTSN), a socket address, universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, any of the identifiers/identities discussed in 3GPP TS 38.300 v17.1.0 (2022-07-19) ("[TS38300]") the contents of which are hereby incorporated by reference in its entirety, and/or any other suitable network address and components thereof.

The term "network socket" or "socket" at least in some examples refers to an element that serves as an endpoint for sending and receiving data across a network or for inter-process communication. The structure and properties of a socket can be defined by one or more APIs, and may be identified by a socket address or the like.

The term "port" at least in some examples refers to a communication endpoint, a virtual data connection between two or more entities, and/or a virtual point where network connections start and end. Additionally or alternatively, a "port" at least in some examples is associated with a specific process or service.

The term "tuple" at least in some examples refers to a finite ordered list and/or sequence) of elements. The term "n-tuple" at least in some examples refers to a sequence and/or ordered list of n elements, where n is a number. The term "5-tuple" at least in some examples refers to a set of five values that can be used to identify a network connection or session (e.g., TCP/IP connection, UDP/TCP session, and/or the like). The set of five values can include, for example, a source network address, a destination network address, a source port, a destination port, and a network and/or transport protocol being used.

The term "data rate" at least in some examples refers to a transmission speed of a network. Additionally or alternatively, the term "data rate" at least in some examples refers to the amount of data transmitted during a specified time period and/or the speed at which data is transferred from one entity or element to another entity or element. Additionally or alternatively, the term "data rate" at least in some examples can be used interchangeably with the "bit rate", "data signaling rate", "symbol rate", "throughput", and/or "data transfer rate". The term "bit rate" at least in some examples refers to the number of bits that are conveyed or processed per unit of time. The term "physical rate" or "PHY rate" at least in some examples refers to a speed at which one or more bits are actually sent over a transmission medium. Additionally or alternatively, the term "physical rate" or "PHY rate" at least in some examples refers to a speed at which data can move across a wired or wireless link between a transmitter and a receiver. The term "throughput" or "network throughput" at least in some examples refers to a rate of production or the rate at which something is processed. Additionally or alternatively, the term "throughput" or "network throughput" at least in some examples refers to a rate of successful data delivery over a communication channel. The term "goodput" at least in some examples refers to a number of useful information bits delivered by the network to a certain destination per unit of time. The term "channel capacity" at least in some examples refers to an upper bound on the rate at which data can be reliably transmitted over a communication channel and/or given noise on a channel. The term "bandwidth" at least in some examples refers to the maximum rate of data transfer across a given path. Additionally or alternatively, the term "bandwidth" at least in some examples refers to data carrying capacity of a network or transmission medium.

The term "delay" at least in some examples refers to a time interval between two events. Additionally or alternatively, the term "delay" at least in some examples refers to a time interval between the propagation of a signal and its reception. The term "packet delay" at least in some examples refers to the time it takes to transfer any packet from one point to another. Additionally or alternatively, the term "packet delay" or "per packet delay" at least in some examples refers to the difference between a packet reception time and packet transmission time. Additionally or alternatively, the "packet delay" or "per packet delay" can be measured by subtracting the packet sending time from the packet receiving time where the transmitter and receiver are at least somewhat synchronized. The term "processing delay" at least in some examples refers to an amount of time taken to process a packet in a network node. The term "transmission delay" at least in some examples refers to an amount of time needed (or necessary) to push a packet (or all bits of a packet) into a transmission medium. The term "propagation delay" at least in some examples refers to amount of time it takes a signal's header to travel from a sender to a receiver. The term "network delay" at least in some examples refers to the delay of an a data unit within a network (e.g., an IP packet within an IP network). The term "queuing delay" at least in some examples refers to an amount of time a job waits in a queue until that job can be executed. Additionally or alternatively, the term "queuing delay" at least in some examples refers to an amount of time a packet waits in a queue until it can be processed and/or transmitted. The term "delay bound" at least in some examples refers to a predetermined or configured amount of acceptable delay. The term "per-packet delay bound" at least in some examples refers to a predetermined or configured amount of acceptable packet delay where packets that are not processed and/or transmitted within the delay bound are considered to be delivery failures and are discarded or dropped. The term "packet drop rate" at least in some examples refers to a share of packets that were not sent to the target due to high traffic load or traffic management and should be seen as a part of the packet loss rate. The term "packet loss rate" at least in some examples refers to a share of packets that could not be received by the target, including packets dropped, packets lost in transmission and packets received in wrong format. The term "latency" at least in some examples refers to the amount of time it takes to transfer a first/initial data unit in a data burst from one point to another. The term "performance indicator" at least in some examples refers to performance data aggregated over a group of network functions (NFs), which is derived from performance measurements collected at the NFs that belong to the group, according to the aggregation method identified in a Performance Indicator definition.

The term "application" or "app" at least in some examples refers to a computer program designed to carry out a specific task other than one relating to the operation of the computer itself. Additionally or alternatively, term "application" or "app" at least in some examples refers to a complete and deployable package, environment to achieve a certain function in an operational environment. Additionally or alternatively, the term "application" or "app" at least in some examples refers to a computer program that defines and implements a useful functionality. The term "application executable" or "executable" at least in some examples refers to a representation of an application as collection of executable code. The term "application executable" or "executable" at least in some examples refers to a representation of an application in a programming language such as, for example, assembly language, an object-oriented programming language, a declarative programming language, a markup language, a scripting language, and/or some other type of language.

The term "algorithm" at least in some examples refers to an unambiguous specification of how to solve a problem or a class of problems by performing calculations, input/output operations, data processing, automated reasoning tasks, and/or the like.

The terms "instantiate," "instantiation," and the like at least in some examples refers to the creation of an instance. An "instance" also at least in some examples refers to a concrete occurrence of an object, which may occur, for example, during execution of program code.

The term "data processing" or "processing" at least in some examples refers to any operation or set of operations which is performed on data or on sets of data, whether or not by automated means, such as collection, recording, writing, organization, structuring, storing, adaptation, alteration, retrieval, consultation, use, disclosure by transmission, dissemination or otherwise making available, alignment or combination, restriction, erasure and/or destruction.

The term "packet processor" at least in some examples refers to software and/or hardware element(s) that transform a stream of input packets into output packets (or transforms a stream of input data into output data); examples of the transformations include adding, removing, and modifying fields in a packet header, trailer, and/or payload.

The term "data pipeline" or "pipeline" at least in some examples refers to a set of data processing elements (or data processors) connected in series and/or in parallel, where the output of one data processing element is the input of one or more other data processing elements in the pipeline; the elements of a pipeline may be executed in parallel or in time-sliced fashion and/or some amount of buffer storage can be inserted between elements.

The term "software agent" at least in some examples refers to a computer program that acts for a user or other program in a relationship of agency.

The term "use case" at least in some examples refers to a description of a system from a user's perspective. Use cases sometimes treat a system as a black box, and the interactions with the system, including system responses, are perceived as from outside the system. Use cases typically avoid technical jargon, preferring instead the language of the end user or domain expert.

The term "analytics" at least in some examples refers to the discovery, interpretation, and communication of meaningful patterns in data.

The term "application programming interface" or "API" at least in some examples refers to a set of subroutine definitions, communication protocols, and tools for building software. Additionally or alternatively, the term "application programming interface" or "API" at least in some examples refers to a set of clearly defined methods of communication among various components. In some examples, an API may be for a web-based system, operating system, database system, computer hardware, or software library.

The term "datagram" at least in some examples refers to a unit of data carried by a packet-switched network or otherwise associated with a packet-switched network. A datagram may be structured to have a header section or trailer section that carries control information and a payload section that carries user data. The term "datagram" at least in some examples may be synonymous with any of the following terms, even though they may refer to different aspects: "data unit", a "protocol data unit" or "PDU", a "service data unit" or "SDU", "frame", "packet", a "network packet", "segment", "block", "cell", "chunk", and/or the like. Examples of datagrams, network packets, and the like, include internet protocol (IP) packet, Internet Control Message Protocol (ICMP) packet, UDP packet, TCP packet, SCTP packet, Ethernet frame, RRC messages/packets, SDAP PDU, SDAP SDU, PDCP PDU, PDCP SDU, MAC PDU, MAC SDU, BAP PDU. BAP SDU, RLC PDU, RLC SDU, WiFi frames as discussed in [IEEE80211], and/or other like data structures.

The term "information element" or "IE" at least in some examples refers to a structural element containing one or more fields. Additionally or alternatively, the term "information element" or "IE" at least in some examples refers to a field or set of fields defined in a standard or specification that is used to convey data and/or protocol information.

The term "field" at least in some examples refers to individual contents of an information element, or a data element that contains content. The term "data frame" or "DF" at least in some examples refers to a data type that contains more than one data element in a predefined order. The term "data element" or "DE" at least in some examples refers to a data type that contains one single data. Additionally or alternatively, the term "data element" at least in some examples refers to an atomic state of a particular object with at least one specific property at a certain point in time, and may include one or more of a data element name or identifier, a data element definition, one or more representation terms, enumerated values or codes (e.g., metadata), and/or a list of synonyms to data elements in other metadata registries. Additionally or alternatively, a "data element" at least in some examples refers to a data type that contains data, which may be referred to as the data element's content (or "content items"). Content items may include text content, attributes, properties, and/or other elements referred to as "child elements." Additionally or alternatively, data elements may include zero or more properties and/or zero or more attributes, each of which may be defined as database objects (e.g., fields, records, etc.), object instances, and/or other data elements. An "attribute" at least in some examples refers to a markup construct including a name-value pair that exists within a start tag or empty element tag. Attributes contain data related to its element and/or control the element's behavior.

The term "reference" at least in some examples refers to data useable to locate other data and may be implemented a variety of ways (e.g., a pointer, an index, a handle, a key, an identifier, a hyperlink, etc.).

The term "translation" at least in some examples refers to the process of converting or otherwise changing data from a first form, shape, configuration, structure, arrangement, embodiment, description, etc. into a second form, shape, configuration, structure, arrangement, embodiment, description, etc.; at least in some examples there may be two different types of translation: transcoding and transformation. The term "transcoding" at least in some examples refers to taking information/data in one format (e.g., a packed binary format) and translating the same information/data into another format in the same sequence. Additionally or alternatively, the term "transcoding" at least in some examples refers to taking the same information, in the same sequence, and packaging the information (e.g., bits or bytes) differently. The term "transformation" at least in some examples refers to changing data from one format and writing it in another format, keeping the same order, sequence, and/or nesting of data items. Additionally or alternatively, the term "transformation" at least in some examples involves the process of converting data from a first format or structure into a second format or structure, and involves reshaping the data into the second format to conform with a schema or other like specification. Transformation may include rearranging data items or data objects, which may involve changing the order, sequence, and/or nesting of the data items/objects. Additionally or alternatively, the term "transformation" at least in some examples refers to changing the schema of a data object to another schema.

The term "cryptographic mechanism" at least in some examples refers to any cryptographic protocol and/or cryptographic algorithm. Additionally or alternatively, the term "cryptographic protocol" at least in some examples refers to a sequence of steps precisely specifying the actions required of two or more entities to achieve specific security objectives (e.g., cryptographic protocol for key agreement). Additionally or alternatively, the term "cryptographic algorithm" at least in some examples refers to an algorithm specifying the steps followed by a single entity to achieve specific security objectives (e.g., cryptographic algorithm for symmetric key encryption). The term "cryptographic hash function", "hash function", or "hash") at least in some examples refers to a mathematical algorithm that maps data of arbitrary size (sometimes referred to as a "message") to a bit array of a fixed size (sometimes referred to as a "hash value", "hash", or "message digest"). A cryptographic hash function is usually a one-way function, which is a function that is practically infeasible to invert.

The term "event", in probability theory, at least in some examples refers to a set of outcomes of an experiment (e.g., a subset of a sample space) to which a probability is assigned. Additionally or alternatively, the term "event" at least in some examples refers to a software message indicating that something has happened. Additionally or alternatively, the term "event" at least in some examples refers to an object in time, or an instantiation of a property in an object. Additionally or alternatively, the term "event" at least in some examples refers to a point in space at an instant in time (e.g., a location in space-time). Additionally or alternatively, the term "event" at least in some examples refers to a notable occurrence at a particular point in time.

The term "service level agreement" or "SLA" at least in some examples refers to a level of service expected from a service provider. At least in some examples, an SLA may represent an entire agreement between a service provider and a service consumer that specifies one or more services is to be provided, how the one or more services are to be provided or otherwise supported, times, locations, costs, performance, priorities for different traffic classes and/or QoS classes (e.g., highest priority for first responders, lower priorities for non-critical data flows, and the like), and responsibilities of the parties involved.

The term "service level objective" or "SLO" at least in some examples refers to one or more measurable characteristics, metrics, or other aspects of an SLA such as, for example, availability, throughput, frequency, response time, latency, QoS, QoE, and/or other like performance metrics/measurements. At least in some examples, a set of SLOs may define an expected service (or an service level expectation (SLE)) between the service provider and the service consumer and may vary depending on the service's urgency, resources, and/or budget.

The term "service level indicator" or "SLI" at least in some examples refers to a measure of a service level provided by a service provider to a service consumer. At least in some examples, SLIs form the basis of SLOs, which in turn, form the basis of SLAs. Examples of SLIs include latency (including e2e latency), throughout, availability, error rate, durability, correctness, and/or other like performance metrics/measurements. At least in some examples, term "service level indicator" or "SLI" can be referred to as "SLA metrics" or the like.

The term "service level expectation" or "SLE" at least in some examples refers to an unmeasurable service-related request, but may still be explicitly or implicitly provided in an SLA even if there is little or no way of determining whether the SLE is being met. At least in some examples, an SLO may include a set of SLIs that produce, define, or specify an SLO achievement value. As an example, an availability SLO may depend on multiple components, each of which may have a QoS availability measurement. The combination of QoS measures into an SLO achievement value may depend on the nature and/or architecture of the service.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, and/or other data structures, as comprising a sequence of optional or mandatory data elements (DEs), data frames (DFs), information elements (IEs), and/or the like. However, the requirements of any particular standard should not limit the scope of the present disclosure, and as such, any combination of containers, frames, DFs, DEs, IEs, values, components, fields, actions, features, and/or data structures are possible, including any combination of containers, frames, DFs, DEs, IEs, values, components, fields, actions, features, and/or data structures that are strictly required to be followed in order to conform to such standards or any combination of containers, frames, DFs, DEs, IEs, values, components, fields, actions, features, and/or data structures strongly recommended and/or used with or in the presence/absence of optional elements.

The present disclosure includes the aforementioned description and the accompanying drawings. The present disclosure shows and described, by way of examples and not of limitation, specific implementations in which the subject matter may be practiced. The present disclosure shows and describes the inventive aspects in sufficient detail to enable those skilled in the art to practice the teachings disclosed herein. Although the present disclosure shows and describes specific example implementations, various modifications and changes may be made to these implementations without departing from the broader scope of the present disclosure. Other aspects may be utilized and derived from the implementations discussed herein, such that structural and logical substitutions and changes may be made without departing from the scope of the present disclosure. The present disclosure is not to be taken in a limiting sense, and the scope of various aspects is defined by the appended claims, along with the full range of equivalents to which such claims are entitled.

The invention claimed is:

1. A method of operating a data center network (DCN) orchestrator in a DCN to provide flow-specific slicing, the method comprising:

instantiating a virtual lane in the DCN, wherein the virtual lane is to be used for a flow-specific slice for a service hosted by a service provider environment;

sending, to a network (NW) orchestrator in a communication NW, a request for network slice creation, wherein the request includes quality of service (QoS) parameters for the flow-specific slice, and the request is to cause the NW orchestrator to create a network slice instance (NSI);

receiving, from the NW orchestrator, a response based on the request for network slice creation, wherein the response includes network slice configuration information for the NSI, and the network slice configuration information includes a network slice identifier (ID) assigned to the NSI;

mapping the NSI in the NW to the instantiated virtual lane;

provisioning a service provider application operated by the service provider environment with a flow-specific slice configuration based on the network slice configuration information; and establishing an end-to-end (e2e) connection for the flow-specific slice, wherein the e2e connection is established between a user application operated by a user device and the service provider application, and the flow-specific slice includes the instantiated virtual lane and the NSI based on the mapping:

wherein:

a network function or an application function is to insert metadata into a network packet header section or a network packet payload section:

the metadata is to be based upon packet mapping to the QoS parameters; and the metadata is to be used by one or more layers in flow-specific packet routing.

2. The method of claim 1, wherein the method also comprises:

receiving network slice feedback from the NW, wherein the feedback includes metrics related to operation of the network slice in the NW;

updating the flow-specific slice configuration based on the received feedback; and provisioning the service provider application with the updated flow-specific slice configuration, wherein the updated flow-specific slice configuration is to cause changes to QoS parameters of the flow-specific slice or cause changes to resources allocated to the flow-specific slice.

3. The method of claim 1, wherein the flow-specific slice belongs to a data flow, and flow-specific packets belonging to the data flow are communicated between the user application and the service provider application in the flow-specific slice, and the method also comprises:

determining whether received packets belong to the data flow based on the metadata, wherein the metadata is to be included in the received packets, and wherein, to determine whether received packets belong to the data flow, the method also comprises:

extracting the metadata from the received packets;

comparing the extracted metadata with flow-specific slice information of the flow-specific slice; and routing the received packets to be sent over the flow-specific slice when the extracted metadata matches the flow-specific slice information.

4. The method of claim 3, wherein the method also comprises:

receiving packets from the service provider application that belong to the data flow; and inserting the metadata into the network packet header section or the network packet payload section of the received packets, wherein the inserted metadata is to cause the received packets to be routed through the flow-specific slice to the user application, wherein the metadata includes one or both of a flow-specific slice ID assigned to the flow-specific slice and a network operator ID assigned to the NW.

5. An apparatus to provide flow-specific slicing, the apparatus comprising:

processor circuitry connected to memory circuitry, wherein the processor circuitry is to execute instructions, the instructions, when executed, resulting in the apparatus being configured for performance of operations comprising:

instantiating a virtual lane in a data center network (DCN) to be used for a flow-specific slice for a service hosted by a service provider environment;

mapping a network slice instance (NSI) in a communication network (NW) to the instantiated virtual lane; and establishing an end-to-end (e2e) connection for the flow-specific slice, wherein the e2e connection is established between a user application operated by a user device and a service provider application operated by the service provider environment, and the flow-specific slice includes the instantiated virtual lane and the NSI based on the mapping;

wherein:

a network function or an application function is to insert metadata into a network packet header section or a network packet payload section:

the metadata is to be based upon packet mapping to quality of service (Qos) parameters; and the metadata is to be used by one or more layers in flow-specific packet routing.

6. The apparatus of claim 5, wherein the processor circuitry is to execute the instructions to:

send a request for network slice creation to an NW orchestrator in the NW, wherein the request is to cause the NW orchestrator to create the NSI; and receive, from the NW orchestrator, a response based on the request for network slice creation, wherein the response includes network slice configuration information for the NSI.

7. The apparatus of claim 6, wherein the NW orchestrator is one or more of an RAN intelligent controller (RIC) in an Open RAN Alliance (O-RAN) framework; a Network Slice Management Function (NSMF) in a Third Generation Partnership Project (3GPP) Fifth Generation (5G) system, a 3GPP 5G Network Slice Orchestrator, a Zero-touch System Management (ZSM) function in a ZSM framework, an Open Network Automation Platform (ONAP) module in an ONAP framework, a Network Slice Controller in an IETF Network Slice framework, a Network Slice Orchestrator in an IETF Network Slice framework, and a container orchestration engine in a containerization framework.

8. The apparatus of claim 6, wherein the request is to cause the NW orchestrator to instruct a radio access network (RAN) to provision resources for the network slice or instruct a core network (CN) to provision resources for the network slice.

9. The apparatus of claim 6, wherein the request includes QoS parameters for the flow-specific slice or the NSI, wherein the QoS parameters for the flow-specific slice or the NSI are based on a service level agreement (SLA) defined for the flow-specific slice.

10. The apparatus of claim 9, wherein the request includes user information related to the user device, and a length of time or a set of time periods during which the flow-specific slice is to be active or inactive.

11. The apparatus of claim 6, wherein the response includes a network slice identifier (ID) assigned to the NSI.

12. The apparatus of claim 6, wherein the processor circuitry is to execute the instructions to:

provision the service provider application with a flow-specific slice configuration based on the network slice configuration information.

13. The apparatus of claim 12, wherein the processor circuitry is to execute the instructions to:

receive network slice feedback from the NW, wherein the feedback includes metrics related to operation of the network slice in the NW;

update the flow-specific slice configuration based on the received feedback; and provision the service provider application with the updated flow-specific slice configuration, wherein the updated flow-specific slice configuration is to cause changes to QoS parameters of the flow-specific slice or cause changes to resources allocated to the flow-specific slice.

14. The apparatus of claim 5, wherein the flow-specific slice belongs to a data flow, and flow-specific packets belonging to the data flow are communicated between the user application and the service provider application in the flow-specific slice, and wherein the processor circuitry is to execute the instructions to:

determine whether received packets belong to the data flow based on the metadata, wherein the metadata is to be included in the received packets.

15. The apparatus of claim 14, wherein, to determine whether received packets belong to the data flow, the processor circuitry is to execute the instructions to:

extract the metadata from the received packets;

compare the extracted metadata with flow-specific slice information of the flow-specific slice; and route the received packets to be sent over the flow-specific slice when the extracted metadata matches the flow-specific slice information.

16. The apparatus of claim 15, wherein a service mesh is used to route the received packets to the service provider application, and route packets processed by the service provider application to the flow-specific slice.

17. The apparatus of claim 14, wherein the processor circuitry is to execute the instructions to:

receive packets from the service provider application that belong to the data flow; and insert the metadata into the network packet header section or the network packet payload section of the received packets, wherein the inserted metadata is to cause the received packets to be routed through the flow-specific slice to the user application.

18. The apparatus of claim 17, wherein the metadata includes one or both of a flow-specific slice ID assigned to the flow-specific slice and a network operator ID assigned to the NW.

19. The apparatus of claim 5, wherein the NW is a cellular network or a wireless local area network (WLAN), the DCN includes a cloud computing service or an edge computing network, and the apparatus is a service provider orchestrator in the service provider environment or a DCN orchestrator in the DCN.

20. The apparatus of claim 19, wherein:

the service provider orchestrator is one or more of a RIC in an O-RAN framework, an NSMF in a 3GPP 5G system, a Network Slice Orchestrator in a 3GPP 5G system, a ZSM function in a ZSM framework, an ONAP module in an ONAP framework, a Network Slice Controller in an IETF Network Slice framework, a Network Slice Orchestrator in an IETF Network Slice framework, and a container orchestration engine in a containerization framework; and the DCN orchestrator is one or more of a RIC in an O-RAN framework; an NSMF in a 3GPP 5G system, a Network Slice Orchestrator in a 3GPP 5G system, a ZSM function in a ZSM framework, an ONAP module in an ONAP framework, a Network Slice Controller in an IETF Network Slice framework, a Network Slice Orchestrator in an IETF Network Slice framework, and a container orchestration engine in a containerization framework.

21. One or more non-transitory computer-readable media (NTCRM) comprising instructions for flow-specific slicing, wherein execution of the instructions by one or more processors of a compute node is to result in the compute node being configured to perform operations comprising:

of instantiating a virtual lane in a data center network (DCN) to be used for a flow-specific slice for a service hosted by a service provider environment;

sending a request for network slice creation to a network (NW) orchestrator in communication NW, wherein the request is to cause the NW orchestrator to create a network slice instance (NSI);

receiving, from the NW orchestrator, a response based on the request for network slice creation, wherein the response includes network slice configuration information for the NSI;

mapping the NSI in the NW to the instantiated virtual lane;

provisioning a service provider application operated by the service provider environment with a flow-specific slice configuration based on the network slice configuration information; and establishing an end-to-end (e2e) connection for the flow-specific slice, wherein the e2e connection is established between a user application operated by a user device and the service provider application, and the flow-specific slice includes the instantiated virtual lane and the NSI based on the mapping;

wherein:

a network function or an application function is to insert metadata into a network packet header section or a network packet payload section:

the metadata is to be based upon packet mapping to quality of service (QoS) parameters; and the metadata is to be used by one or more layers in flow-specific packet routing.

22. The one or more NTCRM of claim 21, wherein the request is to cause the NW orchestrator to instruct a radio access network (RAN) to provision resources for the network slice or instruct a core network (CN) to provision resources for the network slice.

23. The one or more NTCRM of claim 21, wherein:

the request includes QoS parameters for the flow-specific slice or the NSI, user information related to the user device, and a length of time or a set of time periods during which the flow-specific slice is to be active or inactive, and wherein the QoS parameters for the flow-specific slice are based on a service level agreement (SLA) defined for the flow-specific slice; and the network slice configuration information includes a network slice identifier (ID) assigned to the NSI.

24. The one or more NTCRM of claim 21, wherein execution of the instructions is to cause the compute node to:

receive network slice feedback from the NW, wherein the feedback includes metrics related to operation of the network slice in the NW;

update the flow-specific slice configuration based on the received feedback; and provision the service provider application with the updated flow-specific slice configuration, wherein the updated flow-specific slice configuration is to cause changes to QoS parameters of the flow-specific slice or cause changes to resources allocated to the flow-specific slice.

25. The one or more NTCRM of claim 21, wherein the flow-specific slice belongs to a data flow, and flow-specific packets belonging to the data flow are communicated between the user application and the service provider application in the flow-specific slice, and wherein execution of the instructions is to cause the compute node to:

determine whether received packets belong to the data flow based on the metadata, wherein the metadata is to be included in the received packets, and wherein, to determine whether received packets belong to the data flow, the processor circuitry is to execute the instructions to:

extract the metadata from the received packets;

compare the extracted metadata with flow-specific slice information of the flow-specific slice; and route the received packets to be sent over the flow-specific slice when the extracted metadata matches the flow-specific slice information.

26. The one or more NTCRM of claim 25, wherein execution of the instructions is to cause the compute node to:

receive packets from the service provider application that belong to the data flow; and insert the metadata into the network packet header section or the network packet payload section of the received packets, wherein the inserted metadata is to cause the received packets to be routed through the flow-specific slice to the user application, wherein the metadata includes one or both of a flow-specific slice ID assigned to the flow-specific slice and a network operator ID assigned to the NW.

* * * * *